United States Patent
Inoue et al.

(10) Patent No.: US 8,443,362 B2
(45) Date of Patent: May 14, 2013

(54) COMPUTER SYSTEM FOR DETERMINING AND DISPLAYING PERFORMANCE PROBLEMS FROM FIRST STORAGE DEVICES AND BASED ON THE PROBLEMS, SELECTING A MIGRATION DESTINATION TO OTHER SECONDARY STORAGE DEVICES THAT ARE OPERATED INDEPENDENTLY THEREOF, FROM THE FIRST STORAGE DEVICES

(75) Inventors: Katsutaka Inoue, Yokohama (JP); Shuji Fujino, Ayase (JP); Hideo Ohata, Fujisawa (JP); Tadashi Numanoi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1002 days.

(21) Appl. No.: 12/007,464

(22) Filed: Jan. 10, 2008

(65) Prior Publication Data

US 2008/0313641 A1    Dec. 18, 2008

(30) Foreign Application Priority Data

Jun. 18, 2007  (JP) ................................ 2007-160089

(51) Int. Cl.
*G06F 12/00* (2006.01)
*G06F 11/30* (2006.01)

(52) U.S. Cl.
USPC ............... 718/1; 711/112; 711/161; 711/171; 711/100; 711/114; 711/165; 713/193

(58) Field of Classification Search .................. 711/112, 711/161, 171, 100, 114, 165; 713/193
See application file for complete search history.

(56) References Cited

U.S. PATENT DOCUMENTS

| | | | | |
|---|---|---|---|---|
| 5,579,507 A | * | 11/1996 | Hosouchi et al. | 711/171 |
| 5,659,704 A | * | 8/1997 | Burkes et al. | 711/114 |
| 5,956,750 A | | 9/1999 | Yamamoto et al. | |
| 6,725,328 B2 | | 4/2004 | Kano et al. | |
| 6,779,078 B2 | * | 8/2004 | Murotani et al. | 711/112 |
| 7,689,837 B2 | * | 3/2010 | Taguchi et al. | 713/193 |
| 2002/0103969 A1 | | 8/2002 | Koizumi et al. | |
| 2006/0095697 A1 | | 5/2006 | Eguchi et al. | |
| 2007/0050589 A1 | * | 3/2007 | Tanaka et al. | 711/165 |
| 2007/0245101 A1 | * | 10/2007 | Taguchi et al. | 711/161 |
| 2008/0209104 A1 | * | 8/2008 | Tanaka et al. | 711/100 |

FOREIGN PATENT DOCUMENTS

| | | |
|---|---|---|
| EP | 1 632 841 A2 | 3/2006 |
| JP | 09-274544 | 10/1997 |
| JP | 2001-337790 | 5/2000 |
| JP | 2003-015915 | 7/2001 |
| JP | 2003-345522 | 12/2003 |
| WO | 2006/055765 A2 | 5/2006 |

* cited by examiner

*Primary Examiner* — Thomas Lee
*Assistant Examiner* — Aurel Prifti
(74) *Attorney, Agent, or Firm* — Volpe And Koenig, P.C.

(57) ABSTRACT

Provided is a computer system including a host computer, a storage system, and a management computer, in which the storage system receives data I/O request to virtual logical volumes and data I/O request to one or more real logical volumes, each of the virtual logical volumes is allocated to one of one or more pools, storage areas of physical storage systems are allocated to all storage areas defined as the pools, and when a performance problem has occurred in one of the virtual logical volumes, the management computer selects the one of the virtual logical volumes, and selects a pool other than the pool to which the selected virtual logical volume is allocated and the real logical volumes as a migration destination of the selected virtual logical volume, to thereby prevent a performance problem from being caused by interference among the virtual logical volumes sharing the pool.

19 Claims, 26 Drawing Sheets

FIG. 4

| DATE AND TIME |
|---|
| 2007/04/07 15:06:00 |

VIRTUAL VOLUME

| NUMBER | RESPONSE TIME [Sec] | IOPS [IO/s] | TRANSFER RATE [MB/s] | CAPACITY [MB] | USED AMOUNT [%] | STATUS |
|---|---|---|---|---|---|---|
| 05 | 0.30 | 1.2 | 5.8 | 10,000 | 73.8 | PERFORMANCE DETERIORATION |
| 08 | 0.06 | 12.7 | 74.5 | 10,000 | 80.2 | OVER-LOAD |

POOL

| NAME | RESPONSE TIME [Sec] | IOPS [IO/s] | TRANSFER RATE [MB/s] | STATUS | COUNTERMEASURE |
|---|---|---|---|---|---|
| A | 0.13 | 8.7 | 48.3 | NORMAL | MIGRATE TO POOL C [EXECUTE] |
| B | 0.09 | 11.3 | 60.2 | OVER-LOAD | CONVERT INTO REAL LOGICAL VOLUME [EXECUTE] |

MIGRATION DESTINATION POOL

| NAME | RESPONSE TIME [Sec] | IOPS [IO/s] | TRANSFER RATE [KB/s] | STATUS | FREE CAPACITY [MB] |
|---|---|---|---|---|---|
| C | 0.19 | 7.1 | 10.2 | PERFORMANCE DETERIORATION | 5,000 |

APPLICATION/FILE RELATION TABLE

| HOST SERVER IDENTIFIER STORAGE FIELD 502 | APPLICATION IDENTIFIER STORAGE FIELD 503 | FILE IDENTIFIER STORAGE FIELD 504 |
|---|---|---|
| HOST SERVER A | APPLICATION A | FILE A |
| HOST SERVER B | APPLICATION B | FILE B |
| HOST SERVER B | APPLICATION B | FILE C |
| HOST SERVER C | APPLICATION C | FILE D |
| HOST SERVER D | APPLICATION D | FILE E |
| HOST SERVER D | APPLICATION D | FILE F |

FILE/VOLUME RELATION TABLE

| HOST SERVER IDENTIFIER STORAGE FIELD 602 | FILE IDENTIFIER STORAGE FIELD 603 | VOLUME IDENTIFIER STORAGE FIELD 604 |
|---|---|---|
| HOST SERVER A | FILE A | VOLUME A |
| HOST SERVER B | FILE B | VOLUME B |
| HOST SERVER B | FILE C | VOLUME B |
| HOST SERVER C | FILE D | VOLUME C |
| HOST SERVER D | FILE E | VOLUME D |
| HOST SERVER D | FILE F | VOLUME E |

VOLUME/LOGICAL VOLUME RELATION TABLE

| HOST SERVER IDENTIFIER STORAGE FIELD 702 | VOLUME IDENTIFIER STORAGE FIELD 703 | LOGICAL VOLUME NUMBER STORAGE FIELD 704 |
|---|---|---|
| HOST SERVER A | VOLUME A | 01 |
| HOST SERVER B | VOLUME B | 06 |
| HOST SERVER C | VOLUME C | 02 |
| HOST SERVER D | VOLUME D | 03 |
| HOST SERVER D | VOLUME E | 15 |

*FIG. 7*

LOGICAL VOLUME TABLE

| LOGICAL VOLUME IDENTIFIER STORAGE FIELD 802 | VOLUME TYPE STORAGE FIELD 803 | LOGICAL VOLUME NUMBER STORAGE FIELD 804 | DEFINED CAPACITY STORAGE FIELD 805 | USE STATUS STORAGE FIELD 806 |
|---|---|---|---|---|
| COMPOSITE LOGICAL VOLUME A | COMPOSITE | 01 | 20,000 | USED |
| COMPOSITE LOGICAL VOLUME B | COMPOSITE | 02 | 20,000 | USED |
| COMPOSITE LOGICAL VOLUME C | COMPOSITE | 03 | 20,000 | USED |
| VIRTUAL LOGICAL VOLUME A | VIRTUAL | 04 | 10,000 | USED |
| VIRTUAL LOGICAL VOLUME B | VIRTUAL | 05 | 10,000 | USED |
| VIRTUAL LOGICAL VOLUME C | VIRTUAL | 06 | 10,000 | USED |
| VIRTUAL LOGICAL VOLUME D | VIRTUAL | 07 | 10,000 | USED |
| VIRTUAL LOGICAL VOLUME E | VIRTUAL | 08 | 10,000 | USED |
| VIRTUAL LOGICAL VOLUME F | VIRTUAL | 09 | 10,000 | UNUSED |
| VIRTUAL LOGICAL VOLUME G | VIRTUAL | 10 | 10,000 | UNUSED |
| VIRTUAL LOGICAL VOLUME H | VIRTUAL | 11 | 10,000 | USED |
| REAL LOGICAL VOLUME A | REAL | 12 | 10,000 | USED |
| REAL LOGICAL VOLUME B | REAL | 13 | 10,000 | UNUSED |
| REAL LOGICAL VOLUME C | REAL | 14 | 10,000 | UNUSED |
| REAL LOGICAL VOLUME D | REAL | 15 | 10,000 | USED |
| POOL VOLUME A | POOL | 16 | 20,000 | USED |
| POOL VOLUME B | POOL | 17 | 20,000 | USED |
| POOL VOLUME C | POOL | 18 | 20,000 | USED |
| POOL VOLUME D | POOL | 19 | 20,000 | USED |
| POOL VOLUME E | POOL | 20 | 20,000 | USED |
| POOL VOLUME F | POOL | 21 | 20,000 | USED |
| POOL VOLUME G | POOL | 22 | 20,000 | USED |
| POOL VOLUME H | POOL | 23 | 20,000 | USED |

COMPOSITE LOGICAL VOLUME/ELEMENT LOGICAL VOLUME RELATION TABLE

| LOGICAL VOLUME IDENTIFIER STORAGE FIELD 902 | LOGICAL VOLUME NUMBER STORAGE FIELD 903 |
|---|---|
| COMPOSITE LOGICAL VOLUME A | 04 |
| COMPOSITE LOGICAL VOLUME A | 05 |
| COMPOSITE LOGICAL VOLUME B | 07 |
| COMPOSITE LOGICAL VOLUME B | 08 |
| COMPOSITE LOGICAL VOLUME C | 11 |
| COMPOSITE LOGICAL VOLUME C | 12 |

REAL LOGICAL VOLUME/ARRAY GROUP RELATION TABLE

| LOGICAL VOLUME IDENTIFIER STORAGE FIELD 1002 | ARRAY GROUP IDENTIFIER STORAGE FIELD 1003 |
|---|---|
| REAL LOGICAL VOLUME A | ARRAY GROUP E |
| REAL LOGICAL VOLUME B | ARRAY GROUP E |
| REAL LOGICAL VOLUME C | ARRAY GROUP F |
| REAL LOGICAL VOLUME D | ARRAY GROUP F |
| POOL VOLUME A | ARRAY GROUP A |
| POOL VOLUME B | ARRAY GROUP A |
| POOL VOLUME C | ARRAY GROUP B |
| POOL VOLUME D | ARRAY GROUP B |
| POOL VOLUME E | ARRAY GROUP C |
| POOL VOLUME F | ARRAY GROUP C |
| POOL VOLUME G | ARRAY GROUP D |
| POOL VOLUME H | ARRAY GROUP D |

VIRTUAL LOGICAL VOLUME/POOL RELATION TABLE

| LOGICAL VOLUME IDENTIFIER STORAGE FIELD 1102 | POOL IDENTIFIER STORAGE FIELD 1103 |
|---|---|
| VIRTUAL LOGICAL VOLUME A | POOL A |
| VIRTUAL LOGICAL VOLUME B | POOL A |
| VIRTUAL LOGICAL VOLUME C | POOL A |
| VIRTUAL LOGICAL VOLUME D | POOL A |
| VIRTUAL LOGICAL VOLUME E | POOL B |
| VIRTUAL LOGICAL VOLUME F | POOL B |
| VIRTUAL LOGICAL VOLUME G | POOL C |
| VIRTUAL LOGICAL VOLUME H | POOL C |

POOL/POOL VOLUME RELATION TABLE

| POOL IDENTIFIER STORAGE FIELD 1202 | LOGICAL VOLUME IDENTIFIER STORAGE FIELD 1203 |
|---|---|
| POOL A | POOL VOLUME A |
| POOL A | POOL VOLUME B |
| POOL A | POOL VOLUME C |
| POOL A | POOL VOLUME D |
| POOL B | POOL VOLUME E |
| POOL B | POOL VOLUME F |
| POOL C | POOL VOLUME G |
| POOL C | POOL VOLUME H |

VOLUME STATISTICS INFORMATION TABLE

| DATE AND TIME STORAGE FIELD 1302 | LOGICAL VOLUME IDENTIFIER STORAGE FIELD 1303 | I/O RESPONSE TIME STORAGE FIELD 1304 | IOPS STORAGE FIELD 1305 | TRANSFER RATE STORAGE FIELD 1306 | USED CAPACITY STORAGE FIELD 1307 |
|---|---|---|---|---|---|
| 2007/04/07 10:34:00 | VIRTUAL LOGICAL VOLUME A | 0.04 | 9.5 | 27.1 | 10,000 |
| 2007/04/07 10:34:00 | VIRTUAL LOGICAL VOLUME B | 0.07 | 11.4 | 23.8 | 361 |
| 2007/04/07 10:34:00 | VIRTUAL LOGICAL VOLUME C | 0.05 | 9.7 | 13.4 | 251 |
| : | : | : | : | : | : |
| 2007/04/07 10:34:00 | VIRTUAL LOGICAL VOLUME H | 0.08 | 6.3 | 11.7 | 482 |
| 2007/04/07 10:35:00 | VIRTUAL LOGICAL VOLUME A | 0.03 | 10.8 | 26.5 | 10,000 |
| 2007/04/07 10:35:00 | VIRTUAL LOGICAL VOLUME B | 0.06 | 11.7 | 22.4 | 361 |
| 2007/04/07 10:35:00 | VIRTUAL LOGICAL VOLUME C | 0.06 | 9.5 | 15.9 | 251 |
| : | : | : | : | : | : |
| 2007/04/07 10:35:00 | VIRTUAL LOGICAL VOLUME H | 0.09 | 6.3 | 10.3 | 482 |
| : | : | : | : | : | : |
| 2007/04/07 15:06:00 | VIRTUAL LOGICAL VOLUME A | 0.07 | 10.2 | 22.7 | 10,000 |
| 2007/04/07 15:06:00 | VIRTUAL LOGICAL VOLUME B | 0.30 | 1.2 | 5.8 | 7,382 |
| 2007/04/07 15:06:00 | VIRTUAL LOGICAL VOLUME C | 0.07 | 8.9 | 11.3 | 496 |
| : | : | : | : | : | : |
| 2007/04/07 15:06:00 | VIRTUAL LOGICAL VOLUME H | 0.13 | 8.2 | 14.5 | 693 |

FIG. 13

POOL STATISTICS INFORMATION TABLE

| DATE AND TIME STORAGE FIELD 1402 | POOL IDENTIFIER STORAGE FIELD 1403 | I/O RESPONSE TIME STORAGE FIELD 1404 | IOPS STORAGE FIELD 1405 | TRANSFER RATE STORAGE FIELD 1406 |
|---|---|---|---|---|
| 2007/04/07 10:34:00 | POOL A | 0.06 | 12.4 | 25.2 |
| 2007/04/07 10:34:00 | POOL B | 0.64 | 1.3 | 4.1 |
| 2007/04/07 10:34:00 | POOL C | 0.04 | 11.3 | 20.5 |
| 2007/04/07 10:35:00 | POOL A | 0.05 | 14.8 | 28.7 |
| 2007/04/07 10:35:00 | POOL B | 0.58 | 2.4 | 3.7 |
| 2007/04/07 10:35:00 | POOL C | 0.02 | 9.6 | 18.5 |
| : | : | : | : | : |
| 2007/04/07 15:06:00 | POOL A | 0.13 | 8.7 | 48.3 |
| 2007/04/07 15:06:00 | POOL B | 0.09 | 11.3 | 60.2 |
| 2007/04/07 15:06:00 | POOL C | 0.19 | 7.1 | 10.2 |

CONTROL INFORMATION TABLE

| 1502 | 1503 | 1504 | 1505 | 1506 | 1507 |
|---|---|---|---|---|---|
| I/O RESPONSE TIME THRESHOLD VALUE FOR VOLUME PERFORMANCE DETERIORATION JUDGMENT STORAGE FIELD | IOPS THRESHOLD VALUE FOR VOLUME OVERLOAD JUDGMENT STORAGE FIELD | TRANSFER RATE THRESHOLD VALUE FOR VOLUME OVERLOAD JUDGMENT STORAGE FIELD | I/O RESPONSE TIME THRESHOLD VALUE FOR POOL PERFORMANCE DETERIORATION JUDGMENT STORAGE FIELD | IOPS THRESHOLD VALUE FOR POOL OVERLOAD JUDGMENT STORAGE FIELD | TRANSFER RATE THRESHOLD VALUE FOR POOL OVERLOAD JUDGMENT STORAGE FIELD |
| 0.20 | 14.0 | 70.0 | 0.15 | 12.0 | 60.0 |

| 1508 | 1509 | 1510 | 1511 | 1512 | 1513 |
|---|---|---|---|---|---|
| I/O RESPONSE TIME THRESHOLD VALUE FOR PERFORMANCE DETERIORATION VOLUME SELECTION STORAGE FIELD | IOPS THRESHOLD VALUE FOR OVERLOAD VOLUME SELECTION STORAGE FIELD | TRANSFER RATE THRESHOLD VALUE FOR OVERLOAD VOLUME SELECTION STORAGE FIELD | MINIMUM VOLUME FILLING RATE STORAGE FIELD | OPERATION MODE STORAGE FIELD | SEARCH MODE STORAGE FIELD |
| 0.20 | 14.0 | 70.0 | 70.0 | AUTOMATIC | SINGLE |

SELECT VOLUME TABLE

| LOGICAL VOLUME IDENTIFIER STORAGE FIELD 1602 | COUNTERMEASURE TYPE STORAGE FIELD 1603 | COUNTERMEASURE PARAMETER STORAGE FIELD 1604 |
|---|---|---|
| VIRTUAL LOGICAL VOLUME B | POOL MIGRATION | POOL C |
| VIRTUAL LOGICAL VOLUME E | CONVERSION INTO REAL LOGICAL VOLUME | — |

COMPUTER SYSTEM FOR DETERMINING AND DISPLAYING PERFORMANCE PROBLEMS FROM FIRST STORAGE DEVICES AND BASED ON THE PROBLEMS, SELECTING A MIGRATION DESTINATION TO OTHER SECONDARY STORAGE DEVICES THAT ARE OPERATED INDEPENDENTLY THEREOF, FROM THE FIRST STORAGE DEVICES

CLAIM OF PRIORITY

The present application claims priority from Japanese application JP2007-160089 filed on Jun. 18, 2007, the content of which is hereby incorporated by reference into this application.

BACKGROUND

A technology disclosed herein relates to volume management of a storage system, and more particularly, to volume management for maintaining performance of the storage system which includes virtualized volumes.

One of storage system virtualization technologies is a virtual logical volume (hereinafter, simply referred to as virtual volume) for dynamically allocating a storage area when an I/O request is generated (for example, see JP 2003-15915 A). In a normal logical volume (hereinafter, referred to as real logical volume or simply real volume), storage areas of capacities defined at the time of creation are all reserved beforehand on physical disks or array groups. On the other hand, in a virtual logical volume, no storage area is reserved while a capacity is only defined at the time of creation, and only a necessary amount of a storage area is allocated for the first time when an I/O request is generated for the virtual logical volume. The storage area that has been allocated (or will be allocated) to the virtual logical volume is reserved in an area exclusively used for the virtual logical volume (hereinafter, this area will be referred to as pool). The pool is defined as a group of a plurality of real logical volumes. Hereinafter, the plurality of real logical volumes constituting the pool will be referred to as pool logical volumes or simply pool volumes. An I/O to the virtual logical volume is converted into an I/O to the pool volume in the storage system to be processed.

In the virtual logical volume, it is not necessary to prepare all storage areas of defined capacities beforehand, and a area of a size actually used when an I/O request is generated is dynamically reserved. Thus, use of the virtual logical volume enables an operation where the minimum necessary number of physical disks is mounted when the storage system is introduced, and a physical disk is added when a capacity runs short according to a subsequent use status. By efficiently increasing disk utilization in this way, introduction and operation costs of the storage system can be reduced.

Further, in order to balance I/O loads on the storage system, a technology of migrating a logical volume has been disclosed (for example, see JP 2001-337790 A). According to this technology, the logical volume is migrated to a proper migration destination based on an I/O load or the like on the logical volume. Through this migration, loads concentrated in a specific part are distributed and, as a result, performance dropped because of the load concentration can be improved.

SUMMARY

A plurality of virtual logical volumes that share one pool volume and an array group having the pool volume allocated thereto interfere with one another in performance. Thus, there is a possibility that an excess I/O load on a certain pool volume will adversely affect performance of all hosts which share the pool volume (and array group including the pool volume).

In the normal logical volume, performance interference also occurs among hosts which share an array group. However, in the normal logical volume, because the storage area of the defined capacity has to be allocated beforehand, the number of logical volumes which share one array group is naturally limited. On the other hand, in a case of the virtual logical volume, because no such limit is imposed when a consumption amount of a disk capacity is not high, performance interference (adverse influence) more easily occurs among the hosts compared with the normal logical volume. In order to convert an I/O to the virtual logical volume into an I/O to the pool volume, a round-robin system is generally employed to distribute loads. In this case, however, performance interference among the hosts tends to be increased.

To solve such problems accompanying the interference among the virtual logical volumes, a migration technology can be employed. Specifically, a virtual volume deteriorated in performance by an influence of the other high-load virtual logical volume in the pool, or a high-load virtual logical volume which adversely affects performance of the other virtual logical volume is migrated to a real logical volume outside the pool. By converting the virtual logical volume into a real logical volume through migration, interference among the virtual logical volumes is reduced to prevent accompanying problems.

However, when the virtual logical volume is converted into a real logical volume in order to solve the performance problem caused by the interference among the virtual logical volumes sharing the pool, a storage area of a defined capacity is unconditionally reserved. When a virtual logical volume is easily converted into a real logical volume at a stage where an actually used capacity is small, an effect of increasing utilization efficiency of a disk area which is an advantage of the virtual logical volume is lost.

According to a representative invention disclosed in this application, there is provided a computer system, comprising: a host computer; a storage system coupled to the host computer via a network; a management computer coupled to the host computer and the storage system; and a display device, wherein: the host computer includes a first interface coupled to the network, a first processor coupled to the first interface, and a first memory coupled to the first processor; the management computer includes a second interface coupled to the host computer and the storage system, a second processor coupled to the second interface, and a second memory coupled to the second processor; the storage system includes a port coupled to the network, a controller coupled to the port, and a plurality of physical storage devices for storing data written by the host computer; the controller receives data I/O request to a plurality of virtual logical volumes, or data I/O request to a plurality of virtual logical volumes and data I/O request to one or more real logical volumes, from the host computer; each of the plurality of virtual logical volumes is allocated to one of one or more pools; each of the one or more pools includes one or more pool volumes; storage areas of the plurality of physical storage devices are allocated to all storage areas defined as the one or more pool volumes; a storage area of the plurality of physical storage devices allocated to one of the one or more pool volumes included in one of the one or more pools to which the virtual logical volume is allocated is allocated to at least a part of storage areas defined as the plurality of virtual logical volumes; storage areas of the plurality of physical storage devices are allocated to all storage areas defined as the one or more real logical volumes; and the second processor judges whether a performance problem has occurred in at least one of the plurality of virtual logical volumes and the one or more pools, selects one of the plurality of virtual logical volumes as a migration source upon judgment that a performance problem has occurred in at least one of the plurality of virtual logical volumes and the one or more pools, selects at least one of a pool other than the pool to which the virtual logical volume selected as the migration source is allocated and the real logical volume as a migration destination of the virtual logical volume selected as the migration source, and executes at least one of causing the display device to display information indicating the virtual logical volume selected as the migration source and information indicating the selected migration destination, and transmitting of an instruction of migrating the virtual logical volume selected as the migration source to the pool or the real logical volume selected as the migration destination to the controller.

According to the embodiment of this invention, when the performance deterioration or overload situation occurs in the virtual logical volumes which share the pool, a solution which gives consideration to the disk use status is automatically decided or executed. As a result, it is possible to promptly solve the performance problem while maintaining the advantages of the virtual logical volume.

BRIEF DESCRIPTION OF THE DRAWINGS

FIG. 4 is an explanatory diagram showing an example of a screen displayed by the volume list display module according to the embodiment of this invention.

FIG. 5 is an explanatory diagram showing an example of a structure of an application/file relation table according to the embodiment of this invention.

FIG. 6 is an explanatory diagram showing an example of a structure of a file/volume relation table according to the embodiment of this invention.

FIG. 7 is an explanatory diagram showing an example of a structure of a volume/logical volume relation table according to the embodiment of this invention.

FIG. 8 is an explanatory diagram showing an example of a structure of a logical volume table according to the embodiment of this invention.

FIG. 9 is an explanatory diagram showing an example of a structure of a composite logical volume/element logical volume relation table according to the embodiment of this invention.

FIG. 10 is an explanatory diagram showing an example of a structure of a real logical volume/array group relation table according to the embodiment of this invention.

FIG. 11 is an explanatory diagram showing an example of a structure of a virtual logical volume/pool relation table according to the embodiment of this invention.

FIG. 12 is an explanatory diagram showing an example of a structure of a pool/pool volume relation table according to the embodiment of this invention.

FIG. 13 is an explanatory diagram showing an example of a structure of a volume statistics information table according to the first embodiment of this invention.

FIG. 14 is an explanatory diagram showing an example of a structure of a pool statistics information table according to the first embodiment of this invention.

FIG. 15 is an explanatory diagram showing an example of a structure of a control information table according to the embodiment of this invention.

FIG. 16 is an explanatory diagram showing an example of a structure of a select volume table according to an embodiment of this invention.

DETAILED DESCRIPTION OF THE PREFERRED EMBODIMENTS

Figure 1:
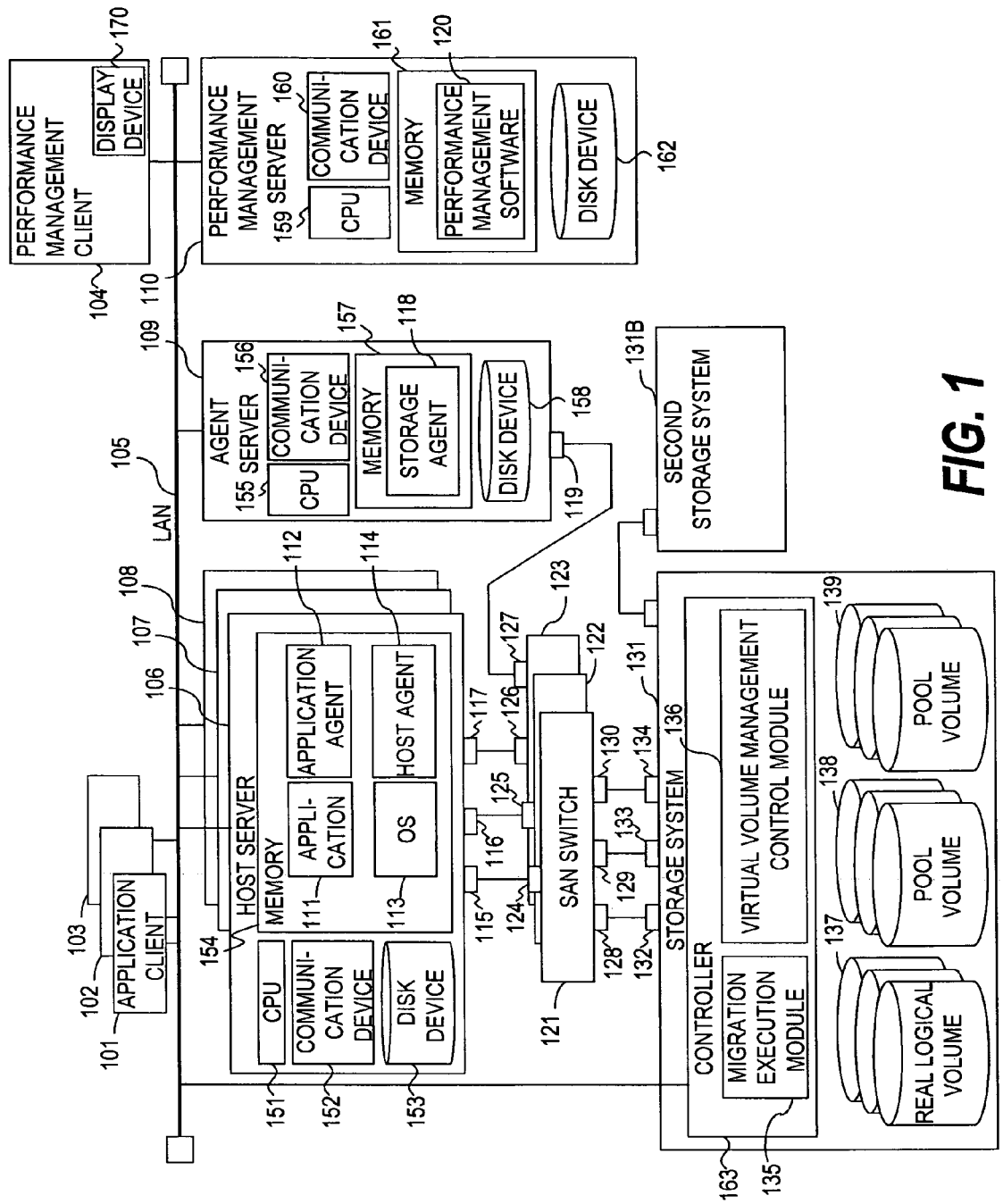
FIG. 1 is a block diagram showing a computer system configuration according to an embodiment of this invention.

FIG. 1 is a block diagram showing a computer system configuration according to an embodiment of this invention.

A computer system of the embodiment includes an application system in a storage area network (SAN) environment, and a system for managing the SAN environment and performance of the application system.

Hardwares that constitute the application system are application clients 101 to 103, a local area network (LAN) 105, host servers 106 to 108, SAN switches 121 to 123, and a storage system 131. Softwares that constitute the application system are an application 111 and an operating system (OS) 113.

The application clients 101 to 103 are devices such as personal computers, work stations or thin client terminals which provide user interfaces of application systems. The application clients 101 to 103 communicate with applications 111 of the host servers 106 to 108 via the LAN 105.

The host sever 106 includes a CPU 151, a communication device 152, a disk device 153, and a memory 154.

The CPU 151 is a processor for executing various software programs stored in the memory 154. In the description below, processes executed by the software programs in the memory 154 are actually executed by the CPU 151 which executes the software programs.

The communication device 152 is used by the host server 106 to communicate with the other devices. The host server 106 may include a plurality of communication devices 152. In such a case, one of the communication devices 152 may be a so-called network interface card (NIC) connected to the LAN 105 to communicate with a performance management server 110, the application client 101 or the like according to an instruction from the CPU 151. Another one of the communication devices 152 may be a so-called host bus adapter (HBA) connected to the SAN switch 121 or the like to communicate with the storage system 131 according to an instruction from the CPU 151. The host bus adapter includes ports 115 to 117.

The disk device 153 is a storage device such as a hard disk drive (HDD) or a flash memory. The disk device 153 may store software programs or data similar to those stored in the memory 154.

The memory 154 is a semiconductor memory device such as a dynamic RAM. The memory 154 stores software programs executed by the CPU 151 and data referred to by the CPU 151. Specifically, the memory 154 stores at least the application 111 executed by the CPU 151, an application agent 112, the OS 113, and a host agent 114. Those may be stored in the disk device 153, and copied from the disk device 153 to the memory 154 when necessary.

Configurations of the host servers 107 and 108 are similar to that of the host server 106, and thus description thereof will be omitted. FIG. 1 shows the three host servers 106 to 108. However, the computer system of the embodiment can include an optional number of host servers 106 or the like.

Figure 3:
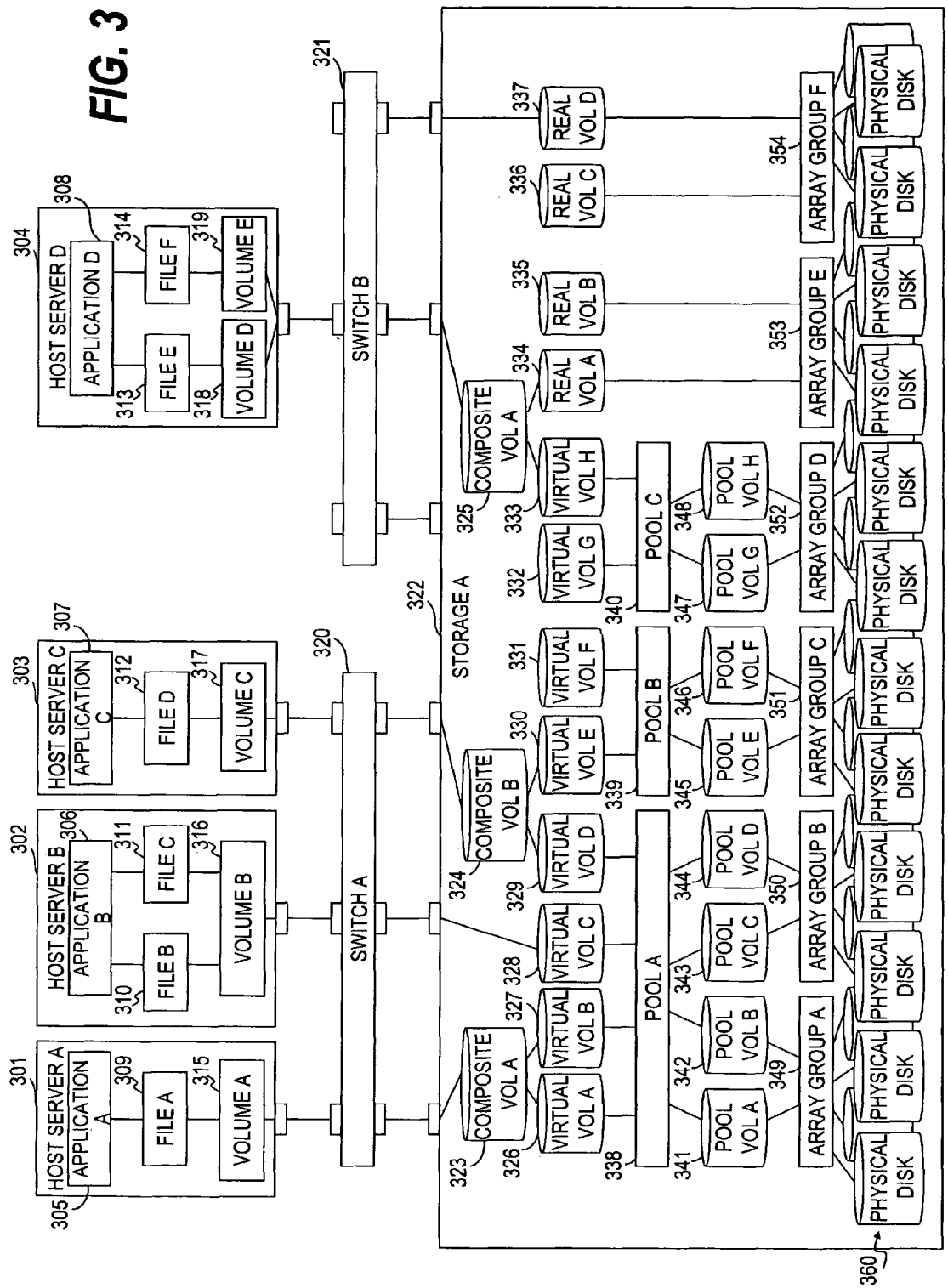
FIG. 3 is a block diagram showing specific examples of a resource configuration and an inter-resource relation in the SAN environment according to the embodiment of this invention.

The storage system 131 includes a controller 163 and a plurality of physical disks shown in FIG. 3.

The controller 163 controls an operation of the storage system 131. For example, the controller 163 controls writing and reading of data from a physical disk according to a request received from the host sever 106 or the like. Additionally, the controller 163 executes migration and management of a virtual logical volume described below.

Specifically, the controller 163 includes at least a migration execution module 135 and a virtual volume management control module 136. Those modules may be realized by executing software programs stored in a memory (not shown) of the controller 163 by a processor (not shown) of the controller 163.

The controller 163 further includes ports 132 to 134 for communicating with the host server 106 or an agent server 109 via the SAN switch 121.

The plurality of physical disks include, for example, hard disk drives (HDD). A real logical volume 137 and pool volumes 138 and 139 are set in the physical disk. The storage system 131 can include one or more real logical volume 137 and one or more pool volumes 138 and the like. A relation among the physical disk and the real logical volume 137 and the pool volume 138 will be described below referring to FIG. 3.

The application 111 is software for providing a function of the application system or database (DB) management software. The application 111 executes data inputting/outputting from/to the storage system 131 in response to processing requests from the application clients 101 to 103 when necessary. Access from the application 111 to data of the storage system 131 is executed via OS 113, ports 115 to 117 of the host bus adapter, host side ports 124 to 126 of the SAN switch, the SAN switches 121 to 123, storage side ports 128 to 130 of the SAN switch, and ports 132 to 134 of the storage system 131.

Data inputting/outputting to or from the storage system 131 by the host server 106 may be executed based on, for example, a fibre channel (FC) protocol. However, it may be executed based on other protocols.

The SAN switches 121 to 123 switches connection among the ports 124 to 130 provided thereto to establish a data access path between the host server 106 and the like and the storage system 131.

Hardwares that constitute the system for managing the SAN environment and the performance of the application system include a performance management client 104, a performance management server 110, and an agent server 109. Softwares that constitute the system for performance management include performance management software 120, an application agent 112, a host agent 114, and a storage agent 118.

The performance management server 110 includes a CPU 159, a communication device 160, a disk device 162, and a memory 161.

The CPU 159 is a processor for executing software programs stored in the memory 161. In the description below, processes executed by the software programs stored in the memory 161 are actually executed by the CPU 159 which executes the software programs.

The communication device 160 is used by the performance management server 110 to communicate with the other devices. The communication device 160 may be a so-called network interface card (NIC) connected to the LAN 105 to communicate with the performance management client 104, the host server 106 or the like, the agent server 109, and the storage system 131 according to an instruction from the CPU 159.

The disk device 162 is a storage device such as a hard disk drive (HDD) or a flash memory. The disk device 162 may store software programs or data similar to those stored in the memory 161.

The memory 161 is a semiconductor memory device such as a dynamic RAM. The memory 161 stores software programs executed by the CPU 159 and data referred to by the CPU 159. Specifically, the memory 161 stores at least the performance management software 120 executed by the CPU 159. The performance management software 120 may be stored in the disk device 162, and copied from the disk device 162 to the memory 161 when necessary.

The agent sever 109 includes a CPU 155, a communication device 156, a disk device 158, and a memory 157.

The CPU 155 is a processor for executing software programs stored in the memory 157. In the description below, processes executed by the software programs stored in the memory 157 are actually executed by the CPU 155 which executes the software programs.

The communication device 156 is used by the agent server 109 to communicate with the other devices. The agent server 109 may include a plurality of communication devices 156. In such a case, one of the communication devices 156 may be a NIC connected to the LAN 105 to communicate with at least the performance management server 110 according to an instruction from the CPU 155. Another communication device 156 may be a HBA connected to the SAN switch 121 or the like to communicate with the storage system 131 according to an instruction from the CPU 155. The host bus adapter includes a port 119.

The disk device 158 is a storage device such as a hard disk drive (HDD) or a flash memory. The disk device 158 may store software programs or data similar to those stored in the memory 157.

The memory 157 is a semiconductor memory device such as a dynamic RAM. The memory 157 stores software programs executed by the CPU 155 and data referred to by the CPU 155. Specifically, the memory 157 stores at least a storage agent 118 executed by the CPU 155. The storage agent 118 may be stored in the disk device 158, and copied from the disk device 158 to the memory 157 when necessary.

The performance management client 104 is a device for providing a user interface of the performance management software 120. The performance management client 104 includes at least a display device 170 for displaying information to a user, and an input device (not shown) for receiving an entry from the user. The display device 170 is an image display device such as a CRT or a liquid crystal display device. A screen example displayed on the display device 170 will be described below referring to FIG. 4. The performance management client 104 communicates with the performance management software 120 of the performance management server 110 via the LAN 105.

The performance management software 120 is software for providing functions regarding collection of statistics information and monitoring of SAN configuration information and the virtual logical volume of the storage system 131, and detection and solution of performance problems. The performance problems of the virtual logical volume mean deterioration of I/O performance or I/O overloads in the virtual logical volume. The performance management software 120 uses each dedicated agent software to obtain configuration information and statistics information from hardwares and softwares that constitute the SAN. Several methods are available for configuration and arrangement of the agent software, and one example will be described below.

The application agent 112 is software for obtaining configuration information regarding the application 111. The host agent 114 is software for obtaining configuration information regarding the host server 106 and the OS 113. The storage agent 118 is software for obtaining configuration information and statistics information regarding the storage system 131 via the port 119 of the host bus adapter and the SAN switch 121 and the like. The storage agent 118 may be operated in the dedicated agent server 109, or in the performance management server 110. The storage agent 118 communicates with the performance management software 120 via the LAN 105 when it is operated in the dedicated agent server 109.

The virtual volume management module 136 of the storage system 131 provides a function of showing a storage area such as a pool logical volume 138 or the like as a virtual logical volume to the host servers 106 to 108. The migration execution module 135 provides a function of migrating the virtual logical volume to the real logical volume 137, and a function of migrating a virtual logical volume belonging to a certain pool to a virtual logical volume belonging to another pool. FIG. 1 shows the configuration where the migration execution module 135 and the virtual volume management control module 136 are incorporated in the controller 163 of the storage system 131. However, the migration execution module 135 and the virtual volume management control module 136 may be operated in a server independent of the storage system 131.

The logical volume migrating function provided by the migration execution module 135 will be described more. A case of migration a logical volume A which is an input/output destination of a certain server A to a logical volume B will be described as an example. For example, the server A may be one of the host servers 106 to 108, and each of the logical volumes A and B may be one selected from a real logical volume 137, a pool volume 138, a pool volume 139, and a virtual logical volume described below. At the time before migration, the logical volume A is being used while the logical volume B is unused. A unique number (hereinafter, referred to as logical volume number) used by the server for identification is allocated to each logical volume. Logical volume numbers allocated to the logical volumes A and B are respectively set to "01" and "02". Those logical volume numbers are stored in a logical volume number storage field shown in FIG. 8 described below.

To migrate the logical volume, reading of data from the logical volume A and writing of the data to the logical volume B are repeatedly executed. Upon completion of copying all the data of the logical volume A to the logical volume B, logical volume numbers allocated to the logical volumes A and B are switched. Through this number replacement, the server A recognizes the logical volume B as a volume of a number "01" and the logical volume A as a volume of a number "02" thereafter. Accordingly, the logical volume migration function is realized where while the server A continues the execution of inputting/outputting of the volume of the logical volume number "01", substance of the data input/output by the server A is migrated from the logical volume A to the logical volume B.

The following two specific methods are available for copying data between logical volumes in the logical volume migration function.

According to the first copying method, data copying is executed targeting all addresses of a capacity defined in a source logical volume. This method is simple. However, when a source logical volume is a virtual logical volume, data is copied presuming data such as a prescribed value even for a volume in which no data has been written by the host server 106 or the like among the source logical volumes. Thus, when this method is used for migrating a virtual logical volume between the pools, pool storage areas are allocated to all area of destination virtual logical volumes. As a result, an advantage of the virtual logical volume that a storage capacity of an unused volume is not consumed cannot be obtained. Accordingly, the first copying method is preferably used only for converting a virtual logical volume into a real logical volume (in other words, the virtual logical volume is migrated to the real logical volume).

According to the second copying method, data copying is executed targeting only an address in which data has been written by the host server 106 or the like among all the addresses of the capacity defined in the source logical volume. Upon reception of an output request to the virtual logical volume, the virtual volume management control module 136 allocates a storage area, and records a dependency between a logical address of the virtual logical volume and a physical address of a storage area allocated to the logical address. Thus, the virtual volume management control module 136 holds information of all logical addresses of the virtual logical volume in which data writing has been carried out by the host server 106 or the like. The second copying method enables copying of only data of an address in which data has been written by the host server 106 or the like by using this information.

The computer system may include a second storage system 131B which is connected to the storage system 131 via a network. A configuration of the second storage system 131B is similar to that of the storage system 131, thus description thereof will be omitted.

Figure 2:
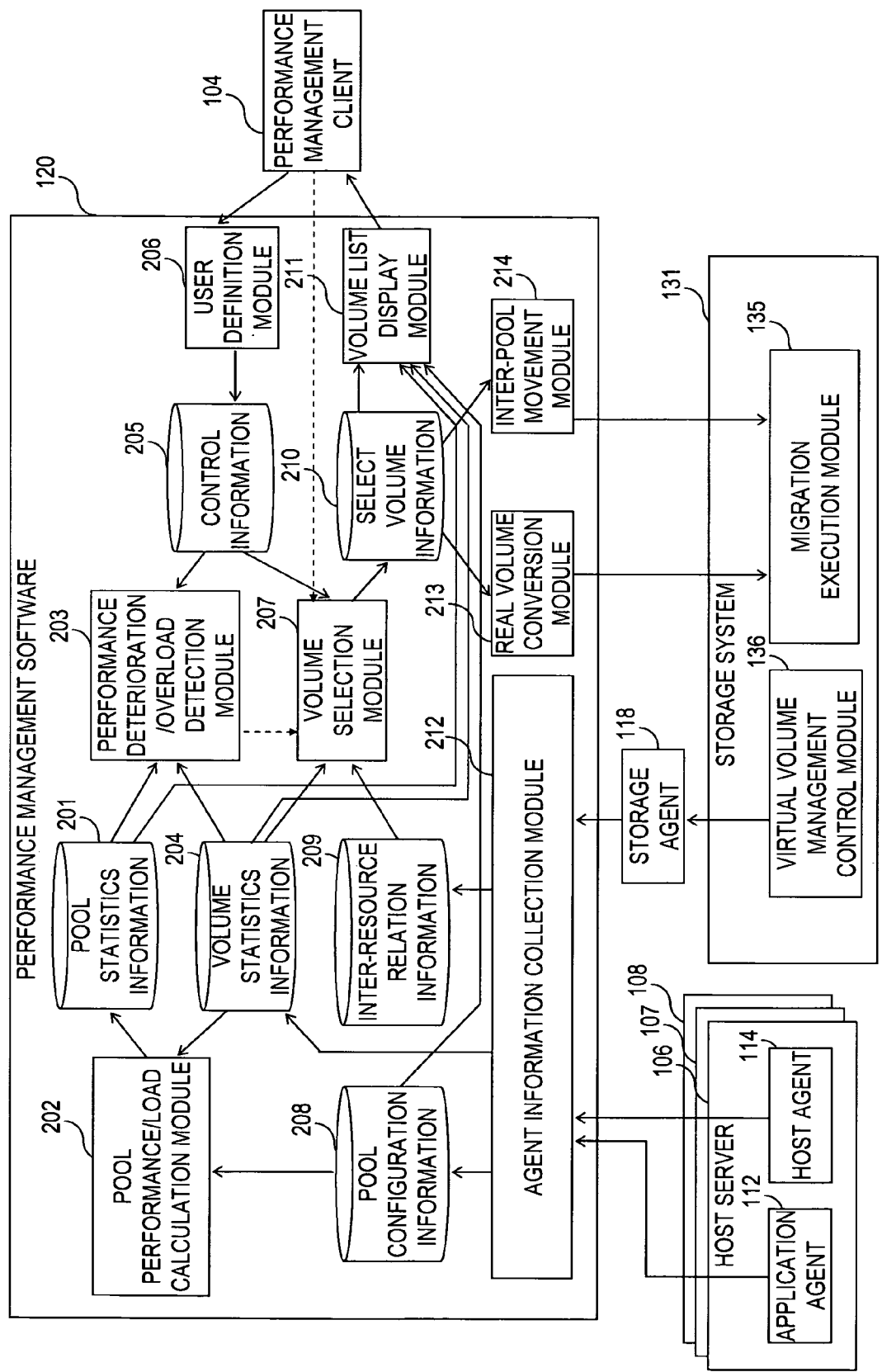
FIG. 2 is a functional block diagram of the computer system according to the embodiment of this invention.

FIG. 2 is a functional block diagram of the computer system according to the embodiment of this invention.

Collection and monitoring of SAN configuration information and statistics information regarding the virtual logical volume are carried out as follows. In the description below, a pool performance/load calculation module 202, a performance deterioration/overload detection module 203, a user definition module 206, a volume selection module 207, a volume list display module 211, an agent information collection module 212, a real volume conversion module 213, and an inter-pool migration module 214 are program modules included in the performance management software 120. Pool statistics information 201, volume statistics information 204, control information 205, pool configuration information 208, inter-resource relation information 209, and select volume information 210 are stored in the memory 161 or the disk device 162.

The application agent 112, the host agent 114, and the storage agent 118 are started by predetermined timing (e.g., periodically by a timer according to a set schedule), or started by a request of the performance management software 120 to obtain configuration information or statistics information from a device or software monitored by the agent. Similarly, the agent information collection module 212 of the performance management software 120 is started by predetermined timing (e.g., periodically according to a set schedule) to collect pieces of configuration information or statistics information from the agents 112, 114 and 118 in the SAN environment. Then, the agent information collection module 212 stores the collected pieces of information as one of inter-resource relation information 209, pool configuration information 208 and volume statistics information 204.

The resource is a generic term for hardwares (for example, storage system, SAN switches, and host servers) constituting the SAN and physical or logical components thereof (for example, ports, processors, cache memories, array groups, and logical volumes), programs (for example, operating system, database management system, and application software) executed in the hardware, and logical components thereof (for example, files, and tables).

The inter-resource relation information 209 is a generic term for a dependency regarding performance between the resources and attribute information of the resources. For example, when an I/O command to a resource A is converted into an I/O command to a resource B to be processed, or when a processing capability of the resource B is used for processing the I/O command to the resource A, there is a dependency regarding performance between the resources A and B.

The pool performance/load calculation module 202 of the performance management software 120 is started after a collection process of the agent information collection module 212. The pool performance/load calculation module 202 totals pieces of volume statistics information 204 for each pool based on contents of the pool configuration information 208, and stores the totaled pieces of information as pool statistics information 201.

Referring to FIGS. 5 to 10, specific examples of a table configuration and a table structure of the inter-resource relation information 209 will be described. Referring to FIGS. 11 and 12, specific examples of a table configuration and a table structure of the pool configuration table 208 will be described. Referring to FIG. 13, a specific example of a table structure of the volume statistics information 204 will be described. Referring to FIG. 14, a specific example of a table structure of the pool statistics information 201 will be described.

A performance problem regarding the virtual logical volumes is detected and solved as follows.

The performance deterioration/overload detection module 203 of the performance management software 120 is started by predetermined timing (e.g., periodically according to a set schedule). When started, the performance deterioration/overload detection module 203 investigates statistical values stored in the volume statistics information 204 and the pool statistics information 201 to judge whether a status of performance deterioration or an overload has occurred in the virtual logical volume or the pool. If it is judged that performance deterioration or an overload has occurred, the performance deterioration/overload detection module 203 starts the volume selection module 207.

The volume selection module 207 may be started by the performance deterioration/overload detection module 203 as described above, or by a request made from the performance management client 104 by operation of a user. When started, the volume selection module 207 outputs information indicating "conversion of virtual logical volume into real logical volume" or "inter-pool migration" as select volume information 210 as a method of solving the performance problem based on the statistical value stored in the volume statistics information 204 and the information stored in the inter-resource relation information 209. The performance problem solving method stored in the select volume information 210 is executed automatically or manually according to an operation mode of the performance management software 120.

If the performance management software 120 is in the automatic operation mode, after the volume selection module 207 completes the above-mentioned process, the real volume conversion module 213 and the inter-pool migration module 214 are automatically started.

If the performance management software 120 is in the manual operation mode, the volume list display module 211 displays a list of performance problem solving methods in the performance management client 104. When the user selects a solving method from the list to transmit an execution instruction from the performance management client 104, one of the real volume conversion module 213 and the inter-pool migration module 214 is started corresponding to the execution instruction.

The real volume conversion module 213 or the inter-pool migration module 214 started automatically or manually issues a migration execution command to the migration execution module 135 of the storage system 131 based on contents stored in the select volume information 210. The control information 205 stores various parameters for adjusting the functions of the performance management software 120 such as various threshold values used for judging the occurrence of performance deterioration or an overload and operation modes of the performance management software 120. The parameters stored in the control information 205 are set or changed by the user using the user definition module 206 via the performance management client 104.

A specific example of a screen displayed in the performance management client 104 by the volume list display module 211 will be described referring to FIG. 4. Specific examples of table structures of the volume statistics information 204, the pool statistics information 201, the control information 205 and the select volume information 210 will be described respectively referring to FIGS. 13 to 16. Details on a processing procedure of the performance deterioration/overload detection module 203 will be described referring to FIG. 17. Details on a processing procedure of the volume selection module 207 will be described referring to FIGS. 18 to 23. Details on a processing procedure of the real volume conversion module 213 will be described referring to FIG. 25, and details on a processing procedure of the inter-pool migration module 214 will be described referring to FIG. 26.

FIG. 3 is a block diagram showing specific examples of a resource configuration and an inter-resource relation in the SAN environment according to the embodiment of this invention.

The hardware of the SAN environment shown in FIG. 3 includes four host severs A (301) to D (304), and two SAN switch devices depicted as switches A (320) and B (321), and one storage system depicted as storage A (322).

The host servers A (301) to D (304) each may be any of the host servers 106 to 108 shown in FIG. 1. The switches A (320) and B (321) each may be any of the SAN switches 121 to 123 shown in FIG. 1. The storage A (322) may be the storage system 131 shown in FIG. 1.

In the host servers A (301) to D (304), applications A (305) to D (304) are operated, respectively. Each of those applications may be an application 111 shown in FIG. 1.

The number of resources shown in FIG. 3 is not always matched with the number of resources shown in FIG. 1. This is because portions unnecessary for description are omitted in each drawing.

In the host servers A (301) to D (304), an application agent 112 for obtaining configuration information of the application A (305) and the like, and a host agent 114 for obtaining configuration information of hardware such as the host server A (301) or an OS 113 are operated. Files A (309) to F (314) and volumes A (315) to E (319) are resource examples of which host agent 114 acquires information. The file is a unit by which the OS provides data input/output services, and the volume is managed as an area for storing the file in the external storage system by the OS.

FIG. 3 shows lines for interconnecting resources. Those lines indicate that there is a certain relation between the two resources connected by the lines. For example, lines for connecting the application B (306) to the files B (310) and C (311) are shown. Those lines indicate a relation where the application B (306) issues I/O to the files B (310) and C (311) (i.e., access to the files B (310) and C (311)). A line for interconnecting the file B (310) and the volume B (316) indicates a relation where an I/O load on the file B becomes reading or writing of the volume B.

While omitted in FIG. 3, a storage agent 118 is operated to obtain configuration information and statistics information of the storage A (322). Resources of which the storage agent 118 acquires information are at least composite logical volumes A (323) to C (325), virtual logical volumes A (326) to H (333), real logical volumes A (334) to D (337), pools A (338) to C (340), pool volumes A (341) to H (348), and array groups A (349) to F (354).

Each array group A (349) is logically one high-speed and highly reliable disk drive formed from a plurality of physical disks 360 by the function of the controller 163 of the storage system 131.

Each physical disk 360 is a storage device which includes a physical data storage area. Each physical disk 360 is, for example, a hard disk drive (HDD). However, the physical disk may be another storage system (e.g., semiconductor memory device such as flash memory, or optical disk device). The storage A (322) can include an optional number of physical disks 360. When physical storage areas run short, a physical disk 360 may be added.

The real volume A (334) and the pool volume A (341) and the like are logical disk drives of sizes created by dividing one array group through the function of the controller 163 of the storage system and suited to a purpose of the host server A (301) or the like. For the real volume A (334) and the pool volume A (341) and the like, the amount of storage areas equal to a defined capacity are reserved in the array group A (349) or the like during creation.

As in the case of the real volume A (334), the virtual volume A (326) or the like is recognized as a logical disk drive by the host server A (301) or the like through the function of the virtual volume management control module 136 of the storage system 131. However, different from the real volume A (334), only a capacity is defined at the time of creating the virtual volume A (326) or the like, while no storage area equal in amount to the defined capacity is reserved. Then, when an I/O request to the virtual volume A (326) or the like is issued, a necessary amount of storage areas is allocated.

The pool A (338) or the like is for allocating a storage area to the virtual volume A (326), and defined as a group of pool volumes A (341).

The composite volume A (323) or the like is a logical disk drive created from the plurality of virtual volumes A (326) or real volumes A (334) through the function of the controller 163 of the storage system. The host server A (301) or the like recognizes one composite volume A (323) or the like as one logical disk drive.

The volume A (315) of the host server A (301) or the like is allocated to a logical volume (namely, real volume A (334) or virtual volume A (326), or a composite volume A (323)) of the storage A (322). A dependency between the volume A (315) and the logical volume can be obtained from the host agent 114. When pieces of relation information between the two resources are connected, a so-called I/O path is obtained.

For example, the application A (305) issues an I/O to the file A (309), the file A (309) is reserved in the volume A (315), the volume A (315) is allocated to the composite volume A (323), the composite volume A (323) includes virtual volumes A (326) and B (327), the virtual volumes A (326) and B (327) are allocated to the pool A (338), and the pool A (338) includes pool volumes A (341) to D (344), the pool volumes A (341) and B (342) are allocated to the array group A (349), and the pool volumes C (343) and D (344) are allocated to the array group B (350).

In this case, an I/O load generated by the application A (305) is passed through a path from the file A (309) through the volume A (315), the composite volume A (323), the virtual volumes A (326) and B (327), the pool A (338), the pool volumes A (341) to D (344), and the array groups A (349) and B (350) to reach the physical disk 360.

As shown in FIG. 3, the plurality of array groups never include the same physical disk 360. One array group is never allocated to the plurality of pools. Further, one array group is never allocated to both of the pool and the real logical volume. Accordingly, no interference occurs in the physical volume 360 among an I/O to a virtual logical volume allocated to one pool, an I/O to a virtual logical volume allocated to another pool, and an I/O to a real logical volume. For example, no interference occurs in the physical disk 360 among an I/O to the virtual logical volume A (326) allocated to the pool A (338), an I/O to the virtual logical volume E (330) allocated to the pool B (339), and an I/O to the real logical volume A (334).

According to the embodiment, the three pools are separately used as follows. First, when a virtual volume A (326) or the like is created, a storage area of the pool A (338) is allocated to the virtual volume A (326) or the like. Then, when a performance problem occurs in the pool A (338) or the virtual volume A (326) or the like of the pool A (338), to solve the problem, one of the virtual volumes A (326) and the like of the pool A (338) in which an overload or performance deterioration has occurred is migrated to another pool. Specifically, a migration destination of the overload virtual volume A (326) or the like is a pool B (339), and a migration destination of the performance-deteriorated virtual volume A (326) or the like is a pool C (340).

For example, when performance of the virtual volume A (326) of the pool A (338) is deteriorated, by migrating the virtual volume A (326) to the pool C (340), interference of an I/O to the virtual volume A (326) with an I/O to the virtual volume B (327) of the pool A (338) is prevented in the physical disk 360. Accordingly, there is a possibility that the deteriorated performance of the virtual volume A (326) will be recovered.

Alternatively, when an overload occurs in the virtual volume A (326) of the pool A (338), there is a possibility that this overload will cause performance deterioration of the virtual volume A (326) itself or the other virtual volume B (327) of the pool A (338). In this case, by migrating the virtual volume A (326) to the pool B (339), interference of an I/O to the virtual volume A (326) with an I/O to the virtual volume B (327) is prevented in the physical disk 360. Accordingly, there is a possibility that the deteriorated performance of the virtual volume B (327) will be recovered (or performance deterioration of the virtual volume B (327) will be prevented).

In the above case, by converting the virtual volume A (326) in which the performance problem has occurred into a real logical volume, I/O interference can be prevented in the physical disk 360. Thus, through the conversion into the real logical volume, there is a possibility that the deteriorated performance will be recovered (or performance deterioration will be prevented).

Similarly, for example, when a performance problems has occurred in the virtual volume E (330) or the virtual volume G (332) of the pool B (339) or the pool C (340), there is a possibility that the problem will be solved by converting the virtual volume E (330) or the virtual volume G (332) of the pool in which an overload or performance deterioration has occurred into a real logical volume.

A process of solving the performance problem will be described in detail below referring to FIG. 4 and after.

FIG. 3 shows an example where each of the pools A (338) to C (340) includes the physical disk 360 of the storage A (322). However, the pool may include a physical disk (not shown) of a storage system (not shown) other than the storage A (322) connected to the storage A (322). For example, a pool (not shown) created by a physical disk of a storage system (not shown) other than the storage A (322) may be mapped in the pool A (338) or the like.

FIG. 4 is an explanatory diagram showing an example of a screen displayed by the volume list display module 211 according to the embodiment of this invention.

Specifically, FIG. 4 shows an example of a screen displayed in a display device 170 of the performance management client 104 according to an instruction from the volume list display module 211.

A display screen 401 displayed in the display device 170 includes a date and time display field 402, a virtual volume display field 403, a pool display field 404, a countermeasure display field 405, and a migration destination pool display field 420. As shown in FIG. 4, lines of the virtual volume display field 403, the pool display field 404, and the countermeasure display field 405 correspond to one another to be displayed.

The date and time display field 402 displays a date and time for obtaining information included in the display screen 401. A value of the date and time corresponds to a value stored in a date and time storage field 1302 of a volume statistics information table 1301 described below referring to FIG. 13.

The virtual volume display field 403 displays information regarding the virtual logical volume A (326) or the like in which the performance problem has occurred. The virtual volume display field 403 includes a number display field 406, a response time display field 407, an IOPS display field 408, a transfer rate display field 409, a capacity display field 410, a used amount display field 411, and a status display field 412.

The number display field 406 displays a logical volume number assigned to the virtual logical volume in which the performance problem has occurred. The logical volume number will be described below referring to FIG. 8.

The response time display field 407 displays I/O response time (second) measured on a date and time indicated by the date and time display field 402 in the virtual logical volume in which the performance problem has occurred. This value is read out from the I/O response time storage field 1304 of the volume statistics information table 1301. According to the embodiment, response time is used as an index indicating performance of the virtual logical volume.

The IOPS display field 408 displays the number of I/O times per unit time (IO/second) measured on the date and time indicated by the date and time display field 402 in the virtual logical volume in which the performance problem has occurred. This value is read out from the IOPS storage field 1305 of the volume statistics information table 1301.

The transfer rate display field 409 displays a transfer rate (megabyte/second) measured on the date and time indicated by the date and time display field 402 in the virtual logical volume in which the performance problem has occurred. This value is read out from the transfer rate storage field 1306 of the volume statistics information table 1301. According to the embodiment, the IOPS and the transfer rate are used as indexes indicating a load of the virtual logical volume.

The capacity display field 410 displays a capacity (MB) defined for the virtual logical volume in which the performance problem has occurred. This value is read out from a defined capacity storage field 805 of the logical volume table 801 described below referring to FIG. 8.

The used amount display field 411 displays a ratio (%) of a capacity actually used with respect to the capacity defined for the virtual logical volume in which the performance problem has occurred. This value is calculated from values stored in the used capacity storage field 1307 of the volume statistics information table 1301 and the defined capacity storage field 805 of the logical volume table 801.

The status display field 412 displays a status of the virtual logical volume in which the performance problem has occurred (specifically, type of the performance problem). The status displayed here is judged based on the value displayed in the response time display field 407, the IOPS display field 408 or the transfer rate display field 409, and a corresponding threshold value referring to later described control information table 1501 of FIG. 15.

In the example shown in FIG. 4, the number display field 406, the response time display field 407, the IOPS display field 408, the transfer rate display field 409, the capacity display field 410, the used amount display field 411, and the status display field 412 of the first line of the virtual volume display field 403 respectively display "05", "0.30", "1.2", "5.8", "10,000", "73.8" and "PERFORMANCE DETERIORATION". In this case, the response time "0.30" second of the virtual logical volume to which the logical volume number "05" has been assigned is larger than "0.20" stored in the I/O response time threshold value for volume performance deterioration judgment storage field 1502 of the control information table 1501. Accordingly, performance deterioration is judged to have occurred. As shown in the logical volume table 801, the logical volume number "05" is assigned to the virtual logical volume B (327).

The pool display field 404 displays information regarding the pool A (338) or the like to which the virtual logical volume A (326) or the like with the performance problem belongs (in other words, pool A (338) or the like to which the virtual logical volume A (326) is allocated). The pool display field 404 includes a name display field 413, a response time display field 414, an IOPS display field 415, a transfer rate display field 416, and a status display field 417.

The name display field 413 displays a name (or an identifier) of a pool to which the virtual logical volume with the performance problem belongs.

The response time display field 414 displays I/O response time (second) measured on a date and time indicated by the date and time display field 402 in the pool to which the virtual logical volume with the performance problem belongs. This value is read out from the I/O response time storage field 1404 of the pool statistics information table 1401.

The IOPS display field 415 displays the number of I/O times per unit time (IO/s) measured on the date and time indicated by the date and time display field 402 in the pool to which the virtual logical volume with the performance problem belongs. This value is read out from the IOPS storage field 1405 of the pool statistics information table 1401.

The transfer rate display field 416 displays a transfer rate (megabyte/second) measured on the date and time indicated by the date and time display field 402 in the pool to which the virtual logical volume with the performance problem belongs. This value is read out from the transfer rate storage field 1406 of the pool statistics information table 1401.

The status display field 417 displays a status of the pool to which the virtual logical volume with the performance problem belongs (specifically, type of the generated performance problem). The status displayed here is judged based on the value displayed in the response time display field 414, the IOPS display field 415 or the transfer rate display field 416, and a corresponding threshold value described below referring to FIG. 15.

In the example shown in FIG. 4, the name display field 413, the response time display field 414, the IOPS display field 415, the transfer rate display field 416, and the status display field 417 of the first line of the pool display field 404 respectively display "A", "0.13", "8.7", "48.3", and "NORMAL". This line corresponds to the first line of the virtual volume display field 403. In this case, the virtual logical volume B (327) to which the logical volume number "05" has been assigned belongs to the pool A (338). The response time, the IOPS and the transfer rate of the pool A (338) do not exceed values stored in the I/O response time threshold value for pool performance deterioration judgment storage field 1505, the IOPS threshold value for pool overload judgment storage field 1506, and the transfer rate threshold value for pool overload judgment storage field 1507 of the control information table 1501. Accordingly, the virtual logical volume B (327) is judged to be normal.

The countermeasure display field 405 displays a method or the like estimated to be useful for solving the generated performance problem. The countermeasure display field 405 includes a problem solving measure display field 418 and an execution button 419.

The problem solving measure display field 418 displays a method (in other words, problem solving measure) estimated to be useful for solving the generated performance problem. To solve a performance problem of one virtual logical volume, a plurality of problem solving measures may be displayed in the problem solving measure display field 418. Values displayed in the problem solving measure display field 418 are read out from a countermeasure type storage field 1603 and a countermeasure parameter storage field 1604 of the select volume table 1601 described below.

The execution button 419 is displayed for each problem solving measure so that the user can instruct execution of the displayed problem solving measure. The user can instruct the execution of the problem solving measure by operating the execution button 419 using an input device (not shown) of the performance management client 104.

In the example shown in FIG. 4, the problem solving measure display field 418 of the first line of the countermeasure display field 405 displays "MIGRATE TO POOL C". This line corresponds to the first lines of the virtual volume display field 403 and the pool display field 404. In this case, migration of the virtual logical volume B (327) to the pool C (340) is displayed as a solving measure of performance deterioration which has occurred in the virtual logical volume B (327).

For example, when the user operates the execution button 419 corresponding to "MIGRATE TO POOL C", an instruction of migrating the virtual logical volume B (327) to the pool C (340) is transmitted from the performance management client 104 to the performance management server 110. The performance management software 120 executes processing according to the instruction. Step 2602 shown in FIG. 26 will be described below.

The migration destination pool display field 420 displays information regarding a pool designated as a migration destination by the problem solving measure displayed in the countermeasure display field 405. In the countermeasure display field 405, when no pool is designated as a migration destination, the migration destination display field 420 does not need to be displayed. The migration destination pool display field 420 includes a name display field 421, a response time display field 422, an IOPS display field 423, a transfer rate display field 424, a status display field 425, and a free capacity display field 426.

The name display field 421 displays a name (or an identifier) of a pool designated as a migration destination by the problem solving measure displayed in the countermeasure display field 405.

The response time display field 422 displays I/O response time second measured on a date and time indicated by the date and time display field 402 in the designated pool. This value is read out from the I/O response time storage field 1404 of the pool statistics information table 1401.

The IOPS display field 423 displays the number of I/O times (IO/s) per unit time measured on the date and time indicated by the date and time display field 402 in the designated pool. This value is read out from the IOPS storage field 1405 of the pool statistics information table 1401.

The transfer rate display field 424 displays a transfer rate (megabyte/second) measured on the date and time indicated by the date and time display field 402 in the designated pool. This value is read out from the transfer rate storage field 1406 of the pool statistics information table 1401.

The status display field 425 displays a status of the designated pool (specifically, type of the generated performance problem). The status displayed here is judged based on the value displayed in the response time display field 422, the IOPS display field 423 or the transfer rate display field 424, and a corresponding threshold value described below referring to FIG. 15.

The free capacity display field 426 displays a free capacity of a designated pool. The free capacity of the designated pool is calculated based on a defined capacity of the designated pool and a capacity used by a virtual logical volume belonging to the designated pool. The defined capacity of the designated pool can be calculated based on a pool/pool volume relation table 1201 and the logical volume table 801 described below. The capacity used by the virtual logical volume belonging to the designated pool can be calculated based on a virtual logical volume/pool relation table 1101 and the volume statistics information table 1301 described below.

In the example shown in FIG. 4, the migration destination display field 420 displays information regarding the pool C (340). This is because a first line of the countermeasure displayed field 405 displays "MIGRATE TO POOL C". The user can judge whether to migrate the virtual logical volume B (327) to the pool C (340) based on values shown in the name display field 421, the response time display field 422, the IOPS display field 423, the transfer rate display field 424, the status display field 425, and the free capacity display field 426.

For example, when at least one of the values displayed in the response time display field 422, the IOPS display field 423, and the transfer rate display field 424 exceeds a threshold value stored in the control information table 1501, when a value other than "NORMAL" is displayed in the status display field 425, or when a value exceeding a predetermined threshold value is displayed in the free capacity display field 426, the user may judge that the virtual logical volume B (327) is not to be migrated to the pool C (340).

Next, referring to FIGS. 5 to 10, examples of a table configuration and a table structure of the inter-resource relation information 209 used by the performance management software 120 will be described. The inter-resource relation information 209 includes an application/file relation table 501, a file/volume relation table 601, a volume/logical volume relation table 701, a logical volume table 801, a composite logical volume/element logical volume relation table 901, and a real logical volume/array group relation table 1001. Contents of those tables are created based on pieces of information collected from the application agent 112, the host agent 114, and the storage agent 118 by the agent information collection module 212.

FIG. 5 is an explanatory diagram showing an example of a structure of the application/file relation table 501 according to the embodiment of this invention.

The application/file relation table 501 records a performance dependency between an application and a file resource, and includes a host server identifier storage field 502, an application identifier storage field 503, and a file identifier storage field 504. Each line of the table corresponds to one dependency between an application and a file.

The host server identifier storage field 502 stores an identifier of each host server 106 or the like.

The application identifier storage field 503 stores an identifier of an application operated on each host server 106 or the like (in other words, application executed by the CPU 151 of each of the host servers 106 or the like).

The file identifier storage field 504 stores an identifier of a file to which each application issues an I/O.

In FIG. 5, for example, the host server identifier storage field 502, the application identifier storage field 503, and the file identifier storage field 504 of the first line of the table respectively store "HOST SERVER A", "APPLICATION A" and "FILE A". This indicates a relation where the application A (305) of the host server A (301) issues an I/O to the file A (309). Contents of the table are created based on pieces of information collected from the application agent 112 by the agent information collection module 212.

FIG. 6 is an explanatory diagram showing an example of a structure of the file/volume relation table 601 according to the embodiment of this invention.

The file/volume relation table 601 records a relation between a file and a volume to which the file is allocated, and includes a host server identifier storage field 602, a file identifier storage field 603, and a volume identifier storage field 604. Each line of the table corresponds to one relation for allocating a file and a volume.

The host server identifier storage field 602 stores an identifier of each host server.

The file identifier storage field 603 stores an identifier of each host server.

The volume identifier storage field 604 stores an identifier of a volume to which each file is allocated.

In FIG. 6, for example, the host server identifier storage field 602, the file identifier storage field 603, and the volume identifier storage field 604 of the first line of the table respectively store "HOST SERVER A", "FILE A" and "VOLUME A". This indicates a relation where the file A (309) of the host server A (301) is allocated to the volume A (315). Contents of the table are created based on pieces of information collected from the host agent 114 by the agent information collection module 212.

FIG. 7 is an explanatory diagram showing an example of a structure of the volume/logical volume relation table 701 according to the embodiment of this invention.

The volume/logical volume relation table 701 records a relation between a volume of a host server side and a logical volume of the storage system side to which the volume is allocated, and includes a host server identifier storage field 702, a volume identifier storage field 703, and a logical volume number storage field 704. Each line of the table corresponds to one relation for allocating a volume and a logical volume.

The host server identifier storage field 702 stores an identifier of each host server.

The volume identifier storage field 703 stores an identifier of a volume on each host server.

The logical volume number storage field 704 stores a logical volume number assigned to a logical volume to which each volume is allocated.

In FIG. 7, for example, the host server identifier storage field 702, the volume identifier storage field 703, and the logical volume number storage field 704 of the first line of the table respectively store "HOST SERVER A", "VOLUME A" and "01". As described below referring to FIG. 8, the logical volume number "01" is assigned to a composite logical volume A (323). Accordingly, the first line indicates a relation where the volume A (315) of the host server A (301) is allocated to the composite logical volume A (323). Contents of the table are created based on pieces of information collected from the host agent 114 by the agent information collection module 212.

FIG. 8 is an explanatory diagram showing an example of a structure of the logical volume table 801 according to the embodiment of this invention.

The logical volume table 801 records an attribute of each logical volume (in other words, real logical volume, virtual logical volume, composite logical volume, or pool volume) in the storage A (322). The logical volume table 801 includes a logical volume identifier storage field 802, a volume type storage field 803, a logical volume number storage field 804, a defined capacity storage field 805, and a use status storage field 806. Each line of the table corresponds to one logical volume.

The logical volume identifier storage field 802 stores an identifier of a logical volume.

The volume type storage field 803 stores a code indicating a type of a logical volume. The type code is one selected from "COMPOSITE" indicating a composite logical volume, "VIRTUAL" indicating a virtual logical volume, "REAL" indicating a real logical volume, and "POOL" indicating a pool volume.

The logical volume number storage field 804 stores a logical volume number assigned to each logical volume. The logical volume number is a number designated as access destination by each of the host servers A (301) to D (304). The controller 163 of the storage A (322) refers to the logical volume number storage field 804 and the logical volume identifier storage field 802 to specify a logical volume designated as an access destination, and to execute access to the specified logical volume.

The defined capacity storage field 805 stores a value indicated by a capacity defined for each logical volume.

The use status storage field 806 stores a value indicating a use status of each logical volume. For example, the use status storage field 806 stores "USED" or "UNUSED". "USED" indicates that the logical volume is being used by any one of the host server A (301) or the like. "UNUSED" indicates that the logical volume is not being used by any host server A (301) or the like. For example, in FIG. 3, the real logical volumes B (335) and C (336) are not allocated to any host servers A (301). In this case, "UNUSED" is stored in the use status storage field 806 corresponding to the real logical volumes B (335) and C (336). A use status of a logical volume designated as a migration destination needs to be "UNUSED". After migration, the use status of the migration destination is changed to "USED".

In the example of FIG. 8, the logical volume identifier storage field 802, the volume type storage field 803, the logical volume number storage field 804, the defined capacity storage field 805, and the use status storage field 806 of the first line of the table respectively store "COMPOSITE LOGICAL VOLUME A", "COMPOSITE", "01", "20,000" and "USED". This indicates that a capacity of 20,000 megabytes (MB) is defined for the composite logical volume A (323), the composite logical volume A (323) is a currently used composite logical volume, and when a logical volume number "01" is designated as an access destination, the access is executed to the composite logical volume A (323).

FIG. 9 is an explanatory diagram showing an example of a structure of the composite logical volume/element logical volume relation table 901 according to the embodiment of this invention.

The composite logical volume/element logical volume relation table 901 records a relation between a composite logical volume A (323) or the like and a logical volume constituting the same. The composite logical volume/element logical volume relation table 901 includes a logical volume identifier storage field 902, and a logical volume number storage field 903.

The logical volume identifier storage field 902 stores an identifier of each composite logical volume A (323) or the like.

The logical volume number storage field 903 stores a logical volume number assigned to the logical volume constituting the composite logical volume A (323) or the like.

In the example of FIG. 9, "COMPOSITE LOGICAL VOLUME A" is stored in both of the logical volume identifier storage fields 902 of the first and second lines. On the other hand, "04" and "05" are respectively stored in the logical volume number storage fields 903 of the first and second lines. This indicates that the composite logical volume A (323) includes two logical volumes to which the logical volume numbers "04" and "05" are assigned. In FIG. 8, logical volume numbers "04" and "05" are respectively assigned to the virtual logical volumes A (326) and B (327). Accordingly, the composite logical volume A (323) includes the virtual logical volumes A (326) and B (327) shown in FIG. 3.

FIG. 10 is an explanatory diagram showing an example of a structure of the real logical volume/array group relation table 1001 according to the embodiment of this invention.

The real logical volume/array group relation table 1001 records a relation between a real logical volume A (334) or a pool volume A (341) or the like and an array group A (349) or the like including the same. The real logical volume/array group relation table 1001 includes a logical volume identifier storage field 1002 and an array group identifier storage field 1003.

The logical volume identifier storage field 1002 stores an identifier of a real logical volume A (334) or a pool volume A (341) or the like.

The array group identifier storage field 1003 stores an identifier of an array group A (349) or the like including each of the real logical volume A (334) or the pool volume A (341) or the like.

In the example of FIG. 10, the logical volume identifier storage field 1002 and the array group identifier storage field 1003 of the first line respectively store "REAL VOLUME A" and "ARRAY GROUP E". This indicates that a part of storage areas included in the array group E (353) is allocated as a real logical volume A (334).

Next, referring to FIGS. 11 and 12, examples of a table configuration and a table structure of the pool configuration information 208 will be described.

FIGS. 11 and 12 show examples of the table configuration and a table structure of the pool configuration information 208 used by the performance management software 120. The pool configuration information 208 includes a virtual logical volume/pool relation table 1101 and a pool/pool volume relation table 1201. Contents of those tables are created based on pieces of information collected from the storage agent 118 by the agent information collection module 212.

FIG. 11 is an explanatory diagram showing an example of a structure of the virtual logical volume/pool relation table 1101 according to the embodiment of this invention.

The virtual logical volume/pool relation table 1101 records a relation between a virtual logical volume and a pool to which the virtual logical volume is allocated, and includes a logical volume identifier storage field 1102 and a pool identifier storage field 1103. Each line of the table corresponds to one relation between a virtual logical volume and pool allocation.

The logical volume identifier storage field 1102 stores an identifier of each of a virtual logical volume A (326) or the like.

The pool identifier storage field 1103 stores an identifier of a pool A (338) or the like to which the virtual logical volume A (326) or the like is allocated.

In FIG. 11, for example, the logical volume identifier storage field 1102 and the pool identifier storage field 1103 of the first line of the table respectively store "VIRTUAL LOGICAL VOLUME A" and "POOL A". This indicates that the virtual logical volume A (326) is allocated to the pool A (338).

FIG. 12 is an explanatory diagram showing an example of a structure of the pool/pool volume relation table 1201 according to the embodiment of this invention.

The pool/pool volume relation table 1201 records a relation between a pool A (338) or the like and a pool volume A (341) or the like allocated thereto. The pool/pool volume relation table 1201 includes a pool identifier storage field 1202 and a logical volume identifier storage field 1203.

The pool identifier storage field 1202 stores an identifier of a pool A (338) or the like.

The logical volume identifier storage field 1203 stores an identifier of a pool volume A (341) or the like allocated to each of the pool A (338) or the like.

In the example of FIG. 12, "POOL A" is stored in the pool identifier storage fields 1202 of the first to fourth lines. On the other hand, the logical volume identifier storage fields 1203 of the first to fourth lines respectively store "POOL VOLUME A", "POOL VOLUME B", "POOL VOLUME C" and "POOL VOLUME D". This indicates that the pool volume A (341), the pool volume B (342), the pool volume C (343), and the pool volume D (344) are allocated to the pool A (338).

Next, referring to FIG. 13, examples of a table configuration and a table structure of the volume statistics information 204 used by the performance management software 120 will be described. The volume statistics information 204 includes a volume statistics information table 1301.

FIG. 13 is an explanatory diagram showing an example of a structure of the volume statistics information table 1301 according to the first embodiment of this invention.

The volume statistics information table 1301 records a statistical value of a virtual logical volume measured by predetermined timing (e.g., predetermined cycle), and created based on pieces of information collected from the storage agent 118 by the agent information collection module 212. The volume statistics information table 1301 includes a date and time storage field 1302, a logical volume identifier storage field 1303, an I/O response time storage field 1304, an IOPS storage field 1305, a transfer rate storage field 1306, and a used capacity storage field 1307. Each line of the volume statistics information table 1301 displays a statistical value of each virtual logical volume on a certain date and time.

The date and time storage field 1302 stores a date and time of collecting statistical values.

The logical volume identifier storage field 1303 stores an identifier of a virtual logical volume which is a statistical value collection target.

The I/O response time storage field 1304 stores collected values of I/O response time.

The IOPS storage field 1305 stores collected values of IOPS (number of I/O times per second).

The transfer rate storage field 1306 stores collected values of transfer rates.

The used capacity storage field 1307 stores collected values of used capacities.

In the example shown in FIG. 13, the fields 1302 to 1307 of the first line of the table respectively store "2007/04/07 10:34:00", "VIRTUAL LOGICAL VOLUME A", "0.04", "9.5", "27.1", and "10,000". This indicates that at 10:34 on Apr. 7, 2007, 0.04 (seconds) is obtained as a value of I/O response time, 9.5 (IO times/seconds) is obtained as an IOPS value, 27.1 (megabyte/seconds) is obtained as a value of a transfer rate, and 10,000 (MB) is obtained as a value of a used capacity regarding the virtual logical volume A (326).

Next, referring to FIG. 14, examples of a table configuration and a table structure of the pool statistics information 201 used by the performance management software 120 will be described. The pool statistics information 201 includes a pool statistics information table 1401.

FIG. 14 is an explanatory diagram showing an example of a structure of the pool statistics information table 1401 according to the first embodiment of this invention.

The pool statistics information table 1401 records a statistical value of a pool calculated based on a statistical value of a virtual logical volume, and includes contents calculated by the pool performance/load calculation module 202 based on contents of the volume statistics information table 1301 and the virtual logical volume/pool relation table 1101. For example, I/O response time, IOPS and a transfer rate of a pool are calculated by averaging (or totaling) I/O response time, IOPS, and transfer rates of all the virtual logical volumes belonging to the pool. The pool statistics information table 1401 includes a date and time storage field 1402, a pool identifier storage field 1403, an I/O response time storage field 1404, an IOPS storage field 1405, and a transfer rate storage field 1406. Each line of the pool statistics information table 1401 displays a statistical value of each pool at a certain date and time.

The date and time storage field 1402 stores a date and time of collecting statistical values.

The pool identifier storage field 1403 stores an identifier of a pool.

The I/O response time storage field 1404 stores a calculated value of I/O response time.

The IOPS storage field 1405 stores a calculated value of IOPS.

The transfer rate storage field 1406 stores a calculated value of a transfer rate.

In the example shown in FIG. 14, the first line of the table stores "2007/04/07 10:34:00", "POOL A", "0.06, "12.4", and "25.2". This indicates that based on pieces of information collected from 10:34 on Apr. 7, 2007, 0.06 (seconds) is calculated as a value of I/O response time, 12.4 (IO times/seconds) is calculated as an IOPS value, and 25.2 (megabyte/seconds) is calculated as a value of a transfer rate regarding the pool A (338).

Next, control information 205 used by the performance management software 120 will be described. The control information 205 includes a control information table 1501.

FIG. 15 is an explanatory diagram showing an example of a structure of the control information table 1501 according to the embodiment of this invention.

The control information table 1501 records information (e.g., threshold value to which the performance management software 120 refers to execute various judgments) to which the performance management software 120 refers to execute various types of control, and includes storage fields 1502 to 1513 described below. The user definition module 206 of the performance management software 120 stores information in the control information table 1501 according to a request from the performance management client 104.

The I/O response time threshold value for volume performance deterioration judgment storage field 1502 stores a threshold value of I/O response time used for judging whether performance of a virtual logical volume has deteriorated. In the example shown in FIG. 15, a virtual logical volume in which I/O response time exceeds 0.20 (seconds) is judged to have been deteriorated in performance.

The IOPS threshold value for volume overload judgment storage field 1503 stores a threshold value of IOPS used for judging whether a virtual logical volume is in an overload state. In the example shown in FIG. 15, a virtual logical volume in which IOPS exceeds 14.0 (IO times/seconds) is judged to have been in an overload state.

The transfer rate threshold value for volume overload judgment storage field 1504 stores a threshold value used for judging whether a virtual logical volume is in an overload state. In the example shown in FIG. 15, a virtual logical volume in which a transfer rate exceeds 70.0 (megabyte/seconds) is judged to be in an overload state.

The I/O response time threshold value for pool performance deterioration judgment storage field 1505 stores a threshold value of I/O response time used for judging whether performance of a pool has deteriorated. In the example shown in FIG. 15, a pool A (338) or the like in which I/O response time exceeds 0.15 (seconds) is judged to have been deteriorated in performance.

The IOPS threshold value for pool overload judgment storage field 1506 stores a threshold value of IOPS used for judging whether a pool is in an overload state. In the example shown in FIG. 15, a pool A (338) or the like in which IOPS exceeds 12.0 (IO times/seconds) is judged to be in an overload state.

The transfer rate threshold value for pool overload judgment storage field 1507 stores a threshold value used for judging whether a pool is in an overload state. In the example shown in FIG. 15, a pool A (338) or the like in which a transfer rate exceeds 60.0 (megabyte/seconds) is judged to be in an overload state.

The I/O response time threshold value for performance deterioration volume selection storage field 1508 stores a threshold value of I/O response time used for selecting a virtual logical volume as a target of a measure for solving a performance problem which has occurred in a virtual logical volume or a pool. In the example shown in FIG. 15, a logical volume in which I/O response time exceeds 0.20 (seconds) is selected as a target of measure for solving the performance problem.

The IOPS threshold value for overload volume selection storage field 1509 stores a threshold value of IOPS used for selecting a virtual logical volume as a target of a measure for solving a performance problem which has occurred in a virtual logical volume or a pool. In the example shown in FIG. 15, a logical volume in which IOPS exceeds 14.0 (IO times/seconds) is selected as a target of measure for solving the performance problem.

The transfer rate threshold value for overload volume selection storage field 1510 stores a threshold value of a transfer rate used for selecting a virtual logical volume as a target of a measure for solving a performance problem which has occurred in a virtual logical volume or a pool. In the example shown in FIG. 15, a logical volume in which a transfer rate exceeds 70.0 (megabyte/seconds) is selected as a target of measure for solving the performance problem.

The minimum volume filling rate storage field 1511 stores a minimum volume filling rate. The minimum volume filling rate is used as a threshold value of a filling rate of a virtual logical volume. The filling rate of the virtual logical volume is a ratio of an actually used capacity with respect to a capacity defined for the virtual logical volume. Specifically, a filling rate of a virtual logical volume A (326) or the like is calculated by dividing a value stored in the used capacity storage field 1307 of the volume statistics information table 1301 with a value stored in the defined capacity storage field 805.

As described below in detail, as one of measures to solve the performance problem generated in the virtual logical volume, the virtual logical volume may be converted into a real logical volume. However, while only a storage area equivalent to an actually used capacity among defined capacities is allocated in the virtual logical volume, storage areas equivalent to all the defined capacities are allocated in the real logical volume irrespective of use or nonuse. Accordingly, an advantage of the virtual logical volume that storage areas are efficiently used is lost by converting the virtual logical volume into a real logical volume. The lower a filling rate of the virtual logical volume is, the greater a loss of the advantage by the conversion of the virtual logical volume into the real logical volume is.

Figure 19:
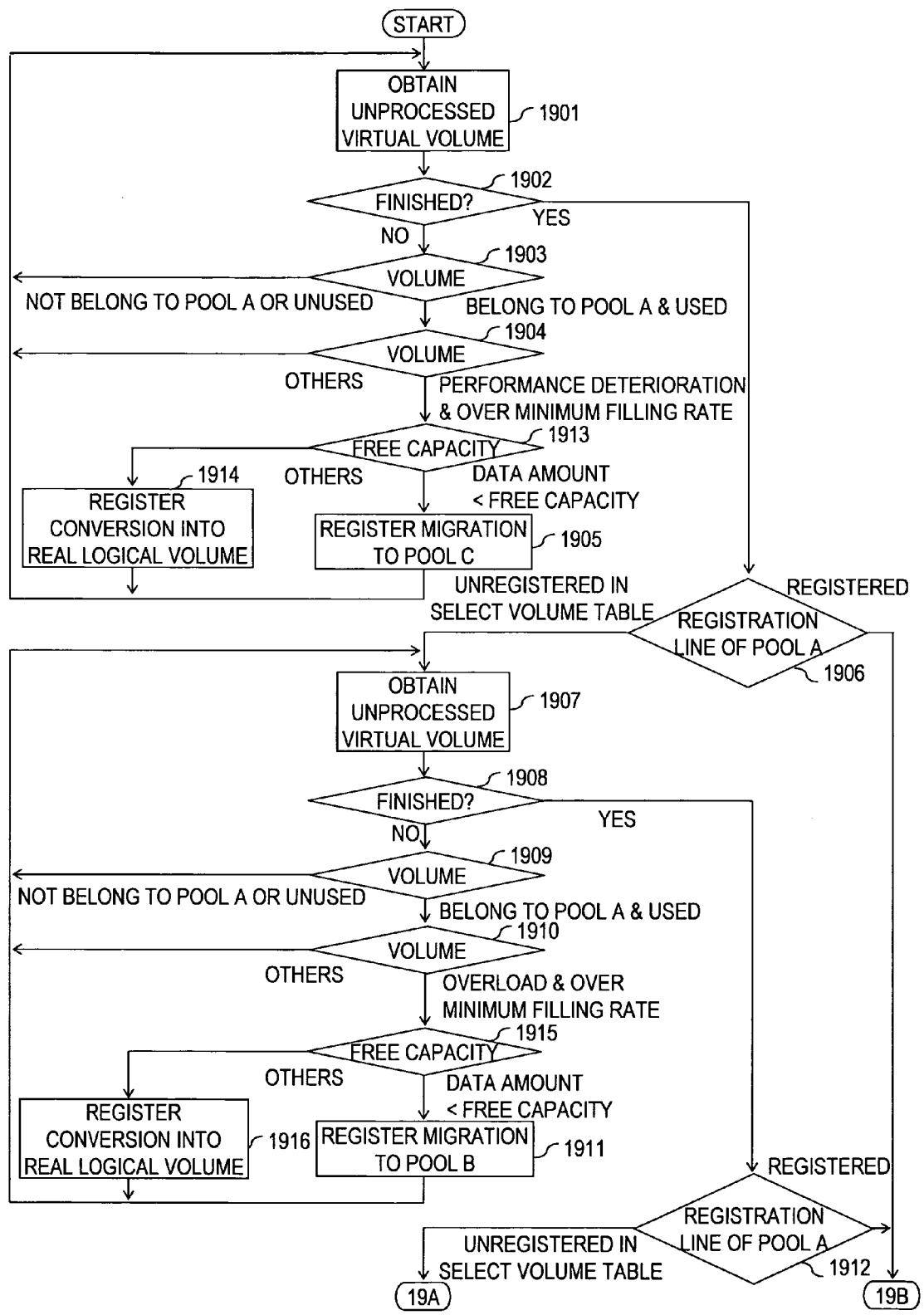
FIG. 19 is a second part of the flowchart showing the processing procedure of the volume selection module included in the performance management software according to the embodiment of this invention.

Thus, as described below in detail, among the virtual logical volumes with performance problems, the one whose filling rate exceeds the minimum volume filling rate is preferentially selected as a target of a measure of solving the performance problem as shown in FIG. 19. In the example of FIG. 15, a virtual logical volume whose filling rate exceeds 70.0(%) is preferentially selected as a target of a measure of solving the performance problem.

The operation mode storage field 1512 stores codes indicating operation modes of the performance management software 120. The codes indicating the operation modes include "AUTOMATIC" and "MANUAL". If the operation mode is "MANUAL", the performance management software 120 displays information indicating a measure of solving the performance problem (e.g., occurrence of performance deterioration or overload) of the virtual logical volume to the user and waits for an instruction from the user. Upon reception of an instruction of executing the measure from the user, the performance management software 120 executes the instructed measure. On the other hand, if the operation mode is "AUTOMATIC", the performance management software 120 automatically executes the measure of solving the performance problem of the virtual logical volume.

The search mode storage field 1513 stores codes indicating search modes of the volume selection module 207 of the performance management software 120. The codes of the search mode include "SERVER", "APPLICATION", and "SINGLE".

The search modes will be described. As described below, to solve the performance problem of the virtual logical volume, the performance management software 120 migrates a virtual logical volume to another pool, or executes a measure of converting the virtual logical volume into a real logical volume or the like. One host server or one application may issue I/O to a plurality of virtual logical volumes. When a performance problem occurs in one of the plurality of virtual logical volumes, the same measure is executed for all the plurality of virtual logical volumes, whereby the performance problem is expected to be solved more reliably.

If the search mode is "SINGLE", only a virtual logical volume in which a performance problem has occurred is selected as a target of a measure of solving the performance problem. If the search mode is "SERVER", the virtual logical volume in which the performance problem has occurred, and the other virtual logical volume used by the host server using the virtual logical volume in which the performance problem has occurred are selected as targets of the measure. If the search mode is "APPLICATION", the virtual logical volume in which the performance problem has occurred, and the other virtual logical volume used by an application using the virtual logical volume in which the performance problem has occurred are selected as targets of the measure.

Next, the select volume information 210 used by the performance management software 120 will be described. The select volume information 210 includes a select volume table 1601.

FIG. 16 is an explanatory diagram showing an example of a structure of the select volume table 1601 according to an embodiment of this invention.

The select volume table 1601 stores information indicating a measure of solving a performance problem of a virtual logical volume. The select volume table 1601 includes a logical volume identifier storage field 1602, a countermeasure type storage field 1603, and a countermeasure parameter storage field 1604.

The logical volume identifier storage field 1602 stores an identifier of a logical volume.

The countermeasure type storage field 1603 stores codes indicating countermeasure types of a performance problem. The type codes include "POOL MIGRATION" and "CONVERSION INTO REAL LOGICAL VOLUME". The "POOL MIGRATION" indicates a process of migrating a virtual logical volume (e.g., virtual logical volume A (326) or the like), in which a performance problem has occurred, from a pool (e.g., pool A (338)) to which the virtual logical volume belongs to another pool. The "CONVERSION INTO REAL LOGICAL VOLUME" indicates a process of migrating the virtual logical volume A (326) or the like in which the performance problem has occurred to a real logical volume A (334) or the like.

The countermeasure parameter storage field 1604 stores countermeasure parameters of a performance problem. Specifically, if a value of the countermeasure type storage field 1603 is "POOL MIGRATION", the countermeasure parameter storage field 1604 stores an identifier of a pool of a migration destination. On the other hand, if a value of the countermeasure type storage field 1603 is "CONVERSION INTO REAL LOGICAL VOLUME", the countermeasure parameter storage field 1604 is not used.

Next, referring to a flowchart, a process executed by the performance management software 120 will be described.

Figure 17:
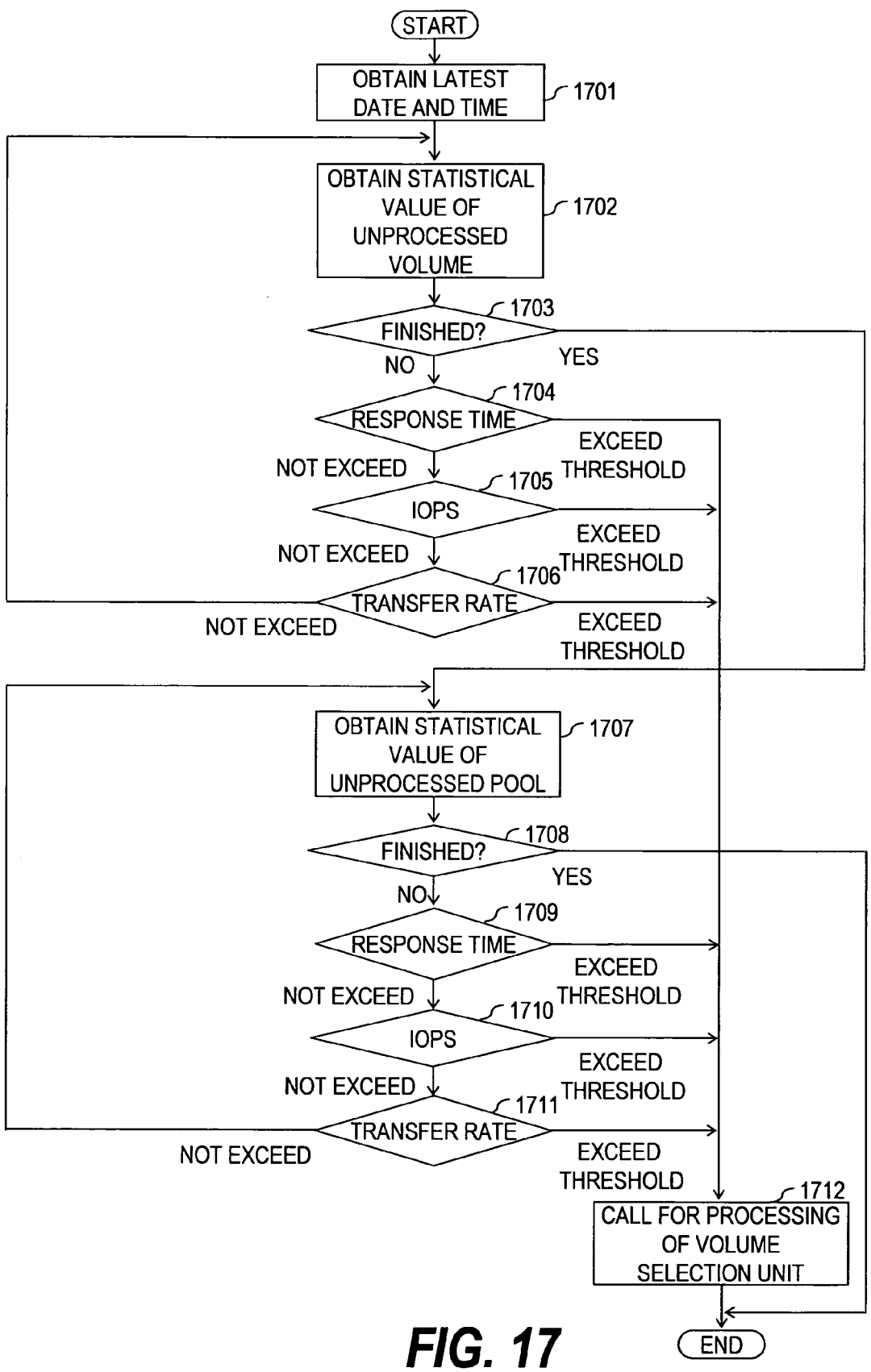
FIG. 17 is a flowchart showing a processing procedure of a performance deterioration/overload detection module included in a performance management software according to the embodiment of this invention.

FIG. 17 is a flowchart showing a processing procedure of the performance deterioration/overload detection module 203 included in the performance management software 120 according to an embodiment of this invention.

The processing procedure shown in FIG. 17 is started by predetermined timing. For example, the processing procedure of FIG. 17 is periodically started according to a set schedule by using a timer (not shown).

The process executed by the performance deterioration/overload detection module 203 of FIG. 17 is actually executed by the CPU 159 which executes the performance management software 120.

First, in Step 1701, the performance deterioration/overload detection module 203 obtains a latest date and time among values stored in the date and time storage field 1302 of the volume statistics information table 1301.

Next, in Step 1702, the performance deterioration/overload detection module 203 searches lines registered in the volume statistics information table 1301 sequentially from a head, obtains one line in which a value of the date and time storage field 1302 matches the latest date and time obtained in Step 1701, and proceeds to Step 1703.

In Step 1703, the performance deterioration/overload detection module 203 judges whether a line satisfying retrieving conditions of Step 1702 (i.e., line in which the value of the date and time storage field 1302 matches the latest date and time obtained in Step 1701) has been found. If it is judged that no line satisfying the retrieving conditions has been found, as processing regarding the volume statistics information table 1301 has been completed, the process proceeds to Step 1707.

On the other hand, if it is judged that a line satisfying the retrieving conditions has been found, the process proceeds to Step 1704.

In Step 1704, the performance deterioration/overload detection module 203 compares a value of the I/O response time storage field 1304 of the line found in Step 1702 with a value of the I/O response time threshold value for volume performance deterioration judgment storage field 1502 of the control information table 1501 so as to judge whether the former value exceeds the latter threshold value. If it is judged that the former value exceeds the latter threshold value (i.e., in the case of "EXCEED THRESHOLD" shown in FIG. 17), it is judged that performance deterioration has occurred in a relevant virtual logical volume, and therefore the process proceeds to Step 1712. In this case, the relevant virtual logical volume is a virtual logical volume A (326) or the like identified by the identifier stored in the logical volume identifier storage field 1303 of the line found in the retrieval in Step 1702.

On the other hand, if it is judged in Step 1704 that the former value does not exceed the latter threshold value (in the case of "NOT EXCEED" shown in FIG. 17), it is judged that no performance deterioration has occurred in the relevant virtual logical volume, and therefore the process proceeds to Step 1705. As a specific method of judging a threshold value exceeded status, the following first to fourth methods are available.

According to the first method, it is judged that a threshold value is exceeded when a current value of I/O response time is larger than the threshold value. On the other hand, it is judged that a threshold value is not exceeded when the current value of the I/O response time is not larger than the latter threshold value.

According to the second method, a value from the past to the present of the I/O response time is compared with the threshold value. As a result, if time that the I/O response time has continuously exceeded the threshold value exceeds a predetermined reference value, it is judged that a threshold value is exceeded. On the other hand, if the time that the I/O response time has continuously exceeded the threshold value does not exceed the predetermined reference value, it is judged that a threshold value is not exceeded.

According to the third method, a value from the past to the present of the I/O response time is compared with the threshold value. As a result, if a total of time that the I/O response time has exceeded the threshold value exceeds a predetermined reference value, it is judged that a threshold value is exceeded. On the other hand, if a total of time that the I/O response time has exceeded the threshold value does not exceed the prescribed reference value, it is judged that a threshold value is not exceeded.

According to the fourth method, a future transition is predicted based on a value from the past to the present of the I/O response time. It is judged that a threshold value is exceeded if time needed for a predicted value to exceed the threshold value is shorter than a predetermined reference value. On the other hand, it is judged that a threshold value is not exceeded if the time needed for the predicted value to exceed the threshold value is not shorter than the predetermined reference value.

Figure 24:
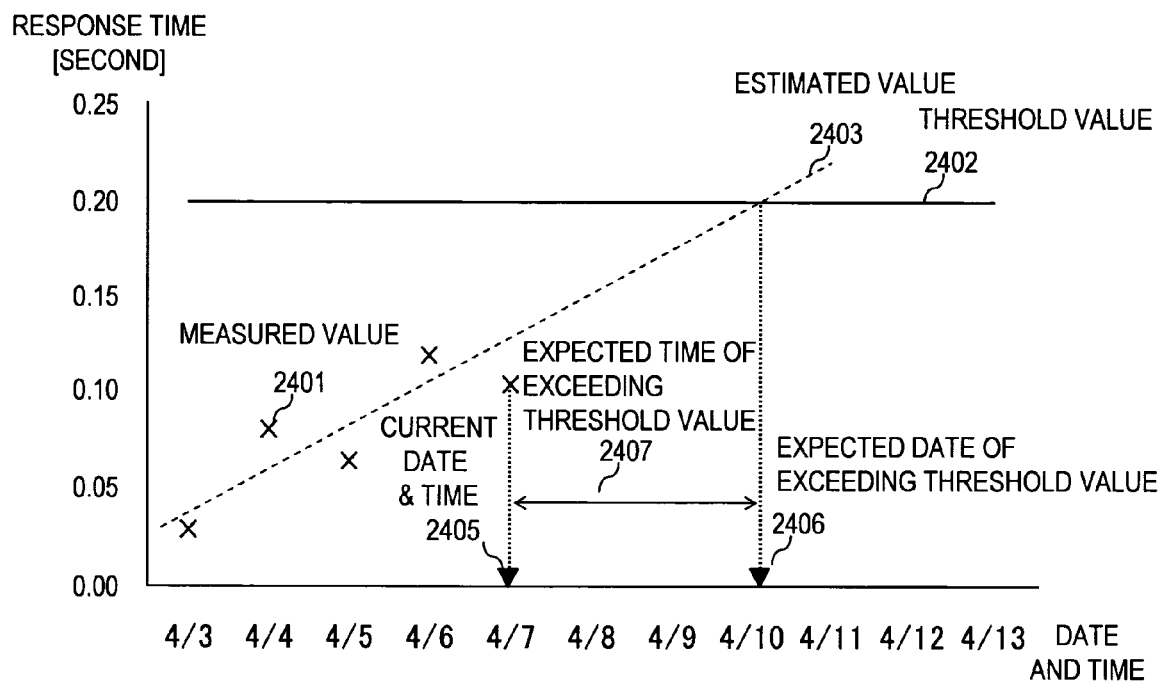
FIG. 24 is a diagram showing a method of judging performance deterioration executed according to an embodiment of this invention.

Referring to FIG. 24, the fourth judgment method will be described.

FIG. 24 is a diagram showing a method of judging performance deterioration executed according to an embodiment of this invention.

FIG. 24 is a graph where an abscissa indicates a date and time, and an ordinate indicates response time (seconds).

A measured value 2401 is an actual measurement value of I/O response time of a certain virtual logical volume (e.g., virtual logical volume A (326)). The measured value 2401 is measured a plurality of times (e.g., periodically) to be plotted in the graph.

A threshold value 2402 is a threshold value of I/O response time used for judging whether performance has deteriorated. According to the example of FIG. 15, "0.20 (seconds)" stored in the volume performance deterioration judgment I/O response time threshold value storage field 1502 is set as a threshold value 2402.

A predicted value 2403 is calculated based on the measured value 2401. In this case, any calculation method may be used. For example, the predicted value 2403 can be calculated by a well-known method such as a least square method.

A threshold value exceeding prediction date and time 2406 is a date and time when the predicted value 2403 exceeds the threshold value 2402. When the predicted value 2403 is on the increase as shown in the example of FIG. 24, a date when a broken line indicating the predicted value 2403 intersects a solid line indicating the threshold value 2402 corresponds to a threshold value exceeding prediction date and time 2406.

A threshold value exceeding prediction time 2407 is time from the current date and time 2405 to the threshold value exceeding prediction date and time 2406.

If the fourth method is used in Step 1704 of FIG. 17, it is judged whether the threshold value exceeding prediction time 2407 is lower than a predetermined reference value. If the threshold value exceeding prediction time 2407 is judged to be lower than the predetermined reference value, the state is judged as "EXCEED THRESHOLD". On the other hand, if the threshold value exceeding prediction time 2407 is judged not to be lower than the predetermined reference value, the state is judged as "NOT EXCEED" (threshold value is not exceeded).

Referring again to FIG. 17, the process of Step 1705 and after will be described.

In Step 1705, the performance deterioration/overload detection module 203 compares the value of the IOPS storage field 1305 of the line found in Step 1702 with the value of the IOPS threshold value for volume overload judgment storage field 1503 of the control information table 1501 so as to judge whether the former value exceeds the latter threshold value. If the former value is judged to exceed the latter threshold value, an overload is judged to have occurred in the relevant virtual logical volume, and thus the process proceeds to Step 1712. On the other hand, if it is judged that the former value does not exceed the latter threshold value, no overload is judged to have occurred in the relevant virtual logical volume. In this case, the process proceeds to Step 1706. As a specific method of judging a threshold value exceeded status, a method similar to that of Step 1704 is used. The description of the first to fourth methods of Step 1704 can be applied to Step 1705 by using "IOPS" in place of "I/O RESPONSE TIME".

In Step 1706, the performance deterioration/overload detection module 203 compares the value of the transfer rate storage field 1306 of the line found in Step 1702 with the value of the transfer rate threshold value for volume overload judgment storage field 1504 of the control information table 1501 so as to judge whether the former value exceeds the latter threshold value. If the former value is judged to exceed the latter threshold value, an overload is judged to have occurred in the relevant virtual logical volume, and thus the process proceeds to Step 1712. On the other hand, if it is judged that the former value does not exceed the latter threshold value, no overload is judged to have occurred in the relevant virtual logical volume. In this case, the process returns to Step 1702. As a specific method of judging a threshold value exceeded status, a method similar to that of Step 1704 is used. The description of the first to fourth methods of Step 1704 can be applied to Step 1706 by substituting "I/O RESPONSE TIME" with "TRANSFER RATE".

In Step 1707, the performance deterioration/overload detection module 203 searches lines registered in the pool statistics information table 1401 sequentially from a head, obtains one line in which a value of the date and time storage field 1402 matches the latest date and time of Step 1701, and proceeds to Step 1708.

In Step 1708, the performance deterioration/overload detection module 203 judges whether a line satisfying retrieving conditions of Step 1707 (line in which the value of the date and time storage field 1402 matches the latest date and time of Step 1701) has been found. If it is judged that no line satisfying the retrieving conditions has been found, it means that processing regarding the pool statistics information table 1401 has been completed, and therefore the process is finished. On the other hand, if it is judged that a line satisfying the retrieving conditions has been found, the process proceeds to Step 1709.

In Step 1709, the performance deterioration/overload detection module 203 compares a value of the I/O response time storage field 1404 of the line found in Step 1707 with a value of the I/O response time threshold value for pool performance deterioration judgment storage field 1505 of the control information table 1501 so as to judge whether the former value exceeds the latter threshold value. If it is judged that the former value exceeds the latter threshold value, it is judged that performance deterioration has occurred in a relevant pool, and the process proceeds to Step 1712. In this case, the relevant pool is a pool A (338) or the like identified by the identifier stored in the pool identifier storage field 1403 of the line found in the retrieval of Step 1707.

On the other hand, if it is judged in Step 1709 that the former value does not exceed the latter threshold value, it is judged that no performance deterioration has occurred in the relevant pool, and the process proceeds to Step 1710. As a specific method of judging a threshold value exceeded status, a method similar to that of Step 1704 is used.

In Step 1710, the performance deterioration/overload detection module 203 compares the value of the IOPS storage field 1405 of the line found in Step 1707 with the value of the IOPS threshold value for pool overload judgment storage field 1506 of the control information table 1501 so as to judge whether the former value exceeds the latter threshold value. If the former value is judged to exceed the latter threshold value, an overload is judged to have occurred in the relevant pool, and thus the process proceeds to Step 1712. On the other hand, if it is judged that the former value does not exceed the latter threshold value, no overload is judged to have occurred in the relevant pool. In this case, the process proceeds to Step 1711. As a specific method of judging a threshold value exceeded status, a method similar to that of Step 1704 is used.

In Step 1711, the performance deterioration/overload detection module 203 compares the value of the transfer rate storage field 1406 of the line found in Step 1707 with the value of the transfer rate threshold value for pool overload judgment storage field 1507 of the control information table 1501 so as to judge whether the former value exceeds the latter threshold value. If the former value is judged to exceed the latter threshold value, an overload is judged to have occurred in the relevant pool, and thus the process proceeds to Step 1712. On the other hand, if it is judged that the former value does not exceed the latter threshold value, no overload is judged to have occurred in the relevant pool. In this case, the process returns to Step 1707. As a specific method of judging a threshold value exceeded status, a method similar to that of Step 1704 is used.

In Step 1712, the performance deterioration/overload detection module 203 calls the processing procedure of the volume selection module 207. Next, referring to FIGS. 18 to 23, the processing procedure of the volume selection module 207 will be described.

Figure 18:
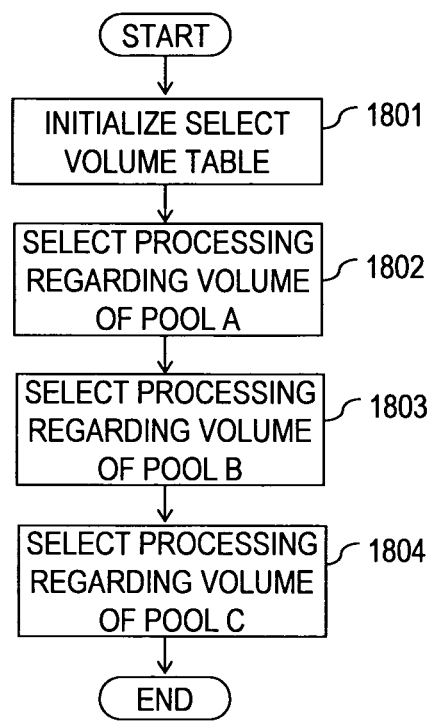
FIG. 18 is a first part of a flowchart showing a processing procedure of a volume selection module included in the performance management software according to the embodiment of this invention.

Each of FIGS. 18 to 23 is a flowchart showing the processing procedure of the volume selection module 207 of the performance management software 120. FIG. 18 shows an overall processing procedure, and FIGS. 19 to 23 show partial processing procedures called by the overall processing procedure of FIG. 18. The overall processing procedure of FIG. 18 may be started by the performance deterioration/overload detection module 203, or upon a request from the performance management client 104 operated by the user. In the description of FIGS. 18 to 23, the process executed by the volume selection module 207 is actually executed by the CPU 159 which executes the performance management software 120.

First, an outline of the process shown in FIGS. 18 to 23 will be given.

The process shown in FIGS. 18 to 23 is executed to solve a performance problem (performance deterioration or overload) generated in any one of the virtual logical volumes. The performance deterioration may have been caused by I/O interference among the plurality of virtual logical volumes. When an overload occurs in a certain logical volume, I/O to the virtual logical volume may interfere with I/O to the other virtual logical volume, which may deteriorate performance of the other virtual logical volume.

Accordingly, to prevent the virtual logical volume in which performance problem has occurred from interfering with the other virtual logical volume, the virtual logical volume of the performance problem may be migrated, to thereby solve the performance problem. The migration of the virtual logical volume is equivalent to migration of the virtual logical volume to another pool or conversion of the virtual logical volume into a real logical volume.

The storage system 131 of the embodiment includes three pools, namely, pool A (338) to pool C (340). The virtual logical volume A (326) to volume H (333) in the storage system 131 belong to any one of the pool A (338) to pool C (340) as shown in FIG. 3.

Each of the volume A (315) and the like of the host server A (301) and the like is allocated to any one of the virtual logical volume A (326) and the like belonging to the pool A (338), or to any one of the composite volume A (323) and the like constituted of only the virtual logical volume A (326) and the like belonging to the pool A (338), when a logical volume of the storage A (322) is newly allocated. After that, when a performance problem has occurred in any one of the virtual logical volume A (326) and the like belonging to the pool A (338), a process of migrating the virtual logical volume from the pool A (338) to the pool B (339) or the pool C (340) is selected as a measure of solving the problem (refer to Step 1802 of FIG. 18).

The "migration of the virtual logical volume from the pool A (338) to the pool B (339) or the pool C (340)" means, as described above (refer to the description regarding the migration function of the logical volume by the migration execution module 135 of FIG. 1), that data of the virtual logical volume A (326) or the like of the migration source belonging to the pool A (338) is copied to the virtual logical volume E (330) or the like or the virtual logical volume G (332) or the like of the migration destination belonging to the pool B (339) or the pool C (340), and then the logical volume number allocated to the virtual logical volume A (326) of the migration source is substituted with the logical volume number allocated to the virtual logical volume E (330) or the like or the virtual logical volume G (332) or the like of the migration destination.

Specifically, the performance deteriorated virtual logical volume (e.g., virtual logical volume A (326)) may be migrated to the pool C (340) (refer to Steps 1901 to 1905 of FIG. 19, and Steps 2001 to 2005 of FIG. 20), and the overloaded virtual logical volume (e.g., virtual logical volume C (328)) may be migrated to the pool B (339) (refer to Steps 1907 to 1911 of FIG. 19).

Figure 21:
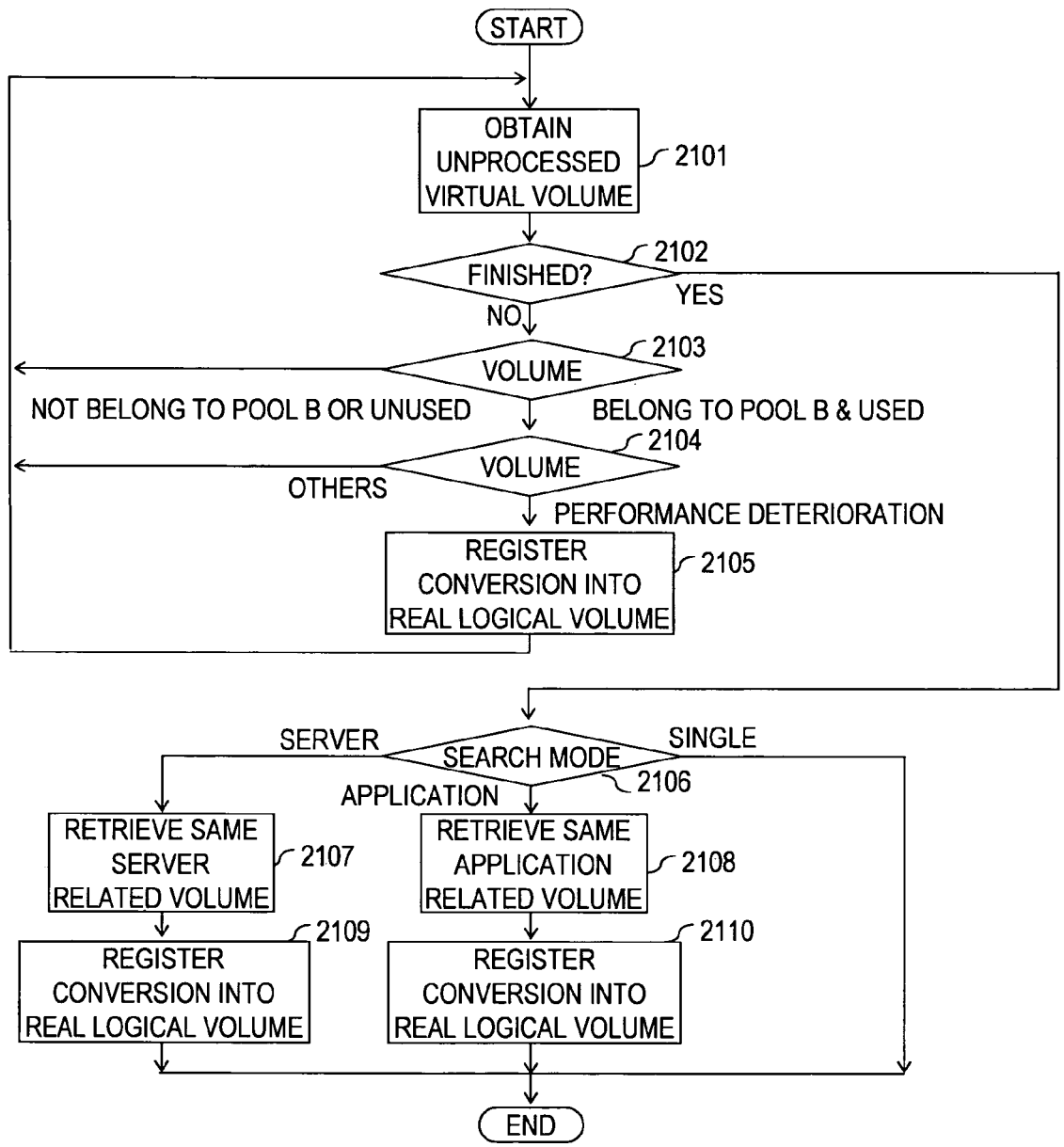
FIG. 21 is a fourth part of the flowchart showing the processing procedure of the volume selection module included in the performance management software according to the embodiment of this invention.

When a performance problem has occurred in any one of the virtual logical volume E (330) and the like belonging to the pool B (339), a process of converting one of the performance deteriorated virtual logical volumes belonging to the pool B (339) into a real logical volume is selected as a measure of solving the problem (refer to Step 1803 of FIG. 18 and FIG. 21).

In this case, the "conversion of the virtual logical volume belonging to the pool B (339) into the real logical volume" means that data of the virtual logical volume E (330) or the like of the migration source belonging to the pool B (339) is copied to the real logical volume A (334) or the like not belonging to any pool, and then the logical volume number allocated to the virtual logical volume E (334) or the like of the migration source is substituted with the logical volume number allocated to the real logical volume A (334) or the like of the migration destination.

Figure 22:
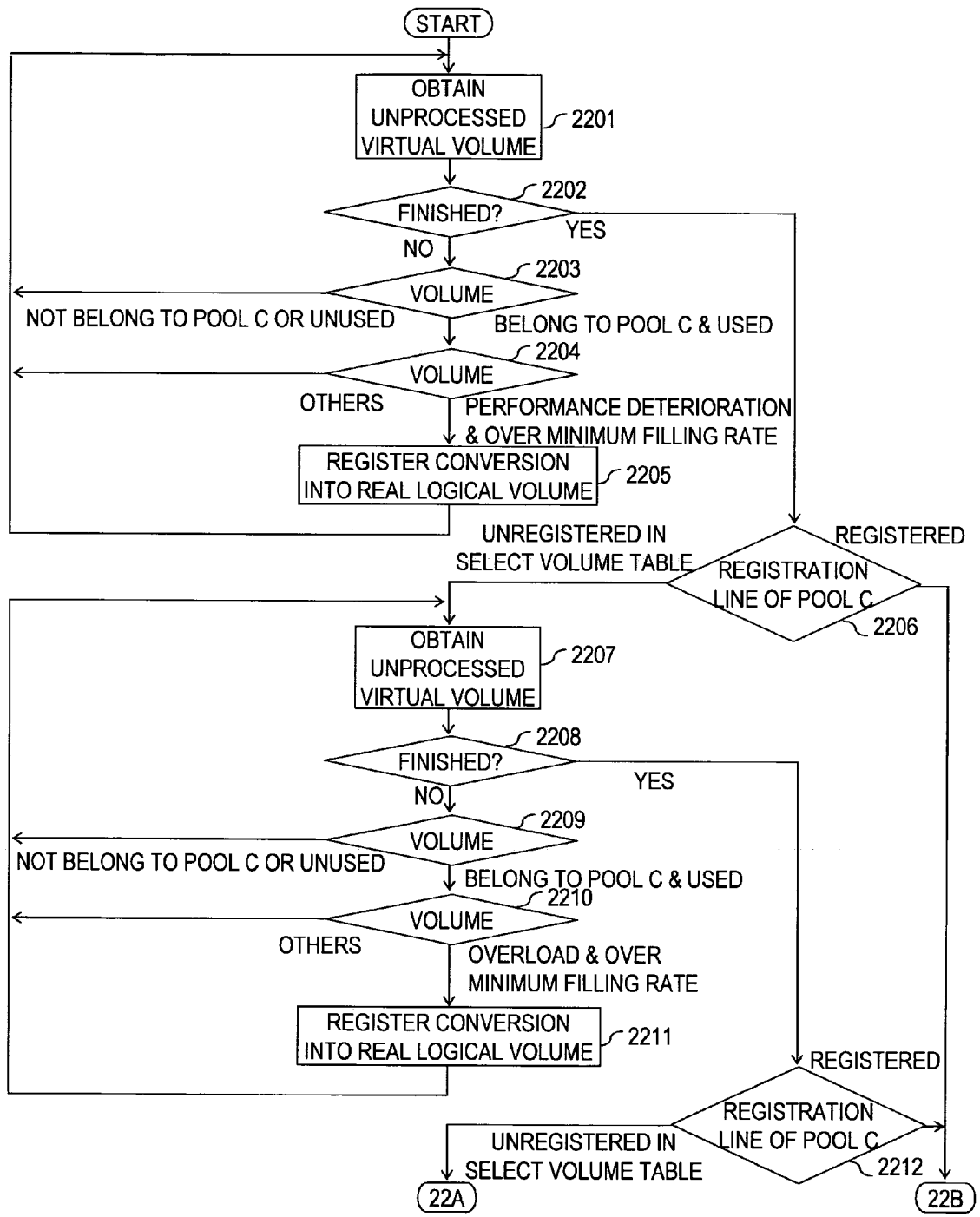
FIG. 22 is a fifth part of the flowchart showing the processing procedure of the volume selection module included in the performance management software according to the embodiment of this invention.
Figure 23:
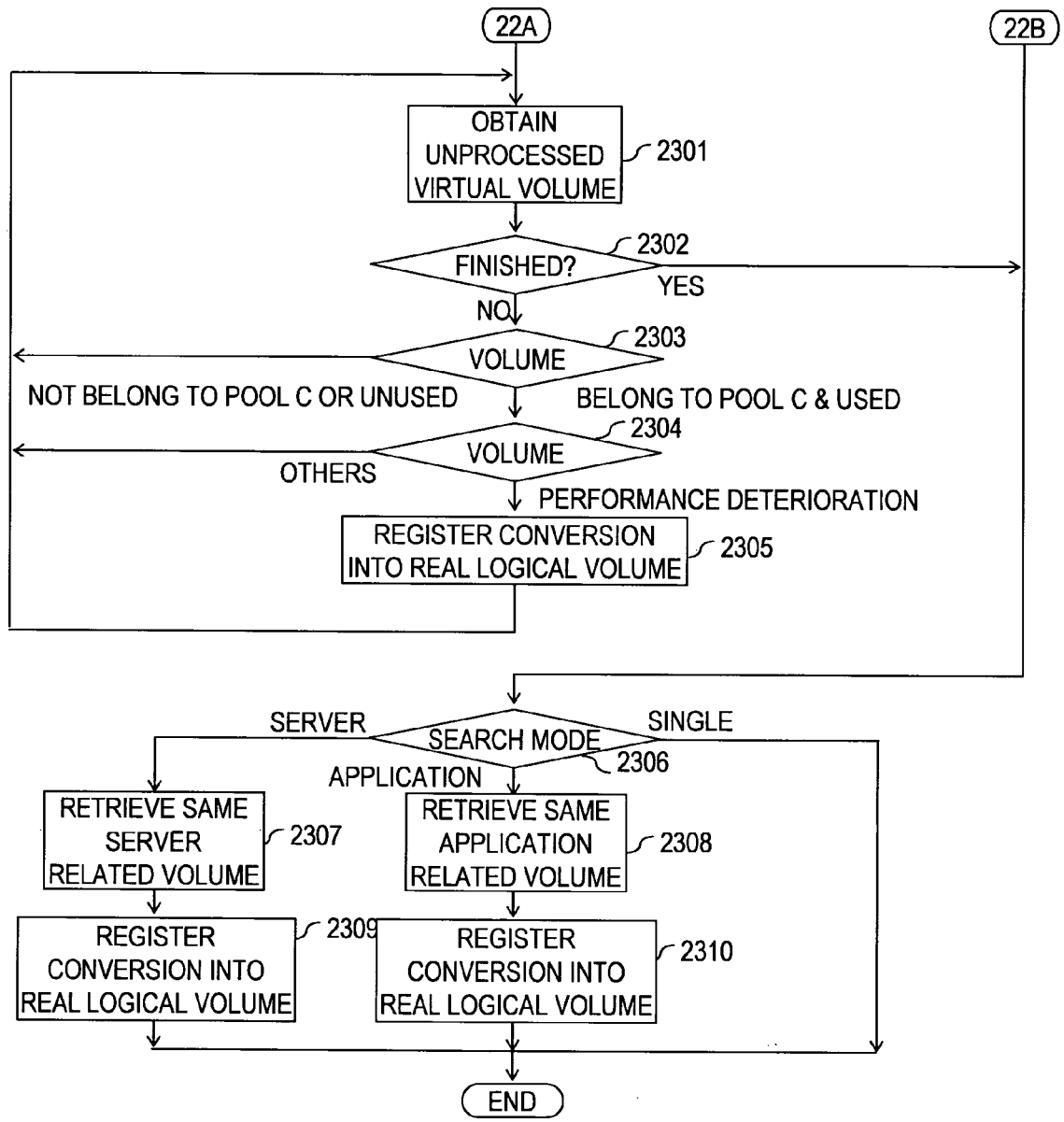
FIG. 23 is a sixth part of the flowchart showing the processing procedure of the volume selection module included in the performance management software according to the embodiment of this invention.

When a performance problem has occurred in any one of the virtual logical volume G (332) and the like belonging to the pool C (340), a process of converting one of the performance deteriorated or overloaded virtual logical volumes belonging to the pool C (340) into a real logical volume is selected as a measure of solving the problem (refer to Step 1804 of FIG. 18, and FIGS. 22 and 23).

The "conversion of the virtual logical volume belonging to the pool C (340) into the real logical volume" means that data of the virtual logical volume G (347) or the like of the migration source belonging to the pool C (340) is copied to the real logical volume A (334) or the like of the migration destination not belonging to any of the pools, and then the logical volume number allocated to the virtual logical volume G (347) or the like of the migration source is substituted with the logical volume number allocated to the real logical volume A (334) or the like of the migration destination.

Thus, according to the embodiment, the pool A (338) is a pool to which the virtual logical volume first belongs, the pool B (339) is a migration destination of the overloaded virtual logical volume, and the pool C (340) is a migration destination of the performance deteriorated virtual logical volume. However, this categorization of the pools is only an example of a method of migrating the virtual logical volume in which the performance problem has occurred. By migrating the virtual logical volume in which the performance problem has occurred, interference of I/O to the virtual logical volume of the performance problem with I/O to the other virtual logical volume can be prevented. In other words, as a result of the migration, I/O to the logical volume in which the performance problem has occurred (i.e., virtual logical volume in which the performance problem has occurred, or a real logical volume generated by converting the virtual logical volume into a real logical volume) is prevented from interfering with I/O to the other logical volume, or I/O to the logical volume in which the performance problem has occurred interferes with I/O to the smaller number of other logical volumes. Thus, the performance problem is expected to be solved.

FIG. 18 is a first part of a flowchart showing the processing procedure of the volume selection module 207 included in the performance management software 120 according to an embodiment of this invention.

First, in Step 1801, the volume selection module 207 initializes the select volume table 1601. Specifically, the volume selection module 207 deletes all lines registered in the select volume table 1601 at the last execution of the procedure shown in FIG. 18.

Figure 20:
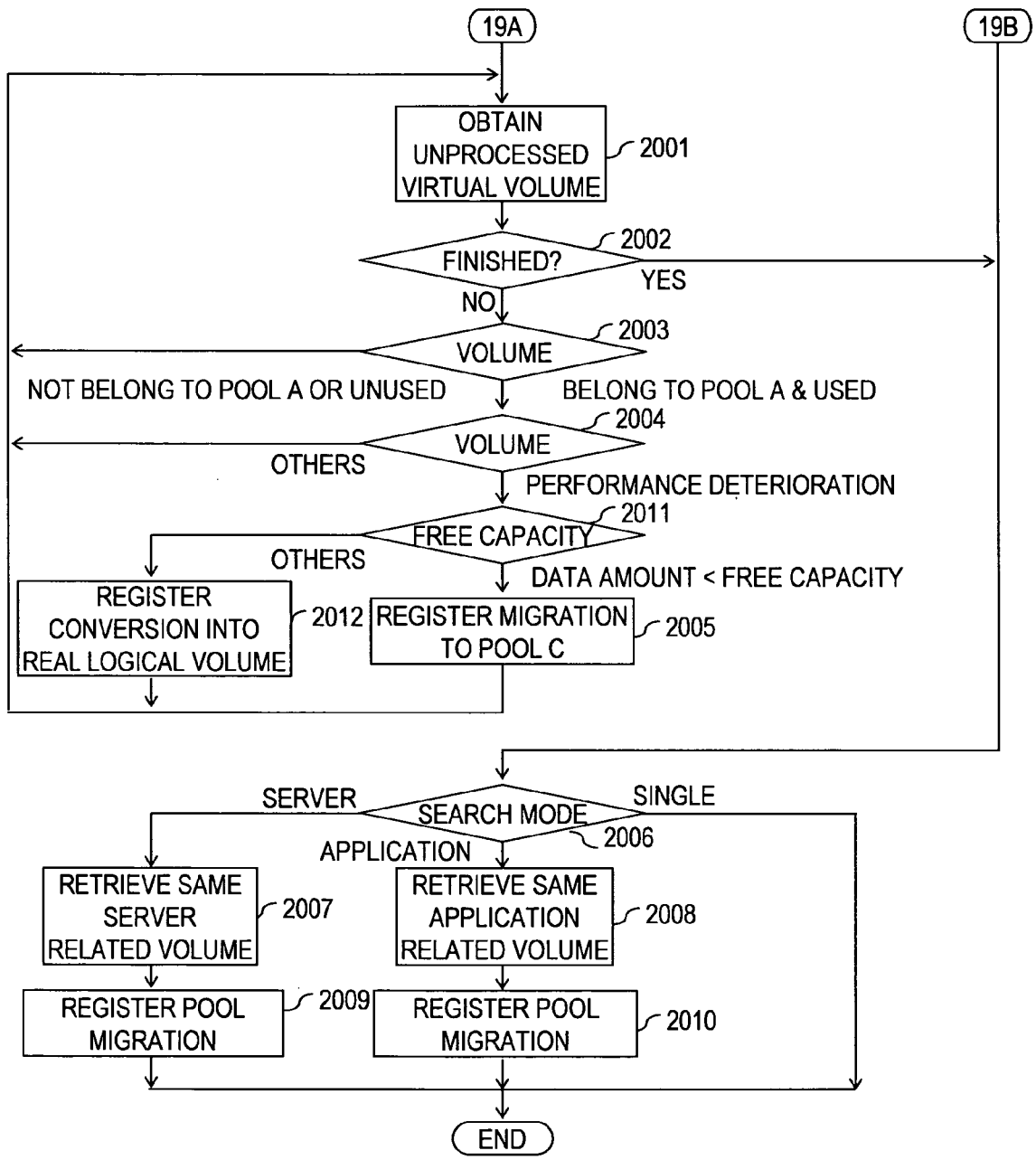
FIG. 20 is a third part of the flowchart showing the processing procedure of the volume selection module included in the performance management software according to the embodiment of this invention.

In Step 1802, the volume selection module 207 executes a selection process according to a procedure descried in detail referring to FIGS. 19 and 20 for the virtual logical volumes belonging to the pool A (338). In the example of FIG. 3, the virtual logical volumes A (326) to D (329) allocated to the pool A (338) are virtual logical volumes belonging to the pool A (338).

In Step 1803, the volume selection module 207 executes a selection process according to a procedure described in detail referring to FIG. 21 for the virtual logical volumes belonging to the pool B (339). In the example of FIG. 3, the virtual logical volume E (330) and the virtual logical volume F (331) allocated to the pool B (339) are virtual logical volumes belonging to the pool B (339).

In Step 1804, the volume selection module 207 executes a selection process according to a procedure described in detail referring to FIGS. 22 and 23 for the virtual logical volumes belonging to the pool C (340). In the example of FIG. 3, the virtual logical volume G (332) and the virtual logical volume H (333) allocated to the pool C (340) are virtual logical volumes belonging to the pool C (340).

After completion of the selection process of Step 1804, the procedure shown in FIG. 18 is finished.

FIG. 19 is a second part of the flowchart showing the processing procedure of the volume selection module 207 included in the performance management software 120 according to an embodiment of this invention.

The processing procedure of FIG. 19 is a first half of details of processing of Step 1802 of FIG. 18. Through the process of FIG. 19, one of the virtual logical volumes belonging to the pool A (338) to be migrated to the pool B (339) or C (340) is selected.

First, in Step 1901, the volume selection module 207 searches the lines registered in the virtual logical volume/pool relation table 1101 sequentially from the head to obtain one unprocessed line, and proceeds to Step 1902. The unprocessed line means a line yet to be subjected to a process of Steps 1903 to 1905 described below.

In Step 1902, the volume selection module 207 judges whether an unprocessed line has been found by the retrieval of Step 1901. If no unprocessed line has been found, the process of Steps 1903 to 1905 has been finished for all the lines registered in the virtual logical volume/pool relation table 1101. In this case, the process proceeds to Step 1906. On the other hand, if an unprocessed line has been found, the process proceeds to Step 1903.

In Step 1903, the volume selection module 207 judges whether a virtual logical volume identified by the logical volume identifier storage field 1102 of the line found in Step 1901 belongs to the pool A (338) and in a "USED" status. In description below up to Step 1906, the line found in Step 1901 will be referred to as a relevant line, and the virtual logical volume identified by the logical volume identifier storage field 1102 of the relevant line will be referred to as a relevant virtual logical volume.

When "POOL A" is stored in a pool identifier storage field 1103 of the relevant line, it is judged that the relevant virtual logical volume belongs to the pool A (338). A use status of the relevant virtual logical volume is judged based on a value of a use status storage field 806 of a line corresponding to the relevant virtual logical volume in the logical volume table 801.

If the relevant virtual logical volume belongs to the pool A (338) and in the "USED" status, the process proceeds to Step 1904. If the relevant virtual logical volume does not belong to the pool A (338) or in a "UNUSED" status, the process returns to Step 1901. The relevant line at this point is treated as processed after the return to Step 1901.

In Step 1904, the volume selection module 207 judges whether performance deterioration has occurred in the relevant virtual logical volume, and a filling rate of the relevant virtual logical volume exceeds a minimum filling rate.

Whether performance deterioration has occurred is judged by referring to the volume statistics information table 1301 and the control information table 1501. Specifically, the volume selection module 207 retrieves a line in which a latest date and time has been registered among the lines in which the relevant virtual logical volume has been registered. The volume selection module 207 compares a value of an I/O response time storage field 1304 of the retrieved line with a value of the I/O response time threshold value for performance deterioration volume selection storage field 1508 of the control information table 1501 so as to judge whether the former value exceeds the latter value. If the former value exceeds the latter value, it is judged that performance deterioration has occurred in the relevant virtual logical volume.

The filling rate is a ratio of an actually used capacity with respect to a defined capacity of the virtual logical volume. Whether the filling rate is exceeded is judged as follows. First, the volume selection module 207 retrieves a line in which the relevant virtual logical volume has been registered from the logical volume table 801, and obtains a value of a defined capacity storage field 805 of the line. Then, the volume selection module 207 retrieves a line in which a latest date and time has been registered among the lines in which the relevant virtual logical volume has been registered from the volume statistics information table 1301 so as to obtain a value of a used capacity storage field 1307 of the line. A value obtained by dividing a value of the obtained used capacity storage field 1307 with a value of the defined capacity storage field 805 is a filling rate of the relevant virtual logical volume on the latest date and time. The volume selection module 207 compares this filling rate with a value of the minimum volume filling rate storage field 1511 of the control information table 1501, to thereby judge whether the former value exceeds the latter value.

As described above, the conversion of the virtual logical volume into the real logical volume leads to a loss of the advantage of the virtual logical volume, i.e., efficient use of the storage capacity. A size of the lost advantage (in other words, physical amount of storage areas to be newly allocated for real logical volume conversion) is generally larger as a filling rate of the virtual logical volume converted into the real logical volume is greater. Accordingly, to minimize a loss of the advantage of the virtual logical volume, in Step 1904, a virtual logical volume in which performance deterioration has occurred and whose filling rate exceeds the minimum filling rate is selected. The same holds true for Steps 1910, 2204 and 2210.

If it is judged that performance deterioration has occurred in the relevant virtual logical volume, and the filling rate of the relevant virtual logical volume exceeds the minimum filling rate, the process proceeds to Step 1913. On the other hand, if it is judged that no performance deterioration has occurred in the relevant virtual logical volume, or that the filling rate of the relevant virtual logical volume does not exceed the minimum filling rate, the process returns to Step 1901. The relevant line at this point is treated as processed after the return to Step 1901.

The judgment of the performance deterioration of Step 1904 may be executed by the same method as that for Step 1704 of FIG. 17. Additionally, the judgment of the minimum filling rate exceeding status may be executed by the same method as that for Step 1704 of FIG. 17. The description of the first to fourth methods of Step 1704 can be applied to the judgment of the filling rate exceeding status by using "FILLING RATE" in place of "I/O RESPONSE TIME".

If it is judged in Step 1904 that performance deterioration has occurred in the relevant virtual logical volume, in the pool A (338) to which the relevant virtual logical volume has been allocated, interference of I/O to the plurality of virtual logical volumes may be a cause of the performance deterioration. Accordingly, the relevant virtual logical volume is migrated to another pool (specifically, the relevant virtual logical volume allocated to the pool A (338) is newly allocated to the pool C (340)), thereby recovering the deteriorated performance.

However, if there is no free capacity enough to allocate the relevant virtual logical volume in the pool C (340) of the migration destination, the relevant virtual logical volume cannot be migrated to the pool C (340). Thus, in Step 1913, the volume selection module 207 judges whether there is a free capacity larger than the amount of data of a moving target (i.e., amount of data to be migrated) in the pool C (340) of the migration destination.

Specifically, the volume selection module 207 calculates a defined capacity of the pool C (340) by referring to the pool/pool volume relation table 1201 and the logical volume table 801. The volume selection module 207 calculates a currently used capacity of the capacity of the pool C (340) by referring to the virtual logical volume/pool relation table 1101 and the volume statistics information table 1301. A value obtained by subtracting the currently used capacity from the defined capacity of the pool C (340) is a current free capacity of the pool C (340). On the other hand, the amount of data of a migration target is equivalent to a capacity currently used in the relevant virtual logical volume. This capacity is obtained from the volume statistics information table 1301. Based on those values, the volume selection module 207 judges whether the free capacity of the pool C (340) is larger than the amount of data of the migration target.

If the free capacity of the pool C (340) is judged to be larger than the data amount of the migration target, because there is enough free capacity in the pool C (340), the relevant virtual logical volume can be migrated to the pool C (340). Accordingly, the process proceeds to Step 1905.

On the other hand, if the free capacity of the pool C (340) is judged not to be larger than the data amount of the migration target, because there isn't enough free capacity in the pool C (340), the relevant virtual logical volume cannot be migrated to the pool C (340). In this case, by converting the relevant virtual logical volume into a real logical volume, the deteriorated performance may be recovered. Thus, the process proceeds to Step 1914.

In Step 1905, the volume selection module 207 registers a problem solving measure of "MIGRATE RELEVANT LOGICAL VOLUME TO POOL C (340)" in the select volume table 1601. Specifically, the volume selection module 207 adds a new line to the select volume table 1601, and sets an identifier (e.g., "VIRTUAL LOGICAL VOLUME B") of the relevant virtual logical volume in the logical volume identifier storage field 1602, "POOL MIGRATION" in the countermeasure type storage field 1603, and "POOL C" in the countermeasure parameter storage field 1604. After the registration in the select volume table 1601, the process returns to Step 1901. The relevant line at this point is treated as processed after the return to Step 1901.

In Step 1905, the volume selection module 207 may refer to the pool statistics information table 1401 to select a pool whose performance is the highest at this point (i.e., pool of short I/O response time) as a migration destination of the relevant virtual logical volume. In this case, an identifier of the selected pool is set in the countermeasure parameter storage field 1604.

In Step 1914, the volume selection module 207 registers a problem solving measure of "CONVERT RELEVANT LOGICAL VOLUME INTO REAL LOGICAL VOLUME" in the select volume table 1601. Specifically, the volume selection module 207 adds a new line to the select volume table 1601, and sets an identifier (e.g., "VIRTUAL LOGICAL VOLUME E") of the relevant virtual logical volume in the logical volume identifier storage field 1602 and "CONVERSION INTO REAL LOGICAL VOLUME" in the countermeasure type storage field 1603. In this case, nothing needs to be set in the countermeasure parameter storage field 1604. After the registration in the select volume table 1601, the process returns to Step 1901. The relevant line at this point is treated as processed after the return to Step 1901.

Even when there is enough free capacity in the pool C (340), the relevant logical volume can be converted into a real logical volume. Through this conversion, the deteriorated performance may be recovered. Accordingly, in Step 1905, in addition to the problem solving measure of "MIGRATE RELEVANT VIRTUAL LOGICAL VOLUME TO POOL C (340)", a problem solving measure of "CONVERSION OF RELEVANT VIRTUAL LOGICAL VOLUME INTO REAL LOGICAL VOLUME" may be registered in the select volume table 1601. In this case, a plurality of problem solving measures are displayed for the same virtual logical volume in the virtual volume display field 403, the pool display field 404, and the countermeasure display field 405 of the display screen 401 of FIG. 4. For example, when the problem solving measure of migrating the virtual logical volume B (327) to the pool C (340) and the problem solving measure of conversion into real logical volume are registered in the select volume table 1601, two lines in which a logical volume number is "05" are displayed on the display screen 401. The same holds true for Steps 1911 and 2005 described below.

However, the advantage of the virtual logical volume, i.e., efficient use of the storage area, is lost through the conversion of the virtual logical volume into the real logical volume. Accordingly, when importance of the performance problem and costs for the storage system are compared and importance is attached to the latter, the virtual logical volume is preferably converted into a real logical volume only when the relevant virtual logical volume cannot be migrated to the other pool.

In Step 1906, the volume selection module 207 judges whether a line regarding the virtual logical volume currently belonging to the pool A (338) has been registered in the select volume table 1601. If it is judged that the line regarding the virtual logical volume belonging to the pool A (338) has been registered, the deteriorated performance may be recovered through a problem solving measure indicated by the registered line. In this case, the process proceeds to Step 2006. On the other hand, if it is judged that the line regarding the virtual logical volume belonging to the pool A (338) has not been registered, a problem solving measure to recover the deteriorated performance is yet to be found. In this case, in order to find a problem solving measure, the process proceeds to Step 1907.

In Step 1907, the volume selection module 207 searches the lines registered in the virtual logical volume/pool relation table 1101 sequentially from the head to obtain one unprocessed line, and proceeds to Step 1908.

In Step 1908, the volume selection module 207 judges whether an unprocessed line has been found by the retrieval of Step 1907. If no unprocessed line has been found, the process of Steps 1909 to 1911 has been finished for all the lines registered in the virtual logical volume/pool relation table 1101. In this case, the process proceeds to Step 1912. On the other hand, if an unprocessed line has been found, the process proceeds to Step 1909.

In Step 1909, the volume selection module 207 judges whether a virtual logical volume identified by the logical volume identifier storage field 1102 of the line found in Step 1907 belongs to the pool A (338) and is in a "USED" status. A judging method is the same as that of Step 1903. In description below up to Step 1912, the line found in Step 1907 will be referred to as a relevant line, and the virtual logical volume identified by the logical volume identifier storage field 1102 of the relevant line will be referred to as a relevant virtual logical volume.

If the relevant virtual logical volume belongs to the pool A (338) and is in a "USED" status, the process proceeds to Step 1910. If the relevant virtual logical volume does not belong to the pool A (338) or is in an "UNUSED" status, the process returns to Step 1907. The relevant line at this point is treated as processed after the return to Step 1907.

In Step 1910, the volume selection module 207 judges whether an overload has occurred in the relevant virtual logical volume, and a filling rate of the relevant virtual logical volume exceeds a minimum filling rate.

Whether an overload has occurred is judged by referring to the volume statistics information table 1301 and the control information table 1501. Specifically, the volume selection module 207 retrieves a line in which a latest date and time has been registered among the lines in which the relevant virtual logical volume has been registered from the volume statistics information table 1301. The volume selection module 207 compares values of an IOPS storage field 1305 and a transfer rate storage field 1306 of the retrieved line with values of the IOPS threshold value for overload volume selection storage field 1509 and the transfer rate threshold value for overload volume selection storage field 1510 of the control information table 1501 to judge whether any one of the former values exceeds the relevant latter value. If the former value exceeds the latter value, it is judged that an overload has occurred in the relevant virtual logical volume.

On the other hand, whether the minimum filling rate is exceeded is judged as follows. First, the volume selection module 207 retrieves a line in which the relevant virtual logical volume has been registered from the logical volume table 801, and obtains a value of a defined capacity storage field 805 of the line. Then, the volume selection module 207 retrieves a line in which a latest date and time has been registered among the lines in which the relevant virtual logical volume has been registered from the volume statistics information table 1301 to obtain a value of a used capacity storage field 1307 of the line. A value obtained by dividing a value of the obtained used capacity storage field 1307 by a value of the defined capacity storage field 805 is a filling rate of the relevant virtual logical volume on the latest date and time. The volume selection module 207 compares this filling rate with a value of the minimum volume filling rate storage field 1511 of the control information table 1501 to judge whether the former value exceeds the latter value.

If it is judged that an overload has occurred in the relevant virtual logical volume, and the filling rate of the relevant virtual logical volume exceeds the minimum filling rate, the process proceeds to Step 1915. On the other hand, if it is judged that no overload has occurred in the relevant virtual logical volume, or that the filling rate of the relevant virtual logical volume does not exceed the minimum filling rate, the process returns to Step 1907. The relevant line at this point is treated as processed after the return to Step 1907. A specific method of judging the threshold value exceeded status and the minimum filling rate exceeded status of Step 1910 is the same as in Step 1704 of FIG. 17.

If it is judged in Step 1910 that an overload has occurred in the relevant virtual logical volume, in the pool A (338) to which the relevant virtual logical volume has been allocated, the overload may be a cause of the performance deterioration of the relevant virtual logical volume or the other virtual logical volume. Accordingly, the relevant virtual logical volume is migrated to another pool (specifically, the relevant virtual logical volume allocated to the pool A (338) is newly allocated to the pool B (339)), and thus the deteriorated performance may be recovered.

However, if there is no free capacity enough to allocate the relevant virtual volume in the pool B (339) of the migration destination, the relevant virtual logical volume cannot be migrated to the pool B (339). Thus, in Step 1915, the volume selection module 207 judges whether there is a free capacity larger than the amount of data of a migration target (i.e., amount of data to be migrated) in the pool B (339) of the migration destination. This judgement is executed in the same manner as in Step 1913.

If the free capacity of the pool B (339) is judged to be larger than the data amount of the migration target, the relevant virtual logical volume can be migrated to the pool B (339). Accordingly, the process proceeds to Step 1911.

On the other hand, if the free capacity of the pool B (339) is judged not to be larger than the data amount of the migration target, the relevant virtual logical volume cannot be migrated to the pool B (339). In this case, by converting the relevant virtual logical volume into a real logical volume, the deteriorated performance may be recovered. Thus, the process proceeds to Step 1916.

In Step 1911, the volume selection module 207 registers a problem solving measure of "MIGRATE RELEVANT LOGICAL VOLUME TO POOL B (339)" in the select volume table 1601. Specifically, the volume selection module 207 adds a new line to the select volume table 1601, and sets an identifier of the relevant virtual logical volume in the logical volume identifier storage field 1602, "POOL MIGRATION" in the countermeasure type storage field 1603, and "POOL B" in the countermeasure parameter storage field 1604 of the added line. After the registration in the select volume table 1601, the process returns to Step 1907. The relevant line at this point is treated as processed after the return to Step 1907.

In Step 1911, the volume selection module 207 may refer to the pool statistics information table 1401 to select a pool whose load is the lowest at this point (i.e., pool of small IOPS and low transfer rate) as a migration destination of the relevant virtual logical volume. In this case, an identifier of the selected pool is set in the countermeasure parameter storage field 1604.

In Step 1916, the volume selection module 207 registers a problem solving measure of "CONVERT RELEVANT LOGICAL VOLUME INTO REAL LOGICAL VOLUME"

in the select volume table 1601. Specifically, the volume selection module 207 adds a new line to the select volume table 1601, and sets an identifier of the relevant virtual logical volume in the logical volume identifier storage field 1602, and "CONVERSION INTO REAL LOGICAL VOLUME" in the countermeasure type storage field 1603. In this case, nothing needs to be set in the countermeasure parameter storage field 1604. After the registration in the select volume table 1601, the process returns to Step 1907. The relevant line at this point is treated as processed after the return to Step 1907.

In Step 1912, the volume selection module 207 judges whether a line regarding the virtual logical volume currently belonging to the pool A (338) has been registered in the select volume table 1601. If it is judged that the line regarding the virtual logical volume belonging to the pool A (338) has been registered, the deteriorated performance may be recovered through a problem solving measure indicated by the registered line. In this case, the process proceeds to Step 2006. On the other hand, if it is judged that the line regarding the virtual logical volume belonging to the pool A (338) has not been registered, a problem solving measure to recover the deteriorated performance is yet to be found. In this case, in order to find a problem solving measure, the process proceeds to Step 2001.

FIG. 20 is a third part of the flowchart showing the processing procedure of the volume selection module 207 included in the performance management software 120 according to one embodiment of this invention.

The processing procedure of FIG. 20 is a latter half of details of processing of Step 1802 of FIG. 18. Through the process of FIG. 20, among the virtual logical volumes belonging to the pool A (338), the virtual logical volume to be migrated to the pool C is selected.

First, in Step 2001, the volume selection module 207 searches the lines registered in the virtual logical volume/pool relation table 1101 sequentially from the head to obtain one unprocessed line, and proceeds to Step 2002. It should be noted that the unprocessed line means a line yet to be subjected to a process of Steps 2003 to 2005 described below.

In Step 2002, the volume selection module 207 judges whether an unprocessed line has been found by the retrieval of Step 2001. If no unprocessed line has been found, the process of Steps 2003 to 2005 has been finished for all the lines registered in the virtual logical volume/pool relation table 1101. In this case, the process proceeds to Step 2006. On the other hand, if an unprocessed line has been found, the process proceeds to Step 2003.

In Step 2003, the volume selection module 207 judges whether a virtual logical volume identified by the logical volume identifier storage field 1102 of the line found in Step 2001 belongs to the pool A (338) and is in a "USED" status. A method of this judgment is the same as in Step 1903 of FIG. 19. In description below up to Step 2006, the line found in Step 2001 will be referred to as a relevant line, and the virtual logical volume identified by the logical volume identifier storage field 1102 of the relevant line will be referred to as a relevant virtual logical volume.

If the relevant virtual logical volume belongs to the pool A (338) and is in a "USED" status, the process proceeds to Step 2004. If the relevant virtual logical volume does not belong to the pool A (338) or is in an "UNUSED" status, the process returns to Step 2001. The relevant line at this point is treated as processed after the return to Step 2001.

In Step 2004, the volume selection module 207 judges whether performance deterioration has occurred in the relevant virtual logical volume. This judgment may be executed by the method described in Step 1904. If it is judged that performance deterioration has occurred in the relevant virtual logical volume, the process proceeds to Step 2011. If it is judged that no performance deterioration has occurred in the relevant virtual logical volume, the process returns to Step 2001. The relevant line at this point is treated as processed after the return to Step 2001. A specific method of judging a threshold value exceeded status is the same as in Step 1704 of FIG. 17.

In Step 2004, different from Steps 1904 and 1910, whether a filling rate of the relevant virtual logical volume exceeds a minimum filling rate is not judged. If a result of the judgment of Steps 1904 and 1910 shows that the filling rate of the relevant virtual logical volume does not exceed the minimum filling rate, the relevant virtual logical volume is not registered in the select volume table 1601. This is for the purpose of preventing a loss of the advantage of the virtual logical volume, i.e., efficient use of the storage areas, as much as possible. However, if the result of the process of FIG. 19 shows that no virtual logical volume has been registered in the select volume table 1601, the process to recover the deteriorated performance cannot be executed. In this case, the deteriorated performance has to be recovered even at a risk of losing the advantage of the virtual logical volume. Accordingly, in Step 2004, whether performance has been deteriorated is judged irrespective of a filling rate of the relevant virtual logical volume.

In Step 2011, the volume selection module 207 judges whether there is a free capacity larger than the amount of data of a migration target (i.e., amount of data to be migrated) in the pool C (340) of the migration destination. This judgment is executed by the same method as in Step 1913 of FIG. 19.

If the free capacity of the pool C (340) is judged to be larger than the data amount of the migration target, the relevant virtual logical volume can be migrated to the pool C (340). Accordingly, the process proceeds to Step 2005.

On the other hand, if the free capacity of the pool C (340) is judged not to be larger than the data amount of the migration target, the relevant virtual logical volume cannot be migrated to the pool C (340). In this case, by converting the relevant virtual logical volume into a real logical volume, the deteriorated performance may be recovered. Thus, the process proceeds to Step 2012.

In Step 2005, the volume selection module 207 registers a problem solving measure of "MIGRATE RELEVANT LOGICAL VOLUME TO POOL C (340)" in the select volume table 1601. Specifically, the volume selection module 207 adds a new line to the select volume table 1601, and sets an identifier of the relevant virtual logical volume in the logical volume identifier storage field 1602, "POOL MIGRATION" in the countermeasure type storage field 1603, and "POOL C" in the countermeasure parameter storage field 1604 of the added line. After the registration in the select volume table 1601, the process returns to Step 2001. The relevant line at this point is treated as processed after the return to Step 2001.

In Step 2012, the volume selection module 207 registers a problem solving measure of "CONVERT RELEVANT LOGICAL VOLUME INTO REAL LOGICAL VOLUME" in the select volume table 1601. Specifically, the volume selection module 207 adds a new line to the select volume table 1601, and sets an identifier of the relevant virtual logical volume in the logical volume identifier storage field 1602, and "CONVERSION INTO REAL LOGICAL VOLUME" in the countermeasure type storage field 1603. In this case, nothing needs to be set in the countermeasure parameter storage field 1604. After the registration in the select volume table 1601, the process returns to Step 2001. The relevant line at this point is treated as processed after the return to Step 2001.

In Step 2006, the volume selection module 207 refers to a value of the search mode storage field 1513 of the control information table 1501. If a value of the search mode storage field 1513 is "SERVER", the process proceeds to Step 2007. In a case of "APPLICATION", the process proceeds to Step 2008. In a case of "SINGLE", the process is finished.

When the value of the search mode storage field 1513 is "SERVER", not only the virtual logical volume that is registered in the select volume table 1601 by the above-mentioned processing, but also the other virtual logical volume used by the host server using the virtual logical volume that is registered in the select volume table 1601 by the above-mentioned processing are registered in the select volume table 1601. Specifically, in Step 2007, the volume selection module 207 finds all virtual logical volumes having other virtual logical volumes satisfying the following conditions (1) to (4) among the virtual logical volumes which are not registered in the select volume table 1601, belong to the pool A (338), and are "USED".
(1) Registered in the select volume table 1601.
(2) Belonging to the pool A.
(3) Being used.
(4) I/O path originating from a certain common host server passes through both virtual logical volumes.

Information regarding the I/O path from the host server to the virtual logical volume can be obtained from the volume/logical volume relation table 701 (FIG. 7), the logical volume table 801 (FIG. 8), and the composite logical volume/element logical volume relation table 901 (FIG. 9).

In Step 2009, the volume selection module 207 additionally registers a problem solving measure targeting the virtual logical volume found in Step 2007 in the select volume table 1601. Contents of the problem solving measure (e.g., conversion into real logical volume or migration to the pool B or C) additionally registered in Step 2009 are the same as those registered in the select volume table 1601.

For example, the host server A (301) issues I/O to a logical volume to which a logical volume number "01" has been assigned (refer to the first line of FIG. 7). The logical volume to which the logical volume number "01" has been assigned is a composite logical volume A (323) (refer to the first line of FIG. 8). The composite logical volume A (323) includes a logical volume to which a logical volume number "04" has been assigned and a logical volume to which a logical volume number "05" has been assigned (refer to the first and second lines of FIG. 9). The logical volumes to which the logical volume numbers "04" and "05" have been assigned are virtual logical volume A (326) and virtual logical volume B (327) (refer to the fourth and fifth lines of FIG. 8), respectively. In other words, the I/O path starting from the host sever A (301) passes through the virtual logical volumes A (326) and B (327).

The virtual logical volumes A (326) and B (327) both belong to the pool A (338), and are being used. In this example, if only the virtual logical volume B (327) has been registered in the select volume table 1601, as a retrieval result of Step 2007, the virtual logical volume A (326) is obtained. Then, in Step 2009, a line corresponding to the virtual logical volume A (326) is additionally registered in the select volume table 1601. Specifically, the "virtual logical volume A" is stored in the logical volume identifier storage field 1602 of the additionally registered line. Contents similar to those already registered corresponding to the virtual logical volume B are registered in the countermeasure type storage field 1603 and the countermeasure parameter storage field 1604 equivalent to the problem solving measure of the additionally registered line.

For example, as shown in FIG. 16, when "POOL MIGRATION" and "POOL C" have been registered in the countermeasure type storage field 1603 and the countermeasure parameter storage field 1604 corresponding to the virtual logical volume B (327), "POOL MIGRATION" and "POOL C" are also registered in a countermeasure type storage field 1603 and a countermeasure parameter storage field 1604 of a line corresponding to the additionally registered virtual logical volume A (326).

When the value of the search mode storage field 1513 is "APPLICATION", not only the virtual logical volume that is registered in the select volume table 1601 by the above-mentioned processing, but also the other virtual logical volume used by the application using the virtual logical volume that is registered in the select volume table 1601 by the above-mentioned processing are registered in the select volume table 1601. Specifically, in Step 2008, the volume selection module 207 finds all virtual logical volumes having other virtual logical volumes satisfying the following conditions (5) to (8) among the virtual logical volumes which are not registered in the select volume table 1601, belong to the pool A (338), and are "USED".
(5) Registered in the select volume table 1601.
(6) Belonging to the pool A.
(7) Being used.
(8) I/O path originating from a certain common application passes through both virtual logical volumes.

Information regarding the I/O path from the application to the virtual logical volume can be obtained from the application/file relation table 501 (FIG. 5), the file/volume relation table 601 (FIG. 6), the volume/logical volume relation table 701 (FIG. 7), the logical volume table 801 (FIG. 8), and the composite logical volume/element logical volume relation table 901 (FIG. 9).

In Step 2010, the volume selection module 207 additionally registers a problem solving measure targeting the virtual logical volume found in Step 2008 in the select volume table 1601. Contents of the problem solving measure (e.g., conversion into real logical volume or migration to the pool B or C) additionally registered in Step 2010 are the same as those registered in the select volume table 1601.

For example, the application A (305) issues I/O to a file A (309) (refer to the first line of FIG. 5). The file A (309) is allocated to the volume A (315) (refer to the first line of FIG. 6). The volume A (315) is allocated to a logical volume to which a logical volume number "01" has been assigned (refer to the first line of FIG. 7). The logical volume to which the logical volume number "01" has been assigned is a composite logical volume A (323). The composite logical volume A (323) includes virtual logical volumes A (326) and B (327). In other words, the I/O path starting from the application A (305) passes through the virtual logical volumes A (326) and B (327).

In this example, if only the virtual logical volume B (327) has been registered in the select volume table 1601, as a retrieval result of Step 2008, the virtual logical volume A (326) is obtained. Then, as in the case of Step 2009, in Step 2010, a line corresponding to the virtual logical volume A (326) is additionally registered in the select volume table 1601.

After an end of Step 2009 or 2010, or when a value of the search mode storage field 1513 is "SINGLE" in Step 2006, the volume selection module 207 finishes the process of FIGS. 19 and 20.

FIG. 21 is a fourth part of a flowchart showing the processing procedure of the volume selection module 207 included in the performance management software 120 according to the embodiment of this invention.

The processing procedure of FIG. 21 is directed to details of processing contents of Step 1803 of FIG. 18. Through the process of FIG. 21, among the virtual logical volumes belonging to the pool B (339), a virtual logical volume to be converted into a real logical volume is selected.

First, in Step 2101, the volume selection module 207 searches the lines registered in the virtual logical volume/pool relation table 1101 sequentially from the head to obtain one unprocessed line, and proceeds to Step 2102. It should be noted that the unprocessed line means a line yet to be subjected to a process of Steps 2103 to 2105 described below.

In Step 2102, the volume selection module 207 judges whether an unprocessed line has been found by the retrieval of Step 2101. If no unprocessed line has been found, the process of Steps 2103 to 2105 has been finished for all the lines registered in the virtual logical volume/pool relation table 1101. In this case, the process proceeds to Step 2106. On the other hand, if an unprocessed line has been found, the process proceeds to Step 2103.

In Step 2103, the volume selection module 207 judges whether a virtual logical volume identified by the logical volume identifier storage field 1102 of the line found in Step 2101 belongs to the pool B (339) and is in a "USED" status. In description below up to Step 2105, the line found in Step 2101 will be referred to as a relevant line, and the virtual logical volume identified by the logical volume identifier storage field 1102 of the relevant line will be referred to as a relevant virtual logical volume.

If "POOL B" has been registered in the pool identifier storage field 1103 of the relevant line, it is judged that the relevant virtual logical volume belongs to the pool B (339). A use status of the relevant virtual logical volume is judged based on a value of the use status storage field 806 of a line corresponding to the relevant virtual logical volume in the logical volume table 801.

If the relevant virtual logical volume belongs to the pool B (339) and is in a "USED" status, the process proceeds to Step 2104. If the relevant virtual logical volume does not belong to the pool B (339) or is in an "UNUSED" status, the process returns to Step 2101. The relevant line at this point is treated as processed after the return to Step 2101.

In Step 2104, the volume selection module 207 judges whether performance deterioration has occurred in the relevant virtual logical volume.

Whether performance deterioration has occurred is judged by referring to the volume statistics information table 1301 and the control information table 1501. Specifically, the volume selection module 207 retrieves a line in which a latest date and time has been registered among the lines registered in the relevant virtual logical volume from the volume statistics information table 1301. Then, the volume selection module 207 compares a value of the I/O response time storage field 1304 of the retrieved line with a value of the I/O response time threshold value for performance deterioration volume selection storage field 1508 of the control information table 1501 to judge whether the former value exceeds the latter threshold value. If the former value exceeds the latter threshold value, it is judged that performance deterioration has occurred in the relevant virtual logical volume.

If it is judged that performance deterioration has occurred in the relevant virtual logical volume, the process proceeds to Step 2105. On the other hand, if it is judged that no performance deterioration has occurred in the relevant virtual logical volume, the process returns to Step 2101. The relevant line at this point is treated as processed after the return to Step 2101. A specific method of judging a threshold value exceeded status in Step 2104 is the same as that for Step 1704 of FIG. 17.

In Step 2105, the volume selection module 207 registers a problem solving measure of "CONVERT RELEVANT LOGICAL VOLUME INTO REAL LOGICAL VOLUME" in the select volume table 1601. Specifically, the volume selection module 207 adds a new line to the select volume table 1601, and sets an identifier of the relevant virtual logical volume in the logical volume identifier storage field 1602, and "CONVERSION INTO REAL LOGICAL VOLUME" in the countermeasure type storage field 1603. After the registration in the select volume table 1601, the process returns to Step 2101. The relevant line at this point is treated as processed after the return to Step 2101.

In Step 2106, the volume selection module 207 refers to a value of the search mode storage field 1513 of the control information table 1501. If a value of the search mode storage field 1513 is "SERVER", the process proceeds to Step 2107. In a case of "APPLICATION", the process proceeds to Step 2108. In a case of "SINGLE", the process is finished.

In Step 2107, the volume selection module 207 finds all virtual logical volumes having other virtual logical volumes satisfying the following conditions (9) to (12) among the virtual logical volumes which are not registered in the select volume table 1601, belong to the pool B (339), and are "USED".
(9) Registered in the select volume table 1601.
(10) Belonging to the pool B.
(11) Being used.
(12) I/O path originating from a certain common server passes through both virtual logical volumes.

Information regarding the I/O path from the host server to the virtual logical volume can be obtained by the same method as in Step 2007 of FIG. 20.

In Step 2108, the volume selection module 207 finds all virtual logical volumes having other virtual logical volumes satisfying the following conditions (13) to (16) among the virtual logical volumes which are not registered in the select volume table 1601, belong to the pool B (339), and are "USED".
(13) Registered in the select volume table 1601.
(14) Belonging to the pool B.
(15) Being used.
(16) I/O path originating from a certain common application passes through both virtual logical volumes.

Information regarding the I/O path from the application to the virtual logical volume can be obtained by the same method as in Step 2008 of FIG. 20.

In Step 2109, the volume selection module 207 registers a problem solving measure of converting the virtual logical volume found in Step 2107 into a real logical volume in the select volume table 1601. Specifically, the volume selection module 207 adds a new line to the select volume table 1601, and sets an identifier of the virtual logical volume found in Step 2107 in the logical volume identifier storage field 1602 of the added line, and "CONVERSION INTO REAL LOGICAL VOLUME" in the countermeasure type storage field 1603.

In Step 2110, the volume selection module 207 registers a problem solving measure of converting the virtual logical volume found in Step 2108 into a real logical volume in the select volume table 1601. Specifically, the volume selection module 207 adds a new line to the select volume table 1601, and sets an identifier of the virtual logical volume found in Step 2108 in the logical volume identifier storage field 1602 of the added line, and "CONVERSION INTO REAL LOGICAL VOLUME" in the countermeasure type storage field 1603.

After an end of Step 2109 or 2110, or when a value of the search mode storage field 1513 is "SINGLE" in Step 2106, the volume selection module 207 finishes the process of FIG. 21.

FIG. 22 is a fifth part of a flowchart showing the processing procedure of the volume selection module 207 included in the performance management software 120 according to the embodiment of this invention.

The processing procedure of FIG. 22 is a former half of details of processing of Step 1804 of FIG. 18. Through the process of FIG. 22, among the virtual logical volumes belonging to the pool C (340), a virtual logical volume to be converted into a real logical volume is selected.

First, in Step 2201, the volume selection module 207 searches the lines registered in the virtual logical volume/pool relation table 1101 sequentially from the head to obtain one unprocessed line, and proceeds to Step 2202. The unprocessed line means a line yet to be subjected to a process of Steps 2203 to 2205 described below.

In Step 2202, the volume selection module 207 judges whether an unprocessed line has been found by the retrieval of Step 2201. If no unprocessed line has been found, the process of Steps 2203 to 2205 has been finished for all the lines registered in the virtual logical volume/pool relation table 1101. In this case, the process proceeds to Step 2206. On the other hand, if an unprocessed line has been found, the process proceeds to Step 2203.

In Step 2203, the volume selection module 207 judges whether a virtual logical volume identified by the logical volume identifier storage field 1102 of the line found in Step 2201 belongs to the pool C (340) and is in a "USED" status. In description below up to Step 2206, the line found in Step 2201 will be referred to as a relevant line, and the virtual logical volume identified by the logical volume identifier storage field 1102 of the relevant line will be referred to as a relevant virtual logical volume.

If "POOL C" has been stored in the pool identifier storage field 1103 of the relevant line, it is judged that the relevant virtual logical volume belongs to the pool C (340). A use status of the relevant virtual logical volume is judged based on a value of the use status storage field 806 of a line corresponding to the relevant virtual logical volume in the logical volume table 801.

If the relevant virtual logical volume belongs to the pool C (340) and is in a "USED" status, the process proceeds to Step 2204. If the relevant virtual logical volume does not belong to the pool C (340) or is in an "UNUSED" status, the process returns to Step 2201. The relevant line at this point is treated as processed after the return to Step 2201.

In Step 2204, the volume selection module 207 judges whether performance deterioration has occurred in the relevant virtual logical volume, and whether a filling rate of the relevant virtual logical volume exceeds a minimum filling rate. This judgment may be executed by the same method as in Step 1904 of FIG. 19.

If it is judged that performance deterioration has occurred in the relevant virtual logical volume, and that the filling rate of the relevant virtual logical volume exceeds the minimum filling rate, the process proceeds to Step 2205. On the other hand, if it is judged that no performance deterioration has occurred in the relevant virtual logical volume, or that the filling rate of the relevant virtual logical volume does not exceed the minimum filling rate, the process returns to Step 2201. The relevant line at this point is treated as processed after the return to Step 2201.

A specific method of judging a threshold value exceeded status and a minimum filling rate exceeded status are the same as in Step 1704 of FIG. 17.

In Step 2205, the volume selection module 207 registers a problem solving measure of "CONVERTING RELEVANT LOGICAL VOLUME INTO REAL LOGICAL VOLUME" in the select volume table 1601. Specifically, the volume selection module 207 adds a new line to the select volume table 1601, and sets an identifier of the relevant virtual logical volume in the logical volume identifier storage field 1602, and "CONVERSION INTO REAL LOGICAL VOLUME" in the countermeasure type storage field 1603. After the registration in the select volume table 1601, the process returns to Step 2201. The relevant line at this point is treated as processed after the return to Step 2201.

In Step 2206, the volume selection module 207 judges whether a line regarding a virtual logical line currently belonging to the pool C (340) has been registered in the select volume table 1601. If it is judged that a line regarding the virtual logical volume belonging to the pool C (340) has been registered, a problem solving measure indicated by the registered line may recover the deteriorated performance. In this case, the process proceeds to Step 2306. On the other hand, if it is judged that no line regarding the virtual logical volume belonging to the pool C (340) has been registered, a problem solving measure to recover the deteriorated performance is yet to be found. In this case, in order to find a problem solving measure, the process proceeds to Step 2207.

In Step 2207, the volume selection module 207 searches the lines registered in the virtual logical volume/pool relation table 1101 sequentially from the head to obtain one unprocessed line, and proceeds to Step 2208.

In Step 2208, the volume selection module 207 judges whether an unprocessed line has been found by the retrieval of Step 2207. If no unprocessed line has been found, the process of Steps 2209 to 2211 has been finished for all the lines registered in the virtual logical volume/pool relation table 1101. In this case, the process proceeds to Step 2212. On the other hand, if an unprocessed line has been found, the process proceeds to Step 2209.

In Step 2209, the volume selection module 207 judges whether a virtual logical volume identified by the logical volume identifier storage field 1102 of the line found in Step 2207 belongs to the pool C (340) and is in a "USED" status. A judging method is the same as that of Step 2203. In description below up to Step 2212, the line found in Step 2207 will be referred to as a relevant line, and the virtual logical volume identified by the logical volume identifier storage field 1102 of the relevant line will be referred to as a relevant virtual logical volume.

If the relevant virtual logical volume belongs to the pool C (340) and is in a "USED" status, the process proceeds to Step 2210. If the relevant virtual logical volume does not belong to the pool C (340) or is in an "UNUSED" status, the process returns to Step 2207. The relevant line at this point is treated as processed after the return to Step 2207.

In Step 2210, the volume selection module 207 judges whether an overload has occurred in the relevant virtual logical volume, and whether a filling rate of the relevant virtual logical volume exceeds a minimum filling rate. This judgment is executed by the same method in Step 1910 of FIG. 19. For a specific judging method, the same method as in Step 1704 of FIG. 17 may be used.

If it is judged that an overload has occurred in the relevant virtual logical volume, and that the filling rate of the relevant virtual logical volume exceeds the minimum filling rate, the process proceeds to Step 2211. On the other hand, if it is judged that no overload has occurred in the relevant virtual logical volume, or that the filling rate of the relevant virtual logical volume does not exceed the minimum filling rate, the process returns to Step 2207. The relevant line at this point is treated as processed after the return to Step 2207.

In Step 2211, the volume selection module 207 registers a problem solving measure of "CONVERT RELEVANT LOGICAL VOLUME INTO REAL LOGICAL VOLUME" in the select volume table 1601. Specifically, the volume selection module 207 adds a new line to the select volume table 1601, and sets an identifier of the relevant virtual logical volume in the logical volume identifier storage field 1602 of the added line, and "CONVERSION INTO REAL LOGICAL VOLUME" in the countermeasure type storage field 1603. After the registration in the select volume table 1601, the process returns to Step 2207. The relevant line at this point is treated as processed after the return to Step 2207.

In Step 2212, the volume selection module 207 judges whether a line regarding the virtual logical volume currently belonging to the pool C (340) has been registered in the select volume table 1601. If it is judged that the line regarding the virtual logical volume belonging to the pool C (340) has been registered, the deteriorated performance may be recovered through a problem solving measure indicated by the registered line. In this case, the process proceeds to Step 2306. On the other hand, if it is judged that the line regarding the virtual logical volume belonging to the pool C (340) has not been registered, the process proceeds to Step 2301.

FIG. 23 is a sixth part of a flowchart showing the processing procedure of the volume selection module 207 included in the performance management software 120 according to the embodiment of this invention.

The processing procedure of FIG. 23 is a latter half of details of processing contents of Step 1804 of FIG. 18. Through the process of FIG. 23, among the virtual logical volumes belonging to the pool C (340), a virtual logical volume to be converted into a real logical volume is selected.

First, in Step 2301, the volume selection module 207 searches the lines registered in the virtual logical volume/pool relation table 1101 sequentially from the head to obtain one unprocessed line, and proceeds to Step 2302. The unprocessed line means a line yet to be subjected to a process of Steps 2303 to 2305 described below.

In Step 2302, the volume selection module 207 judges whether an unprocessed line has been found by the retrieval of Step 2301. If no unprocessed line has been found, the process of Steps 2303 to 2305 has been finished for all the lines registered in the virtual logical volume/pool relation table 1101. In this case, the process proceeds to Step 2306. On the other hand, if an unprocessed line has been found, the process proceeds to Step 2303.

In Step 2303, the volume selection module 207 judges whether a virtual logical volume identified by the logical volume identifier storage field 1102 of the line found in Step 2301 belongs to the pool C (340) and is in a "USED" status. This judging method is the same as in Step 2203 of FIG. 22. In description below up to Step 2305, the line found in Step 2301 will be referred to as a relevant line, and the virtual logical volume identified by the logical volume identifier storage field 1102 of the relevant line will be referred to as a relevant virtual logical volume.

If the relevant virtual logical volume belongs to the pool C (340) and is in a "USED" status, the process proceeds to Step 2304. If the relevant virtual logical volume does not belong to the pool C (340) or is in an "UNUSED" status, the process returns to Step 2301. The relevant line at this point is treated as processed after the return to Step 2301.

In Step 2304, the volume selection module 207 judges whether performance deterioration has occurred in the relevant virtual logical volume. This judgment may be executed by the method of Step 2204. If it is judged that performance deterioration has occurred in the relevant virtual logical volume, the process proceeds to Step 2305. If it is judged that no performance deterioration has occurred in the relevant virtual logical volume, the process returns to Step 2301. The relevant line at this point is treated as processed after the return to Step 2301. A specific method of judging a threshold value exceeded status is the same as in Step 1704 of FIG. 17.

In Step 2305, the volume selection module 207 registers a problem solving measure of "CONVERT RELEVANT LOGICAL VOLUME INTO REAL LOGICAL VOLUME" in the select volume table 1601. Specifically, the volume selection module 207 adds a new line to the select volume table 1601, and sets an identifier of the relevant virtual logical volume in the logical volume identifier storage field 1602, and "CONVERSION INTO REAL LOGICAL VOLUME" in the countermeasure type storage field 1603. After the registration in the select volume table 1601, the process returns to Step 2301. The relevant line at this point is treated as processed after the return to Step 2301.

In Step 2306, the volume selection module 207 refers to a value of the search mode storage field 1513 of the control information table 1501. If a value of the search mode storage field 1513 is "SERVER", the process proceeds to Step 2307. In a case of "APPLICATION", the process proceeds to Step 2308. In a case of "SINGLE", the process is finished.

In Step 2307, the volume selection module 207 finds all virtual logical volumes having other virtual logical volumes satisfying the following conditions (17) to (20) among the virtual logical volumes which are not registered in the select volume table 1601, belong to the pool C (340), and are used.
(17) Registered in the select volume table 1601.
(18) Belonging to the pool C.
(19) Being used.
(20) I/O path originating from a certain common server passes through both virtual logical volumes.

Information regarding the I/O path from the host server to the virtual logical volume can be obtained by the same method as in Step 2007 of FIG. 20.

In Step 2308, the volume selection module 207 finds all virtual logical volumes having other virtual logical volumes satisfying the following conditions (21) to (24) among the virtual logical volumes which are not registered in the select volume table 1601, belong to the pool C (340), and are used.
(21) Registered in the select volume table 1601.
(22) Belonging to the pool C.
(23) Being used.
(24) I/O path originating from a certain common application passes through both virtual logical volumes.

Information regarding the I/O path from the application to the virtual logical volume can be obtained by the same method as in Step 2008 of FIG. 20.

In Step 2309, the volume selection module 207 registers a problem solving measure of converting the virtual logical volume found in Step 2307 into a real logical volume in the select volume table 1601. Specifically, the volume selection module 207 adds a new line to the select volume table 1601, and sets an identifier of the virtual logical volume found in Step 2307 in the logical volume identifier storage field 1602 of the added line, and "CONVERSION INTO REAL LOGICAL VOLUME" in the countermeasure type storage field 1603.

In Step 2310, the volume selection module 207 registers a problem solving measure of converting the virtual logical volume found in Step 2308 into a real logical volume in the select volume table 1601. Specifically, the volume selection module 207 adds a new line to the select volume table 1601, and sets an identifier of the virtual logical volume found in Step 2308 to the logical volume identifier storage field 1602 of the added line, and "CONVERSION INTO REAL LOGICAL VOLUME" in the countermeasure type storage field 1603.

This process is finished after the registration in the select volume table 1601.

FIGS. 19 to 23 described above can be applied when the computer system includes a plurality of storage systems. For example, a second storage system 131B may be connected to the storage system 131 shown in FIG. 1. The second storage system 131B includes a plurality of physical disks (not shown) similar to the physical disk 360 of the storage system 131. In this case, at least one selected from the virtual logical volume, the pool volume, and the real logical volume of the storage system 131 may be mapped in storage areas provided by the physical disks of the second storage system.

Alternatively, the second storage system may include a pool volume, a virtual logical volume, and a real logical volume similar to those of the storage system 131. In this case, in Step 1905, 1911, 1914, 1916, 2005, 2012, 2105, 2205, 2211, or 2305, the pool or the real logical volume of the second storage system may be selected as a migration destination of the virtual logical volume in the storage system 131.

Figure 25:
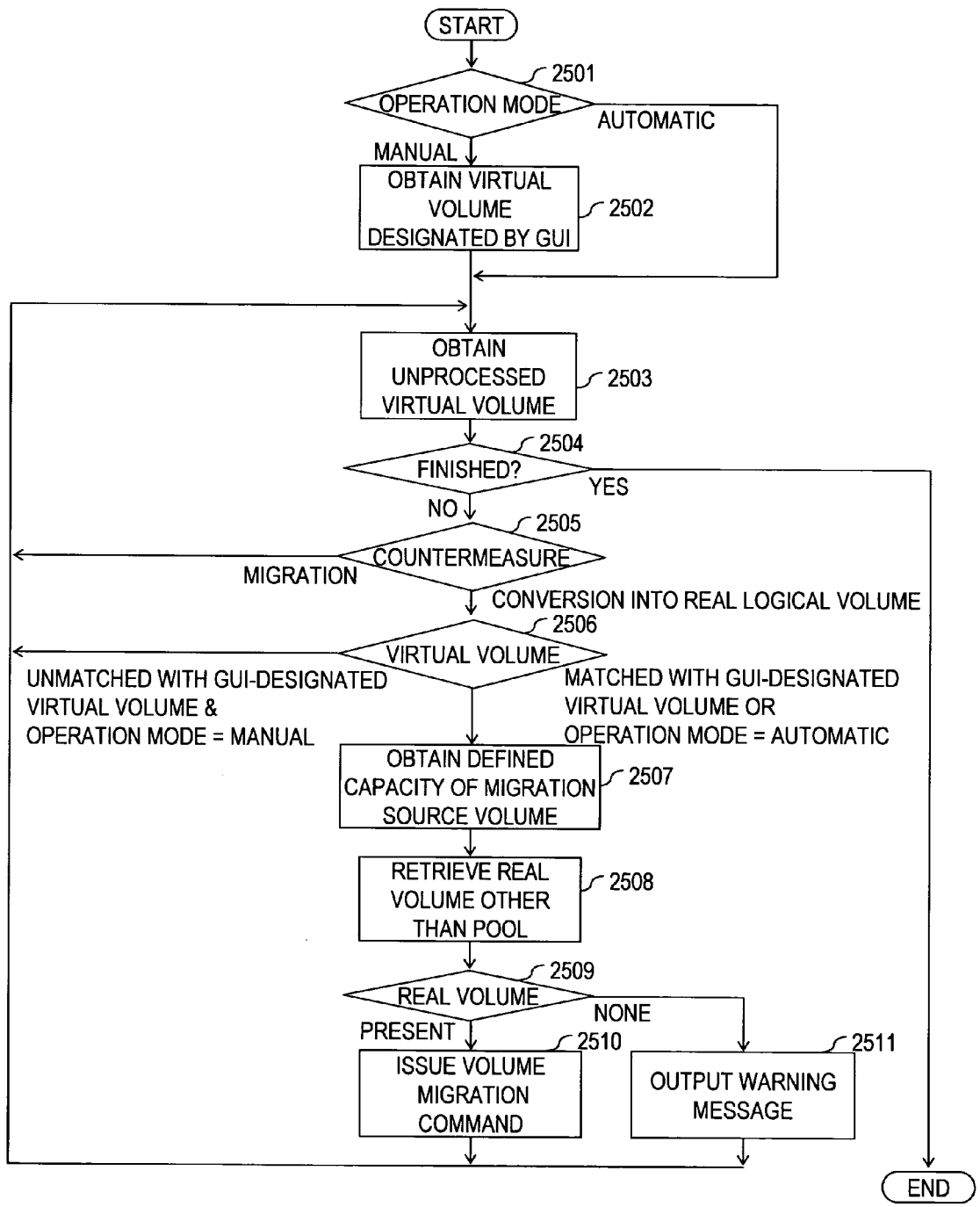
FIG. 25 is a flowchart showing a processing procedure of a real volume conversion module included in the performance management software of the first embodiment of this invention.

FIG. 25 is a flowchart showing a processing procedure of the real volume conversion module 213 included in the performance management software 120 of the first embodiment of this invention.

When the performance management software 120 is in an automatic operation mode, the processing procedure of FIG. 25 is automatically started after the volume selection module 207 completes the process. When the performance management software 120 is in a manual operation mode, the processing procedure of FIG. 25 is started when the user selects a performance problem solving measure from a list displayed by the volume list display module 211 to issue an execution instruction.

First, in Step 2501, the real volume conversion module 213 refers to a value of the operation mode storage field 1512 of the control information table 1501. If a value of the operation mode storage field 1512 is "AUTOMATIC", the process proceeds to Step 2503. In a case of "MANUAL", the process proceeds to Step 2502.

However, if a plurality of problem solving measures for one virtual logical volume are registered in Step 1905 or 1911 of FIG. 19, or Step 2005 of FIG. 20, the user has to select one of the plurality of problem solving measures. Accordingly, in this case, "MANUAL" is always selected in Step 2501.

In Step 2502, the real volume conversion module 213 obtains a number of a virtual logical volume corresponding to a line instructed to be executed by the user from the performance problem solving measure list of a GUI screen (i.e., display screen 401). Then, the real volume conversion module 213 searches the logical volume table 801 to obtain a logical volume identifier corresponding to the virtual logical volume number. For example, in the display screen 401 of FIG. 4, when the user instructs execution of conversion of a virtual logical volume to which a logical volume number "08" has been assigned into a real logical volume, the real logical volume conversion module 213 refers to the logical volume number storage field 804 and the logical volume identifier storage field 802 of the logical volume table 801 to obtain a logical volume identifier "VIRTUAL LOGICAL VOLUME E" corresponding to the logical volume number "08". Then, the process proceeds to Step 2503.

In Step 2503, the real volume conversion module 213 searches the lines registered in the select volume table 1601 sequentially from the head to obtain one unprocessed line, and proceeds to Step 2504. The unprocessed line means a line yet to be subjected to a process of Step 2505 and the following steps.

In Step 2504, the real volume conversion module 213 judges whether an unprocessed line has been found through the retrieval of Step 2503. If no unprocessed line has been found, the process of Step 2505 and the following steps is finished for all the lines registered in the select volume table 1601. In this case, the process of the real volume conversion module 213 is finished. On the other hand, if an unprocessed line has been found, the process proceeds to Step 2505. The line found through the retrieval of Step 2503 will be referred to as a relevant line in description of FIG. 25 below.

In Step 2505, the real volume conversion module 213 refers to a value of the countermeasure type storage field 1603 of the relevant line. If a value of the countermeasure type storage field 1603 is "CONVERSION INTO REAL LOGICAL VOLUME", the process proceeds to Step 2506. On the other hand, if a value of the countermeasure type storage field 1603 is "POOL MIGRATION", the process returns to Step 2503. The relevant line at this point is treated as processed after the return to Step 2503. A process executed when a value of the countermeasure type storage field 1603 is "POOL MIGRATION" will be described below referring to FIG. 26.

In Step 2506, the real volume conversion module 213 judges whether a value of the operation mode storage field 1512 of the control information table 1501 is "AUTOMATIC", and whether a value of the logical volume identifier storage field 1602 of the relevant line matches the logical volume identifier obtained in Step 2502. If the value of the operation mode storage field 1512 of the control information table 1501 is "AUTOMATIC", or if the value of the logical volume identifier storage field 1602 of the relevant line matches the logical volume identifier obtained in Step 2502, a virtual logical volume identified by the value of the logical volume identifier storage field 1602 of the relevant line has to be converted into a real logical volume. In this case, the process proceeds to Step 2507. On the other hand, if the value of the operation mode storage field 1512 of the control information table 1501 is "MANUAL", and if the value of the logical volume identifier storage field 1602 of the relevant line does not match the logical volume identifier obtained in Step 2502, the process returns to Step 2503. The relevant line at this point is treated as processed after the return to Step 2503.

In Step 2507, the real volume conversion module 213 retrieves a line corresponding to the value of the logical volume identifier storage field 1602 of the relevant line from the logical volume table 801 to obtain a value of a defined capacity storage field 805 of the retrieved line.

In Step 2508, the real volume conversion module 213 searches the logical volume table 801 to obtain a line in which a value of the volume type storage field 803 is "REAL", the value of the defined capacity storage field 805 matches the value of the defined capacity obtained in Step 2507, and a value of the use status storage field 806 is "UNUSED", and proceeds to Step 2509.

In Step 2509, the real volume conversion module 213 judges whether a line satisfying retrieving conditions of Step 2508 has been obtained. If a line satisfying the retrieving conditions has been obtained, the process proceeds to Step 2510. On the other hand, if no line satisfying the retrieving conditions has been obtained, there is no real logical volume which becomes a migration destination of a virtual logical volume. In other words, because the virtual logical volume cannot be converted into a real logical volume, the process proceeds to Step 2511.

In Step 2510, the real volume conversion module 213 issues a command of migrating a virtual logical volume indicated by the value of the logical volume identifier storage field 1602 of the relevant line to a real logical volume indicted by the value of the logical volume identifier storage field 802 of the line of the logical volume table 801 obtained in Step 2508 to the migration execution module 135.

In Step 2511, the real volume conversion module 213 displays a warning message that volume migration cannot be executed because there is no real logical volume to which the virtual logical volume indicated by the value of the logical volume identifier storage field 1602 of the relevant line can be migrated (i.e., there is no unused real logical volume whose defined capacity matches the virtual logical volume of the migration source) on the performance management client 104.

Upon an end of Step 2510 or 2511, the process returns to Step 2503. The relevant line at this point is treated as processed after the return to Step 2503.

Figure 26:
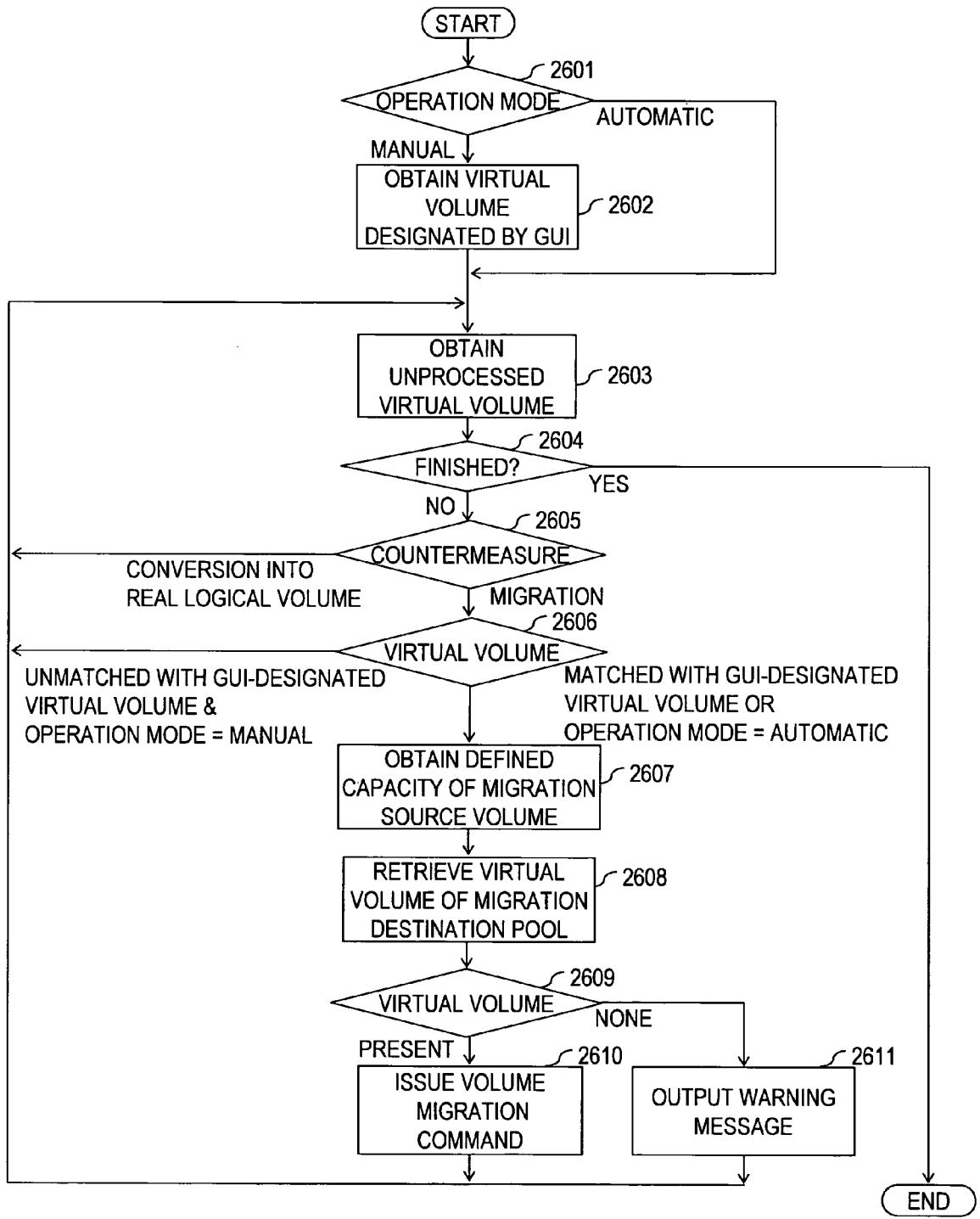
FIG. 26 is a flowchart showing a processing procedure of an inter-pool migration module included in the performance management software of the embodiment of this invention.

FIG. 26 is a flowchart showing a processing procedure of the inter-pool migration module 214 included in the performance management software 120 of the embodiment of this invention.

When the performance management software 120 is in an automatic operation mode, the processing procedure of FIG. 26 is automatically started after the volume selection module 207 completes the process. When the performance management software 120 is in a manual operation mode, the processing procedure of FIG. 25 is started when the user selects a performance problem solving measure from a list displayed by the volume list display module 211 to issue an execution instruction.

First, in Step 2601, the inter-pool migration module 214 refers to a value of the operation mode storage field 1512 of the control information table 1501. If a value of the operation mode storage field 1512 is "AUTOMATIC", the process proceeds to Step 2603. In a case of "MANUAL", the process proceeds to Step 2602.

However, if a plurality of problem solving measures for one virtual logical volume are registered in Step 1905 or 1911 of FIG. 19, or Step 2005 of FIG. 20, the user has to select one of the plurality of problem solving measures. Accordingly, in this case, "MANUAL" is always selected in Step 2601.

In Step 2602, the inter-pool migration module 214 obtains a number of a virtual logical volume corresponding to a line instructed to be executed by the user from the performance problem solving measure list of the display screen 401. Then, the inter-pool migration module 214 searches the logical volume table 801 to obtain a logical volume identifier corresponding to the virtual logical volume number. The acquisition is executed as in the case of Step 2502 of FIG. 25. A virtual logical volume identified by the obtained logical volume identifier is a virtual logical volume to be migrated (i.e., virtual logical volume of a migration source). The inter-pool migration module 214 retrieves a line of the select volume table 1601 relevant to the obtained logical volume identifier to obtain a value of the countermeasure parameter storage field 1604 of the retrieved line as a migration destination pool identifier, and proceeds to Step 2603.

For example, in the display screen 401 of FIG. 4, when the user instructs execution of migration of a virtual logical volume to which a logical volume number "05" has been assigned to the pool C (340), the inter-pool migration module 214 obtains "VIRTUAL LOGICAL VOLUME B" through the same procedure as in Step 2502. Additionally, the inter-pool migration module 214 obtains "POOL C" stored in the countermeasure parameter storage field 1604 of a line in which "VIRTUAL LOGICAL VOLUME B" has been stored in the logical volume identifier storage field 1602 among the lines registered in the select volume 1601 as a migration destination pool identifier.

In Step 2603, the inter-pool migration module 214 searches the lines registered in the select volume table 1610 sequentially from the head to obtain one unprocessed line, and proceeds to Step 2604. The unprocessed line means a line yet to be subjected to a process of Step 2605 and the following steps.

In Step 2604, the inter-pool migration module 214 judges whether an unprocessed line has been found through the retrieval of Step 2603. If no unprocessed line has been found, the process of Step 2605 and the following steps is finished for all the lines registered in the select volume table 1601. In this case, the process of the inter-pool migration module 214 is finished. On the other hand, if an unprocessed line has been found, the process proceeds to Step 2605. The line found through the retrieval of Step 2603 will be referred to as a relevant line in description of FIG. 26 below.

In Step 2605, the inter-pool migration module 214 refers to a value of the countermeasure type storage field 1603 of the relevant line. If a value of the countermeasure type storage field 1603 is "POOL MIGRATION", the process proceeds to Step 2606. On the other hand, if a value of the countermeasure type storage field 1603 is "CONVERSION INTO REAL LOGICAL VOLUME", the process returns to Step 2603. The relevant line at this point is treated as processed after the return to Step 2603.

In Step 2606, the inter-pool migration module 214 judges whether a value of the operation mode storage field 1512 of the control information table 1501 is "AUTOMATIC", and whether a value of the logical volume identifier storage field 1602 of the relevant line matches the logical volume identifier obtained in Step 2602. If the value of the operation mode storage field 1512 of the control information table 1501 is "AUTOMATIC", or if the value of the logical volume identifier storage field 1602 of the relevant line matches the logical volume identifier obtained in Step 2502, a virtual logical volume identified by the value of the logical volume identifier storage field 1602 of the relevant line is a migration source. In this case, the process proceeds to Step 2607. On the other hand, if the value of the operation mode storage field 1512 of the control information table 1501 is "MANUAL", and if the value of the logical volume identifier storage field 1602 of the relevant line does not match the logical volume identifier obtained in Step 2602, the process returns to Step 2603. The relevant line at this point is treated as processed after the return to Step 2603.

In Step 2607, the inter-pool migration module 214 retrieves a line corresponding to the value of the logical volume identifier storage field 1602 of the relevant line from the logical volume table 801 to obtain a value of a defined capacity storage field 805 of the retrieved line.

In Step 2608, the inter-pool migration module 214 searches the logical volume table 801 to obtain a line in which a value of the volume type storage field 803 is "VIRTUAL", the value of the defined capacity storage field 805 matches the value of the defined capacity obtained in Step 2607, a value of the use status storage field 806 is "UNUSED", and a virtual logical volume indicated by the logical volume identifier storage field 802 belongs to the migration destination pool obtained in Step 2602, and proceeds to Step 2609. Whether the virtual logical volume belongs to the migration destination pool is executed by retrieving a line in which the virtual logical volume has been registered from the virtual logical volume/pool relation table 1101, and by judging whether a value of a pool identifier storage field 1103 of the found line matches the migration destination pool identifier obtained in Step 2602.

In Step 2609, the inter-pool migration module 214 judges whether a line satisfying retrieving conditions of Step 2608 has been obtained. If a line satisfying the retrieving conditions has been obtained, the process proceeds to Step 2610. On the other hand, if no line satisfying the retrieving conditions has been obtained, there is no virtual logical volume which becomes a migration destination of a virtual logical volume of a migration source. In other words, because the virtual logical volume cannot be migrated to the other pool, the process proceeds to Step 2611.

In Step 2610, the inter-pool migration module 214 issues a command of migrating a virtual logical volume indicated by the value of the logical volume identifier storage field 1602 of the relevant line to a virtual logical volume indicated by the value of the logical volume identifier storage field 802 of the line of the logical volume table 801 obtained in Step 2608 to the migration execution module 135.

In Step 2611, the inter-pool migration module 214 displays a warning message that volume migration cannot be executed because there is no virtual logical volume to which the virtual logical volume indicated by the value of the logical volume identifier storage field 1602 of the relevant line can be migrated (i.e., there is no unused virtual logical volume whose defined capacity matches the virtual logical volume of the migration source) on the migration destination pool in the performance management client 104.

Upon an end of Step 2610 or 2611, the process returns to Step 2603. The relevant line at this point is treated as processed after the return to Step 2603.

According to the embodiment of this invention, the performance management software 120 judges whether performance problem has occurred in the virtual logical volume or the pool based on measured statistics information of each virtual logical volume and each pool (FIG. 17).

If it is judged that performance problem has occurred, the performance management software 120 selects a virtual logical volume to be migrated and its migration destination to solve the performance problem (FIGS. 19 to 23). Specifically, the virtual logical volume in which the performance problem has occurred is selected as a virtual logical volume to be migrated. As a migration destination, a real logical volume (Steps 1914, 1916, 2012, 2105, 2205, 2211, and 2305), or a pool other than the pool to which the selected virtual logical volume belongs (Steps 1905, 1911, and 2005) is selected.

Additionally, if one host server issues I/O request to the plurality of virtual logical volumes including the virtual logical volume in which the performance problem has occurred, the plurality of virtual logical volumes may be selected as virtual logical volumes to be migrated (Steps 2009, 2109, and 2309). Alternatively, if one application issues I/O request to the plurality of virtual logical volumes including the virtual logical volume in which the performance problem has occurred, the plurality of virtual logical volumes may be selected as virtual logical volumes to be migrated (Steps 2010, 2110, and 2310).

The selected virtual logical volume and its migration destination are displayed on the display device 170 as shown in FIG. 4. This display may be executed in each step of selecting the virtual logical volume and its migration destination, or may be executed after the end of a series of process shown in FIGS. 19 to 23.

By migrating the virtual logical volume thus selected to the selected migration destination (FIGS. 25 and 26), I/O to the plurality of virtual logical volumes is distributed so that an influence of mutual interference on performance can be reduced. As a result, deteriorated performance can be recovered, or performance deterioration can be prevented.

What is claimed is:

1. A computer system, comprising:
a host computer;
a storage system coupled to the host computer via a network;
a management computer coupled to the host computer and the storage system; and
a display device, wherein:
the host computer includes a first interface coupled to the network, a first processor coupled to the first interface, and a first memory coupled to the first processor;
the management computer includes a second interface coupled to the host computer and the storage system, a second processor coupled to the second interface, and a second memory coupled to the second processor;
the storage system includes a port coupled to the network, a controller coupled to the port, and a plurality of physical storage devices for storing data written by the host computer;
the controller receives data I/O requests to a plurality of virtual logical volumes, or data I/O requests to the plurality of virtual logical volumes and to at least one real logical volume, from the host computer;
each of the plurality of virtual logical volumes is allocated to one of a plurality of pools;
each of the plurality of pools includes at least one pool volume;
first storage areas of the plurality of physical storage devices are allocated to the plurality of pool volumes associated with a particular pool;
a storage area of the plurality of physical storage devices is allocated to at least a portion of storage areas defined as the plurality of virtual logical volumes associated with a particular pool;
second storage areas of the plurality of physical storage devices are allocated to the at least one real logical volume; and
the second processor:
judges whether a performance problem has occurred in at least one of the plurality of virtual logical volumes or the plurality of pools,
selects one of the plurality of virtual logical volumes as a migration source upon judgment that a performance problem has occurred in at least one of the plurality of virtual logical volumes or the plurality of pools,
selects at least one of: 1) a pool other than the pool to which the migration source is allocated; or 2) the at least one real logical volume as a migration destination, wherein the storage area of the plurality of physical storage devices allocated to one of the plurality of pool volumes included in one of the plurality of pools or to the at least one real logical volume selected as the migration destination, is other than the storage area of the plurality of physical storage devices allocated to one of the plurality of pool volumes included in one of the plurality of to which the migration source is allocated, and executes at least one of causing the display device to display information indicating the migration source and information indicating the selected migration destination, and transmitting an instruction to the controller to migrate the migration source to the pool or the real logical volume selected as the migration destination.

2. The computer system according to claim 1, wherein the second processor selects the virtual logical volume in which the performance problem has occurred, among the plurality of virtual logical volumes, as the migration source.

3. The computer system according to claim 1, wherein the second processor selects the virtual logical volume in which the performance problem has occurred and a ratio of the amount of actually stored data with respect to a defined capacity exceeds a predetermined threshold value, among the plurality of virtual logical volumes, as the migration source.

4. The computer system according to claim 1, wherein when the host computer issues I/O request to two or more of the plurality of virtual logical volumes including the migration source, the second processor selects the two or more of the plurality of virtual logical volumes, which receive the I/O request from the host computer, as the migration source.

5. The computer system according to claim 1, wherein:
the first processor executes an application by executing the program stored in the first memory, and
the application issues I/O request to the two or more of the plurality of virtual logical volumes including the migration source, the second processor selects the two or more of the plurality of virtual logical volumes, which receive the I/O request from the application, as the migration source.

6. The computer system according to claim 1, wherein when a free capacity of the pool other than the pool to which the migration source is allocated is smaller than the amount of data stored in the migration source, the second processor selects the real logical volume as a migration destination of the migration source.

7. The computer system according to claim 1, wherein when the pool other than the pool to which the migration source is allocated is selected as a migration destination of the migration source, the second processor causes the display device to display information indicating I/O performance of the migration destination and information indicating a free capacity of the migration destination.

8. The computer system according to claim 1, wherein upon judgment that a performance problem has occurred in at least one of the plurality of virtual logical volumes and the plurality of pools, the second processor selects one of the plurality of virtual logical volumes as the virtual logical volume of the migration source to be migrated to the pool other than the pool to which the virtual logical volume is allocated, and then selects the virtual logical volume of the migration source to be migrated to the real logical volume.

9. The computer system according to claim 1, wherein:
the second processor obtains at least one of I/O response time with respect to one of the virtual logical volume and the pool, the number of I/O times per unit time for one of the virtual logical volume and the pool, and an I/O transfer rate with respect to one of the virtual logical volume and the pool by predetermined timing,
judges that performance deterioration has occurred in one of the virtual logical volume and the pool when the I/O response time with respect to one of the virtual logical volume and the pool exceeds a predetermined threshold value, judges that an overload has occurred in one of the virtual logical volume and the pool when one of the number of I/O times per unit time for one of the virtual logical volume and the pool and the I/O transfer rate with respect to one of the virtual logical volume and the pool exceeds a predetermined value, and judges that a performance problem has occurred in one of the virtual logical volume and the pool when at least one of the performance deterioration and the overload has occurred in one of the virtual logical volume and the pool.

10. The computer system according to claim 9, wherein:
the plurality of pools include a first pool, a second pool, and a third pool,
the second processor selects the second pool as a migration destination of the migration source when the virtual logical volume which is allocated to the first pool and in which the overload has occurred is selected as the migration source, and
the second processor selects the third pool as a migration destination of the migration source when the virtual logical volume which is allocated to the first pool and in which the performance deterioration has occurred is selected as the migration source.

11. The computer system according to claim 1, further comprising a second storage system coupled to the storage system, wherein:
the second storage system includes one or more second physical storage devices,
a part of a storage area of the one or more second physical storage devices is allocated to one of a second pool volume and a second real logical volume, and
the second processor selects one of a pool including the second pool volume and the second real logical volume, as a migration destination of the migration source.

12. A control method for a computer system which includes a host computer, a storage system coupled to the host computer via a network, a management computer coupled to the host computer and the storage system, and a display device,
the host computer including a first interface coupled to the network, a first processor coupled to the first interface, and a first memory coupled to the first processor,
the storage system including a port coupled to the network, a controller coupled to the port, and a plurality of physical storage devices for storing data written by the host computer,
the controller receiving data I/O requests to a plurality of virtual logical volumes, or data I/O requests to the plurality of virtual logical volumes and to at least one real logical volumes from the host computer,
each of the plurality of virtual logical volumes being allocated to one of a plurality of pools,
each of the plurality of pools including at least one pool volume,
first storage areas of the plurality of physical storage devices being allocated to the plurality of pool volumes associated with a particular pool,
a storage area of the plurality of physical storage devices is allocated to at least a portion of storage areas defined as the plurality of virtual logical volumes associated with a particular pool,
second storage areas of the plurality of physical storage devices being allocated to the at least one real logical volume,
the control method comprising the steps of:

judging whether a performance problem has occurred in at least one of the plurality of virtual logical volumes or the plurality of pools;

selecting one of the plurality of virtual logical volumes as a migration source upon judgment that a performance problem has occurred in at least one of the plurality of virtual logical volumes or the plurality of pools;

selecting at least one of: 1) a pool other than the pool to which the migration source is allocated; or 2) the at least one real logical volume as a migration destination wherein the storage area of the plurality of physical storage devices allocated to one of the plurality of pool volumes included in one of the plurality of pools or to the at least one real logical volume selected as the migration destination, is other than the storage area of the plurality of physical storage devices allocated to one of the plurality of pool volumes included in one of the plurality of pools to which the migration source is allocated; and executing at least one of causing the display device to display information indicating the migration source and information indicating the selected migration destination, and transmitting an instruction to the controller to migrate the migration source to the pool or the real logical volume selected as the migration destination.

13. The method according to claim 12, wherein selecting one of the plurality of virtual logical volumes as the migration source is executed by selecting the virtual logical volume in which a performance problem has occurred among the plurality of virtual logical volumes as the migration source.

14. The method according to claim 12, wherein selecting one of the plurality of virtual logical volumes as the migration source is executed by selecting the virtual logical volume in which a performance problem has occurred and a ratio of the amount of actually stored data with respect to a defined capacity exceeds a predetermined threshold value, among the plurality of virtual logical volumes, as the migration source.

15. The method according to claim 12, wherein selecting at least one of the pool other than the pool to which the migration source is allocated or the real logical volume as the migration destination of the migration source is executed by selecting the real logical volume as the migration destination of the migration source when a free capacity of the pool other than the pool to which the migration source is allocated is smaller than the amount of data stored in the migration source.

16. A non-transitory computer-readable medium including a program for making a management computer execute, wherein the management computer coupled to a host computer, a storage system and a display device, the storage system is coupled to the host computer via a network, the host computer including a first interface coupled to the network, a first processor coupled to the first interface, and a first memory coupled to the first processor;

the management computer includes a second interface coupled to the host computer and the storage system, a second processor coupled to the second interface, and a second memory coupled to the second processor;

the storage system includes a port coupled to the network, a controller coupled to the port, and a plurality of physical storage devices for storing data written by the host computer;

the controller receiving data I/O requests to a plurality of virtual logical volumes, or data I/O requests to the plurality of virtual logical volumes and to at least one real logical volumes from the host computer;

each of the plurality of virtual logical volumes is allocated to one of a plurality of pools;

each of the plurality of pools includes at least one pool volumes;

first storage areas of the plurality of physical storage devices are allocated to the plurality of pool volumes associated with a particular pool;

a storage area of the plurality of physical storage devices allocated to is allocated to at least a portion of storage areas defined as the plurality of virtual logical volumes associated with a particular pool;

second storage areas of the plurality of physical storage devices being allocated to the at least one real logical volume; and the program comprising:

code for judging whether a performance problem has occurred in at least one of the plurality of virtual logical volumes or the plurality of pools, code for selecting one of the plurality of virtual logical volumes as a migration source upon judgment that a performance problem has occurred in at least one of the plurality of virtual logical volumes or the plurality of pools, code for selecting at least one of: 1) a pool other than the pool to which the migration source is allocated; or 2) the at least real logical volume as a migration destination, wherein the storage area of the plurality of physical storage devices allocated to one of the plurality of one or more pool volumes included in one of the plurality of pools or to the at least one real logical volume selected as the migration destination, is other than the storage area of the plurality of physical storage devices allocated to one of the plurality of pool volumes included in one of the plurality of to which the migration source is allocated, and code for executing at least one of causing the display device to display information indicating the migration source and information indicating the selected migration destination, and transmitting an instruction to the controller to migrate the migration source to the pool or the real logical volume selected as the migration destination.

17. The non-transitory computer-readable medium according to claim 16, wherein selecting one of the plurality of virtual logical volumes as the virtual logical volume of the migration source includes selecting the virtual logical volume in which a performance problem has occurred among the plurality of virtual logical volumes as the migration source.

18. The non-transitory computer-readable medium according to claim 16, wherein selecting one of the plurality of virtual logical volumes as the virtual logical volume of the migration source includes selecting the virtual logical volume in which a performance problem has occurred and a ratio of the amount of actually stored data with respect to a defined capacity exceeds a predetermined threshold value, among the plurality of virtual logical volumes, as the migration source.

19. The non-transitory computer-readable medium according to claim 16, wherein selecting at least one of the pool other than the pool to which the migration source is allocated or the real logical volume as the migration destination of the migration source includes selecting the real logical volume as the migration destination of the migration source when a free capacity of the pool other than the pool to which the migration source is allocated is smaller than the amount of data stored in the migration source.

* * * * *